United States Patent [19]
Jones

[11] Patent Number: 5,548,181
[45] Date of Patent: Aug. 20, 1996

[54] FIELD EMISSION DEVICE COMPRISING DIELECTRIC OVERLAYER

[75] Inventor: Gary W. Jones, Raleigh, N.C.

[73] Assignee: FED Corporation, Hopewell Junction, N.Y.

[21] Appl. No.: 461,416

[22] Filed: Jun. 5, 1995

Related U.S. Application Data

[62] Division of Ser. No. 29,880, Mar. 11, 1993.

[51] Int. Cl.⁶ ........................................ H01J 1/88
[52] U.S. Cl. ...................... 313/309; 313/558; 313/495
[58] Field of Search ................................ 313/495, 553, 313/558, 496, 304, 336, 351

[56] References Cited

U.S. PATENT DOCUMENTS

| | | | |
|---|---|---|---|
| 3,665,241 | 5/1972 | Spindt et al. | 313/351 |
| 3,753,022 | 8/1973 | Fraser, Jr. | 313/78 |
| 3,921,022 | 11/1975 | Levine | 313/309 |
| 3,935,500 | 1/1976 | Oess et al. | 313/495 |
| 3,970,887 | 7/1976 | Smith et al. | 313/309 |
| 3,982,147 | 9/1976 | Redman | 313/309 |
| 3,998,678 | 12/1976 | Fukase et al. | 156/3 |
| 4,008,412 | 2/1977 | Yuito et al. | 313/309 |
| 4,095,133 | 6/1978 | Hoeberechts | 313/336 |
| 4,164,680 | 8/1979 | Villalobos | 313/336 |
| 4,227,883 | 7/1981 | Kaplan | 29/571 |
| 4,256,532 | 3/1981 | Magdo et al. | 156/628 |
| 4,307,507 | 12/1981 | Gray et al. | 29/580 |
| 4,325,000 | 4/1982 | Wolfe et al. | 313/336 |
| 4,337,115 | 6/1982 | Ikeda et al. | 156/659.1 |
| 4,498,952 | 2/1985 | Christensen | 156/643 |
| 4,513,308 | 4/1985 | Greene et al. | 357/55 |
| 4,578,614 | 3/1986 | Gray et al. | 313/309 |
| 4,614,564 | 9/1986 | Sheldon et al. | 156/657 |
| 4,663,559 | 5/1987 | Christensen | 313/336 |
| 4,670,090 | 6/1987 | Sheng et al. | 156/653 |
| 4,683,024 | 7/1987 | Miller et al. | 156/643 |
| 4,685,996 | 8/1987 | Busta et al. | 156/628 |
| 4,724,328 | 2/1988 | Lischke | 250/492.2 |
| 4,774,433 | 9/1988 | Ikebe et al. | 313/362.1 |
| 4,824,795 | 4/1989 | Blanchard | 437/62 |
| 4,853,545 | 8/1989 | Rose | 250/396 R |
| 4,964,946 | 10/1990 | Gray et al. | 156/643 |
| 4,990,766 | 2/1991 | Simms et al. | 250/213 |
| 5,030,895 | 7/1991 | Gray | 315/350 |
| 5,053,673 | 10/1991 | Tomii et al. | 313/308 |
| 5,070,282 | 12/1991 | Epsztein | 313/336 |
| 5,124,664 | 6/1992 | Cade et al. | 313/309 |
| 5,129,850 | 7/1992 | Kane et al. | 445/24 |
| 5,141,459 | 8/1992 | Zimmerman | 445/24 |
| 5,141,460 | 8/1992 | Jaskie et al. | 445/24 |
| 5,188,977 | 2/1993 | Stengl et al. | 437/89 |
| 5,191,217 | 3/1993 | Kane et al. | 250/423 |
| 5,223,766 | 6/1993 | Nakayama et al. | 313/495 |
| 5,283,500 | 2/1994 | Kochanski | 313/309 |
| 5,374,868 | 12/1994 | Tjaden et al. | 313/310 |
| 5,384,509 | 1/1995 | Kane et al. | 313/309 |
| 5,442,255 | 8/1995 | Ise et al. | 313/495 |
| 5,453,659 | 9/1995 | Wallace et al. | 313/495 |

FOREIGN PATENT DOCUMENTS 58-94741   6/1983   Japan.

Primary Examiner—Sandra L. O'Shea
Assistant Examiner—Vip Patel
Attorney, Agent, or Firm—Intellectual Property/Technology Law; Robert G. Rosenthal

[57] ABSTRACT

A vertical field emitter structure and field emission device such as a flat panel display utilizing such structure. Self-aligned gate and emitter fabrication is described, together with virtual column field emitter structures, comprising an emitter or gated emitter with conductive columns connecting the emitter to an underlying resistor or conductor structure formed by chemical or other modification of portions of an underlying layer. The display of the invention utilizes field emission structures with low turn-voltages and high accelerating voltages, thereby permitting high brightness, small pixel size, low manufacturing costs, uniform brightness, and high energy efficiency to be achieved.

3 Claims, 58 Drawing Sheets

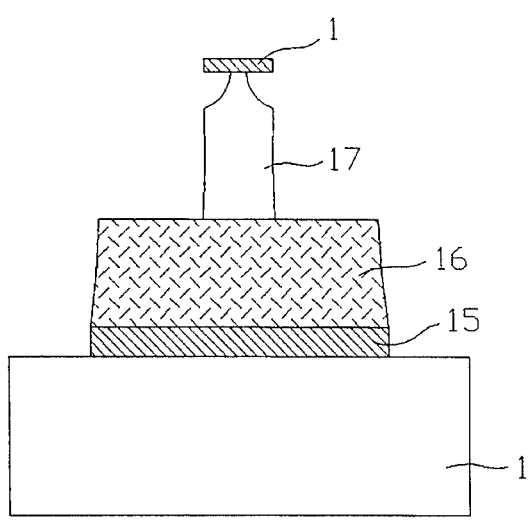
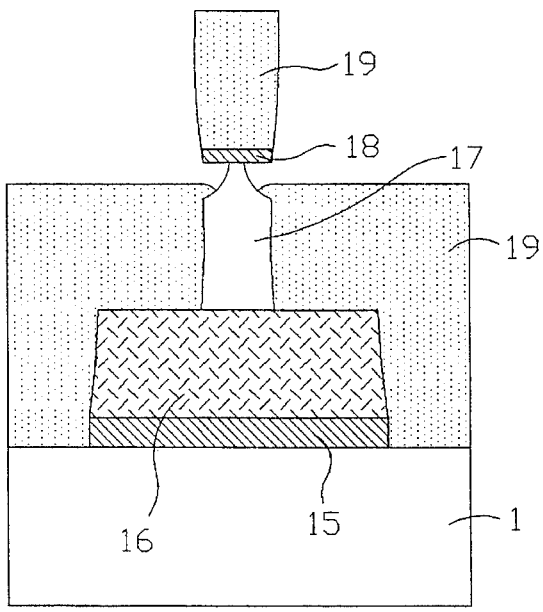
FIG. 9
FIG. 10

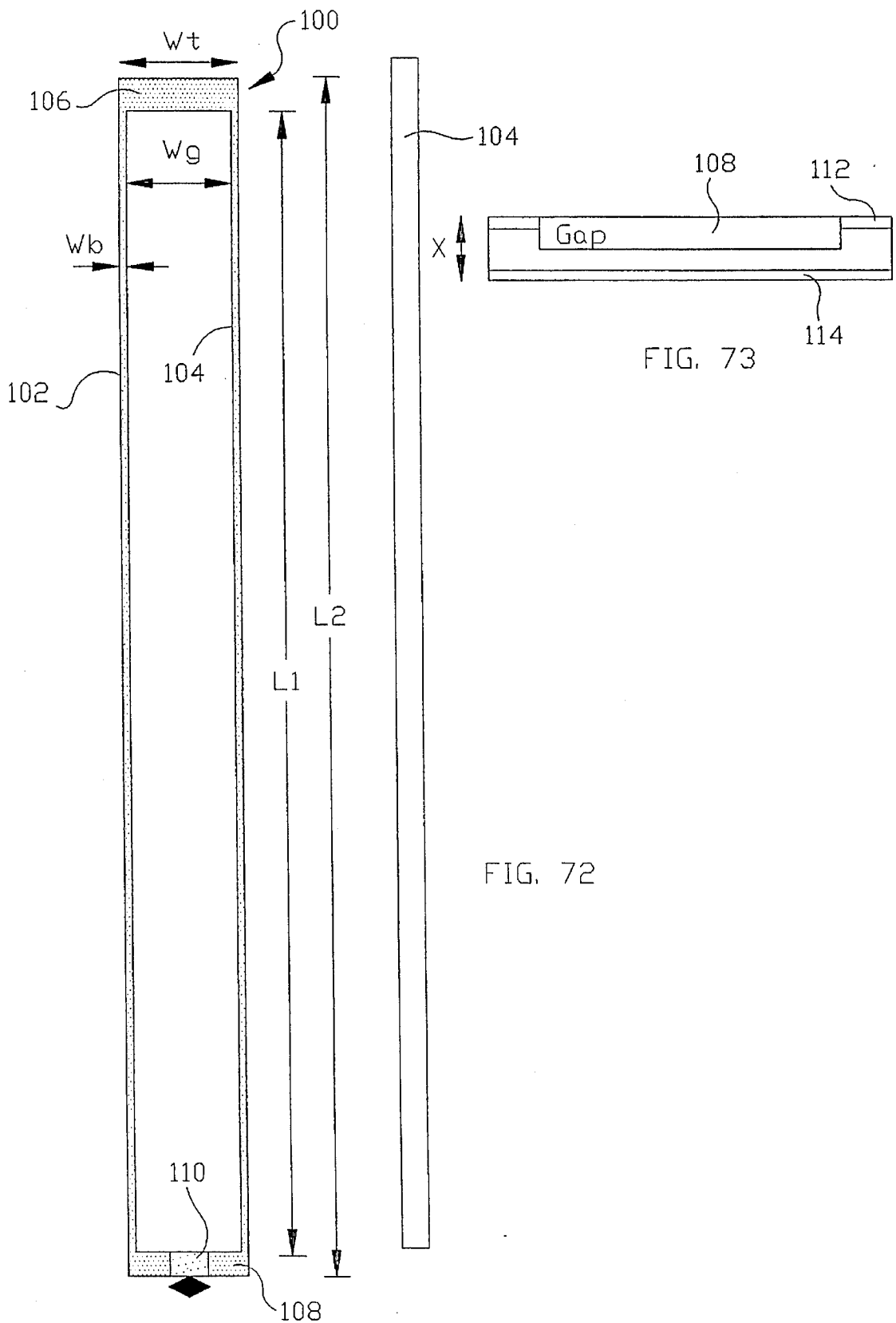

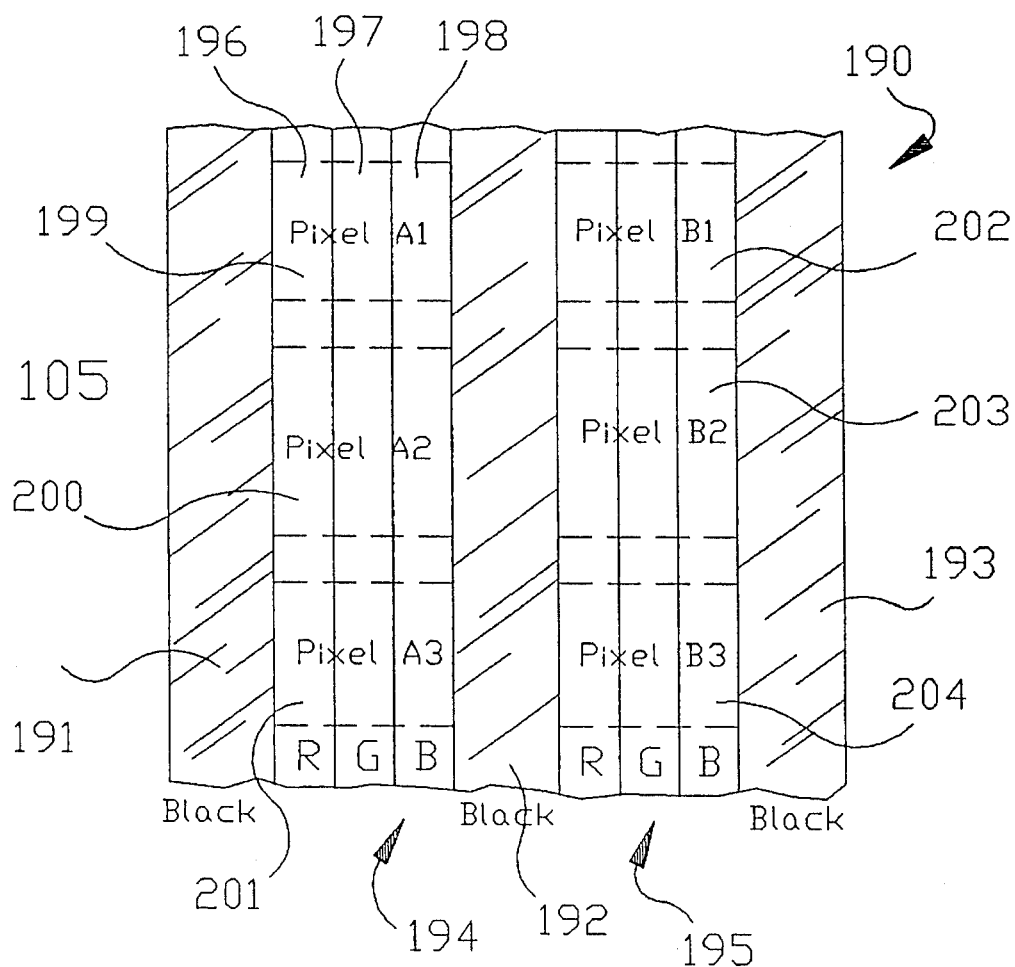

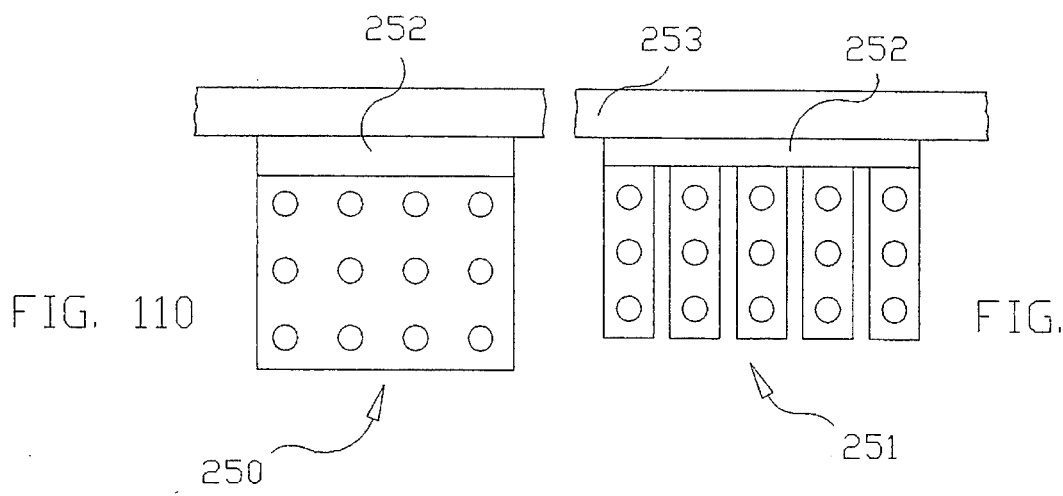
FIG. 110
FIG. 111
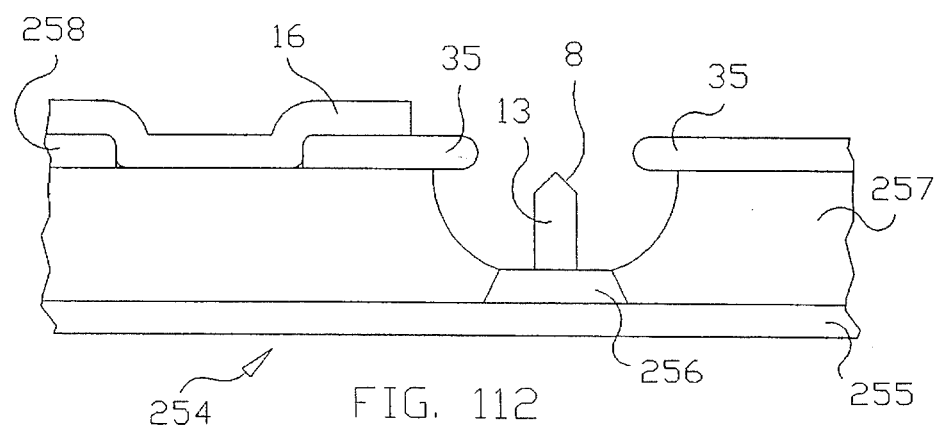
FIG. 112
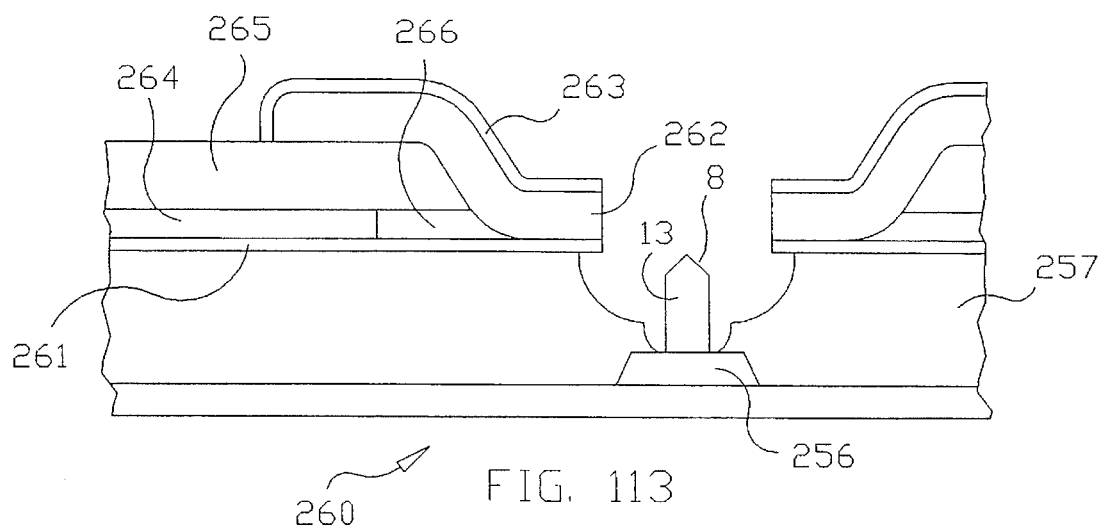
FIG. 113

FIELD EMISSION DEVICE COMPRISING DIELECTRIC OVERLAYER

This is a divisional of application Ser. No. 08/029,880 filed Mar. 11, 1993.

BACKGROUND OF THE INVENTION

1. Field of the Invention

The present invention relates to field emission structures and devices, including field emission-based flat panel displays, as well as to methods of manufacture and use of such structures and devices.

2. Description of the Related Art

In the technology of field emission structures and devices, a microelectronic emission element, or a plurality (array) of such elements, is employed to emit a flux of electrons from the surface of the emission element(s). The emitter surface, referred to as a "tip", is specifically shaped to facilitate effective emission of electrons, and may for example be conical-, pyramidal-, or ridge-shaped in surface profile, or alternatively the tip may comprise a flat emitter surface of low work function material.

Field emitter structures have wide potential and actual utility in microelectronic applications, including (i) electron guns, (ii) display devices comprising the field emitter structure in combination with photoluminescent material on which the emitted electrons are selectively impinged, and (iii) vacuum integrated circuits comprising assemblies of emitter tips coupled with associated control electrodes.

In construction, the field emission tip is characteristically arranged with the tip in electrical contact with an emitter electrode, and in spaced relationship to an extraction electrode, thereby forming an electron emission gap. With a voltage imposed between the emitter electrode and extraction electrode, the field emission tip discharges a flux of electrons. The tip or tip array may be formed on a suitable substrate such as silicon or other semiconductor material, and associated electrodes may be formed on and/or in the substrate by well-known planar techniques to yield practical microelectronic devices.

Horizontal and vertical field emitter types are known in the art, the direction of electron beam emission relative to the substrate determining the orientational type. Horizontal field emitters utilize horizontally arranged emitters (tips) and electrodes to generate electron beam emission parallel to the (horizontally aligned) substrate. Correspondingly, vertical field emitters employ vertically arranged emitters and electrodes to generate electron beam emission perpendicular to the substrate.

Lambe U.S. Pat. No. 4,728,851 and Lee et al. U.S. Pat. No. 4,827,177 disclose horizontal field emission structures of an illustrative nature.

Tomii et al. U.S. Pat. No. 5,053,673 teaches the formation of vertical field emission structures by forming elongate parallel layers of cathode material on a substrate, followed by attachment of a second substrate so that the cathode material layers are sandwiched therebetween in a block matrix. Alternatively, the cathode material layer can be encased in a layer of electrically insulative material sandwiched in such type of block matrix. The block then is sectioned to form elements having exposed cathode material on at least one face thereof. In the embodiment wherein the cathode material is encased in an insulative material, the sliced members may be processed so that the cathode material protrudes above the insulator casing. The exposed cathode material in either embodiment then is shaped into emitter tips (microtip cathodes).

Spindt et al. U.S. Pat. 3,665,241 describes vertical field emission cathode/field ionizer structures in which "needle-like" elements such as conical or pyramidal tips are formed on a (typically conductive or semiconductive) substrate. Above this tip array, a foraminous electrode member, such as a screen or mesh, is arranged with its openings vertically aligned with associated tip elements. In one embodiment disclosed in the patent, the needle-like elements comprise a cylindrical lower pedestal section and an upper conical extremity, wherein the pedestal section has a higher resistivity than either the foraminous electrode or the upper conical extremity, and an insulator may be arranged between the conical tip electrodes and the foraminous electrode member. The structures of this patent may be formed by metal deposition through a foraminous member (which may be left in place as a counter-electrode, or replaced with another foraminous member) to yield a regular array of metal points.

Copending U.S. patent application Ser. No. 07/846,281 filed 4 March 1992 in the names of Gary W. Jones and Ching-Tzong Sune and entitled "Vertical Microelectronic Field Emission Devices and Methods of Making Same", the disclosure of which hereby is incorporated herein by reference, describes a vertical column emitter structure in which the columns include a conductive top portion and a resistive bottom portion, and upwardly vertically extend from a horizontal substrate. By this arrangement, an emitter tip surface is provided at the upper extremity of the column and the tip is separated from the substrate by the elongate column. An insulating layer is formed on the substrate between the columns. An emitter electrode may be formed at the base of the column and an extraction electrode may be formed adjacent the top of the column.

As described in this copending application, the vertical column emitter structure may be fabricated by forming the tips on the face of the substrate, followed by forming trenches in the substrate around the tips to form columns having the tips at their uppermost extremities. Alternatively, the vertical column emitter structure of this copending application is described as being fabricatable by forming trenches in the substrate to define columns, followed by forming tips on top of the columns. In either method, the trenches may be filled with a dielectric and a conductor layer may be formed on the dielectric to provide extraction electrodes.

In field emitter technology, as exemplified by the structures and devices described in the above-discussed patents, there is a continuing search for improvements, particularly under the impetus of commercial as well as military interest in the development of practical and reliable flat panel display devices. Specifically, there is a need in the art for field emitter displays which are able to operate at low turn-on voltages with high accelerating voltages, in a low power, high brightness mode.

The vertical emitter technology disclosed in the above-discussed Tomii et al. and Spindt et al. patents and the Jones et al. application offers the potential advantages of: low capacitance, high speed operation; self-alignment of gate to emitter elements; and high defect-insensitivity attributable to thick dielectric material between the gate and the emitter backplane. Despite these considerable potential advantages, the fabrication of the vertical emitter devices disclosed in the Tomii et al., Spindt et al., and Jones et al. references are relatively complex, time-consuming, and expensive to fabricate, and accordingly are not highly suitable for commercial mass production.

It would therefore be a substantial advantage in the art, and is an object of the present invention, to provide a field emission structure comprising vertical emitter elements, which is simply, quickly, and economically fabricatable, using conventional fabrication equipment and thin film processing techniques.

It is another object of the present invention to provide a method of fabricating a self-aligned gate and emitter structure wherein the field emitter element has a highly efficient emission control and protection resistance character.

It is a further object of the invention to provide a display panel permitting the use of high voltages to improve pixel size control, brightness, and energy efficiency characteristics of the display.

It is a still further object of the invention to provide a non-lithographic patterning process for fabricating emitter structures.

It is yet another object of the invention to provide a display panel utilizing field emitters in the display as power supplies and circuitry means, in order to minimize the overall volume and cost of the display.

Other objects and advantages of the invention will be more fully apparent from the ensuing disclosure and appended claims.

SUMMARY OF THE INVENTION

In one aspect, the present invention relates to an emitter tip structure for use in a field emission device, and to display panels comprising such emitter tip structures.

In another aspect, the invention relates to a method of forming a field emitter structure and display panels comprising same.

The invention, as hereinafter more fully described, involves various specific aspects, features, and advantages, including, but not limited to, the following:

(i) a novel, low cost, self-aligned gate and emitter structure with a emission control and protection resistance characteristics, which can be fabricated utilizing a simple process (such processes forming another aspect of the present invention), wherein the gated and resistive emitters permit very low power emitter and gate drivers to be employed since power for light from the display is mostly generated by the anode potential, and wherein low cost IC drivers may be employed due to low voltage/power requirements of the display;

(ii) a novel spacer design permitting the use of high voltages to improve pixel size control, brightness, and energy efficiency, which also permits accurate alignment of emitter and phosphor plates at low cost, as well as facilitating gas pumping and low cost assembly of panels containing emitter structures of the invention;

(iii) a packaging design which permits minimum peripheral areas to be utilized for mounting of displays in tight surroundings;

(iv) a method of utilizing field emitters in the display are power supplies and circuitry to minimize display cost and overall volume;

(v) a non-lithographic patterning process for emitters; and (vi) a virtual column field emitter structure comprising an emitter or gated emitter with conductive columns connecting the emitter to an underlying resistor or conductor structure formed by chemical or dopant modification of portions of an underlying layer.

As used herein, the reference to a layer, film, or structural element being "on" another layer, film, or structural element will be understood to mean either (i) that the first moiety is deposited or otherwise formed directly (in contiguous fashion) on the second moiety, or (ii) that the first moiety is deposited or otherwise formed over (in non-contiguous fashion) the second moiety with one or more intervening layers, films, or other structural elements between the first and second moieties.

Other aspects and features of the present invention will be more fully apparent from the ensuing disclosure and appended claims.

BRIEF DESCRIPTION OF THE DRAWINGS

FIGS. 7–12 the steps in a multi-step process for forming a field emitter structure according to another embodiment of the present invention, comprising the formation of a vertically conductive resistive layer, as formed via sputter technique.

FIGS. 61–70 illustrate steps in a multi-step process for forming a field emitter structure according to yet another embodiment of the invention, to form a vertical resistive layer under groups of emitters.

FIG. 71 is a top plan view, FIG. 72 is a side elevation view, and FIG. 73 is an end elevation view of an open frame structure which may be usefully employed in making panel displays according to the present invention.

FIG. 105 is a top plan view of a portion of a display panel according to an embodiment of the present invention, showing the alignment of spacer elements with respect to alternating strips of red, green, and blue phosphors. FIGS. 106a and 106b are sectional elevation views of a flat panel display according to one embodiment of the invention. wherein FIG. 106a shows a dielectric spacer frame having a gate structure on one interior surface thereof, and FIG. 106b shows the device of FIG. 106a wherein the gate structure has a gettering material deposited thereon. FIG. 110 is a top plan view of a block field emitter array. FIG. 111 is a top plan view of a sub-group pixel cell field emitter array. FIG. 112 is a sectional elevation view of an emitter structure according to a further embodiment of the invention. FIG. 113 is a sectional elevation view of yet another field emitter structure according to the invention.

DETAILED DESCRIPTION OF THE INVENTION, AND PREFERRED EMBODIMENTS THEREOF

Figure 1:
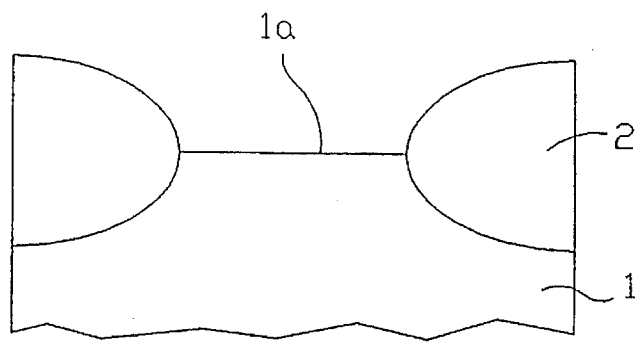
FIGS. 1–6 illustrate the steps of a multi-step process for forming a field emitter structure according to one embodiment of the present invention.

The present invention comprises the discovery that highly efficient vertical emitter structures can be readily and economically fabricated using inexpensive large area thin film technology, e.g., sputtered thin film techniques, thereby taking advantage of the inherent low capacitance and breakdown voltage resistance benefits of column emitter structures, while enabling commercial mass produceability to be attained for vertical emitter structures for applications such as video display panels, vacuum integrated microcircuits, and electron guns.

In the ensuing description, the same reference numerals are employed to refer to corresponding or like elements throughout.

FIGS. 1–6 illustrate the steps of a multi-step process for forming a field emitter structure according to one embodiment of the invention.

By the method illustrated in FIGS. 1–6, a highly efficient structure for providing focused beams of electrons is formed. Such structure does not require separate alignment of the electron emitter base and tip to the remainder of the structure. Accordingly, all lenses, extraction electrodes, and the emitter itself are inherently aligned to one another in the field emitter structure. The lenses, extraction electrodes, and deflection electrodes comprise alternating conductor and insulator layers formed on a suitable substrate, such as for example a semiconductor or single crystal substrate. The emitter element itself is formed on the substrate and may suitably comprise a pointed section of the substrate having a conductive layer thereon. Although the invention is predominantly illustrated hereinafter with reference to embodiments comprising a columnar vertical emitter structure, featuring a sharpened tip, it will be recognized that the emitter structure of the invention may be widely varied, and that in some instances the emitter element may be formed as a knife edge-shaped element providing a two-dimensional line source of emitted electrons, as opposed to a focused stream or beam of electrons emitted from a pointed or sharpened tip structure of a columnar emitter.

The emitter tip structure may for example be produced using a self-aligned reactively formed silicon dioxide mask on a silicon substrate at the bottom of a beam line previously etched through a multi-layer electrode. The mask thus formed covers the silicon at the bottom of the beam line, following an isotropic etch back of a silicon dioxide layer surrounding the opening. The exposed silicon may then be isotropically etched to produce the emitter point or knife etch centered in the beam line.

More specifically, and in reference to FIG. 1, on a substrate 1 such as a single crystal material, islands 1a are formed in a deposited dielectric 2, by suitable means and methods conventionally employed in the microelectronic industry. For example, a layer of dielectric material may be deposited, followed by etching of the dielectric to expose the islands 1a. Alternatively, the dielectric 2 may be pattern deposited on the substrate 1.

Figure 2:
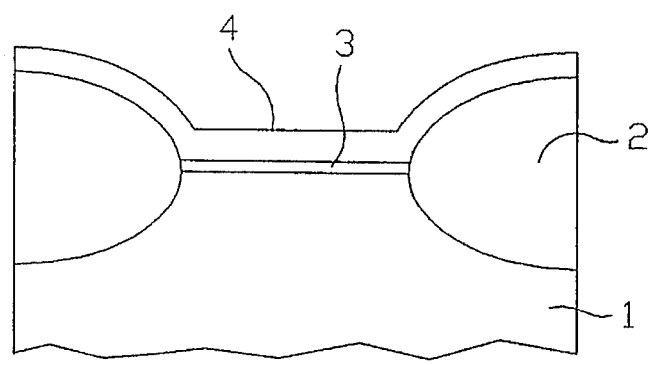
Figure 3:
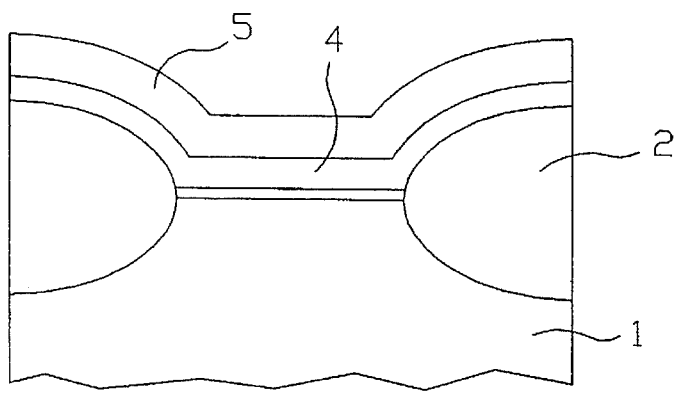

The exposed island 1a of semiconductor material then is oxidized to form a thin oxide layer 3, following which conducting material 4 is deposited across the exposed dielectric 2 and thin oxide layer 3, as shown in FIG. 2. Over such layers is deposited an insulating material 5 as shown in FIG. 3.

Figure 4:
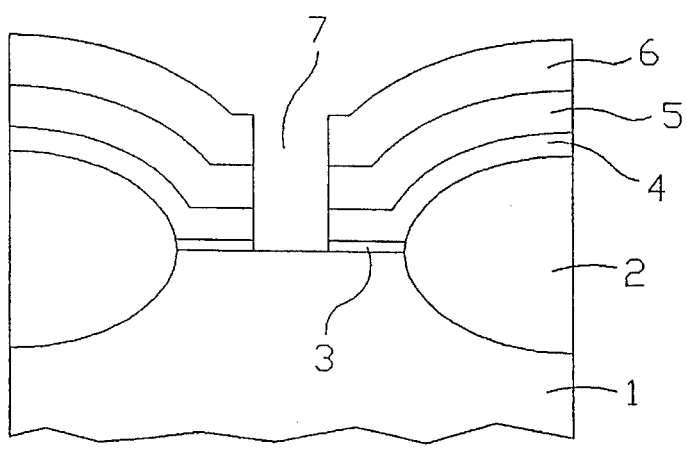
Figure 5:
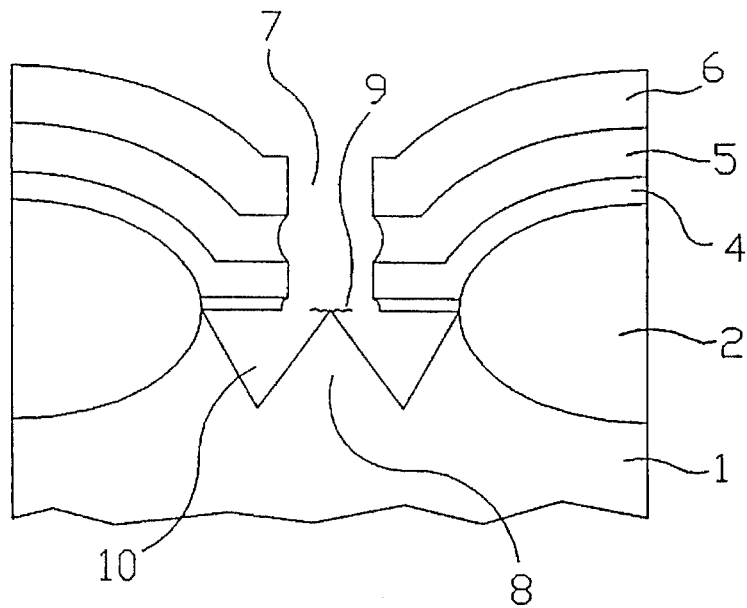

A deflector conductor then is deposited on insulator 5, followed by deposition of a trilayer resist material thereover, the deflector conductor and resist layer being represented by layer 6 in FIG. 4. By subsequent patterning and etching of a transfer pattern through the resist layer 6, and etching the structure layer by layer down through the oxide layer 3 to the substrate surface, a structure of the type shown in FIG. 4 is formed, wherein central well 7 defines the locus of the subsequently formed emitter tip. At the base of the well on the surface of the substrate 1, an etch-resistant layer is deposited, but not over the side walls of the oxide layer 3 at the base of the opening. Next, the oxide layer 3 is etched to expose a ring of silicon at the bottom edge of the opening, following which an etching of the substrate 1 is carried out, e.g., by a crystallographic ethylene diamine paracatechol (EDPH) etch of the silicon ring to form a point or knife etch structure 8, surrounded by cavity 10, and with the etch-resistant layer 9 remaining at the upper extremity of the tip 8.

Figure 6:
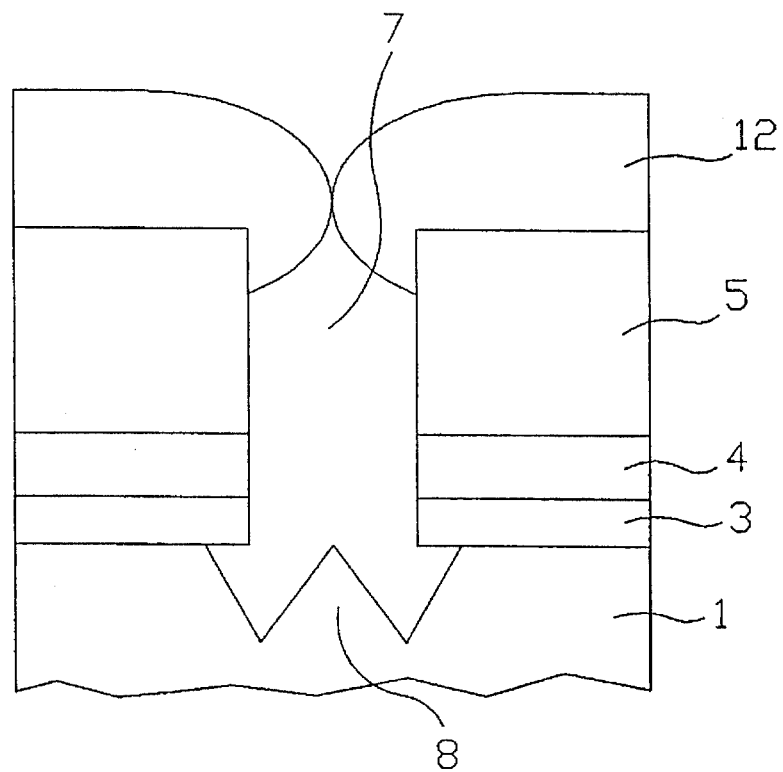

The etch-resistant layer then is removed, and the structure shown in FIG. 6 may be formed therefrom, in which the semiconductor substrate 1 has a point-shaped or knife etch-shaped tip 8, with a plurality of alternating conductor and insulator layers formed on the substrate except at the cavity 7 overlying the tip 8, comprising insulator 3, extractor electrode 4, and insulator 5, with a surface conductor layer 12 deposited over such structure to form the field emitter device as shown in FIG. 6, in which the surface conductor material is suitably self-pumping in character, to produce vacuum in the well 7 which is overlaid by the surface conductor layer 12.

Although columnar field emitter structures are known in the art, as discussed in the "Background of the Invention" section hereof, the field emitters of the present invention afford low capacitance, high-speed operation, self-alignment of the gate to emitter, and superior defect insensitivity due to the provision of a thick dielectric between the gate and emitter backplane. The field emitter architecture and appertaining manufacturing methods of the present invention enable the simple, effective, and economical fabrication of field emitter structures, utilizing conventional equipment known to and conventionally employed by those skilled in the art of thin film processing.

The field emitter structures of the present invention can be fabricated using inexpensive and large area sputtered thin-film technology, while concurrently providing the low capacitance and breakdown voltage resistance characteristics of column emitter construction. Self-alignment of the gate to emitter is achieved with a smaller gate to emitter gap than is common for other lift-off gated emitter structures. Smaller emitter-gate gap in turn permits lower turn-on voltage operation, since the small gap increases the electric field between the gate and emitter at a given voltage, relative to larger gap structures.

The field emitter structures of the present invention may advantageously use sputtered or evaporated dielectric, and self-aligned sputtered or evaporated gate metal, to minimize the gate to emitter gap and provide for low cost fabrication. DC or RF bias sputtering may be employed to adjust the size of the emitter to gate gap to a desired value. A spin on layer may optionally be employed to planarize the substrate surface prior to such sputter deposition. The sputter embodiment of the field emitter structure in the present invention is unique in the close proximity of the self-aligned gate, relative to prior art structures. Evaporated dielectric processes, using dielectric materials such as $SiO_2$, $SiO$, or $Al_2O_3$, can also closely approximate such emitter-gate gap by increasing background bias pressure to values in the range of $>10^{-4}$ torr. This is a much higher pressure level than conventionally is employed in thin film formation evaporation processes.

The field emitter structures of the invention may advantageously utilize sputtered doped polysilicon as an emitter material, which is optionally coated or impregnated with a low work function material such as barium or diamond. Alternatively, other etchable conductive materials such as tantalum may be employed. The film is deposited on a resistive layer overlying a conductor, with proper adjustment of the DC or RF bias level permitting low resistivity films and stress control to be readily achieved. Subsequent to etching of emitter conductor pedestals, overall stress on the substrate is relieved, and process conditions of widely varying character may be employed, depending on the specific sputter system employed.

In the emitter structures of the invention, the column or tip structures may be placed on a high resistivity layer such a cermet material. Conduction through such high resistance film is vertical, and the film is of unexpectedly high resistivity. Such structure eliminates the need for an extra mask. Although many film compositions and materials may be usefully employed in the broad practice of the invention, an illustrative film material comprises a chromium/silicon dioxide film composition containing from about 55% to 65% by weight chromium, and from about 45% to about 35% by weight silicon dioxide, at a film thickness on the order of about 2 micrometers, which yields resistances in the range of 0.01–20 G$\Omega$. Under typical operating conditions, such film will not break down below voltage levels on the order of about 150 V when the film is properly formed. Thinner films may be usefully employed in lower voltage applications. Resistance of the film may be widely varied, e.g., over three orders of magnitude, via modification of the background sputtering gas environment, deposition pressure, deposition temperature film thickness, bias conditions, and post deposition thermal cycles employed. The resistor layer may be used as an etch stop and left substantially intact, and such layer may also be etched to form isolated column resistors under the emitters.

FIGS. 7–12 illustrate steps of a multi-step process for forming a field emitter structure according to one embodiment of the invention, utilizing sputter techniques.

Figure 7:
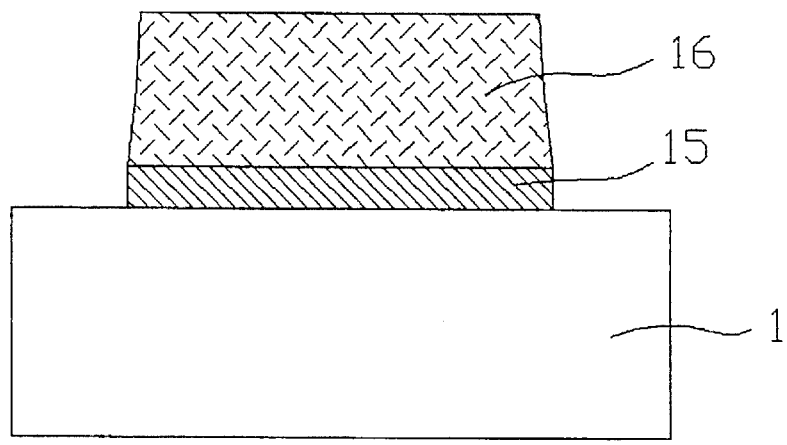
Figure 8:
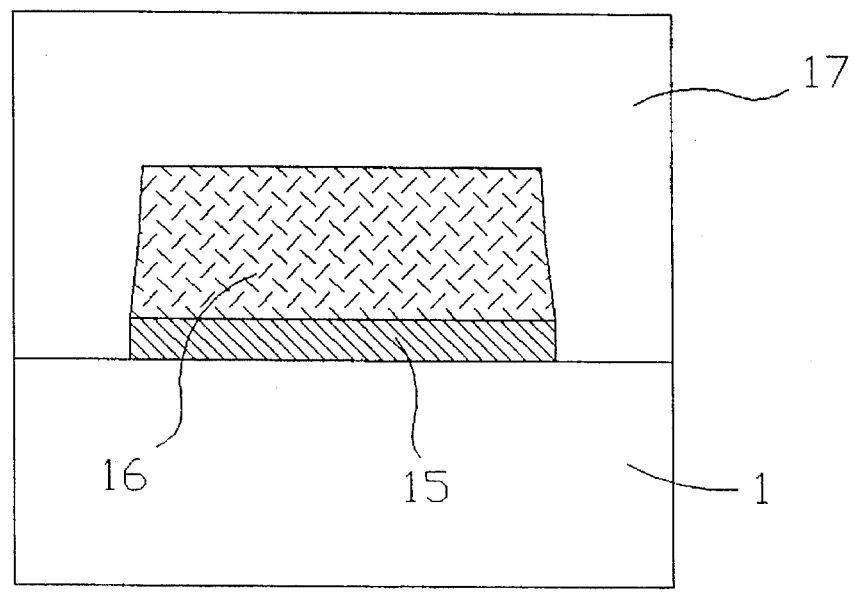

Referring to FIG. 7, the substrate 1 first has an emitter conductor 15 deposited thereon, such as vapor-deposited chromium/copper/chromium deposited layers. On conductor 15 a resistor 16 is deposited, and the conductor and resistor then are patterned and etched, following which a thin film, e.g., about 2–4 micrometers in thickness, of TiW/Ta/Si is deposited as layer 17 in FIG. 8. The TiW/Ta/Si film then is masked with a suitable masking material layer 18. Thereupon, the emitter mask is patterned, and the TiW/Ta/Si layer is isotropically etched, yielding the structure shown in FIG. 9.

A cathodically protective sacrificial material, SiO$_2$ then is deposited as layer 19 shown in FIG. 10.

Figure 11:
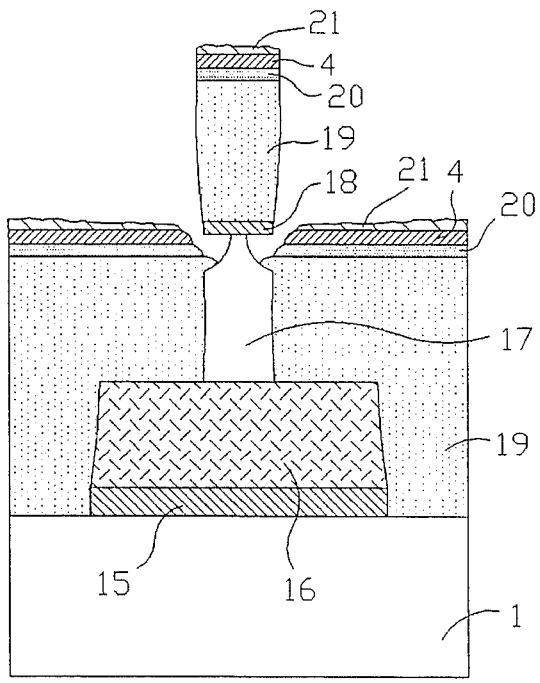
Figure 12:
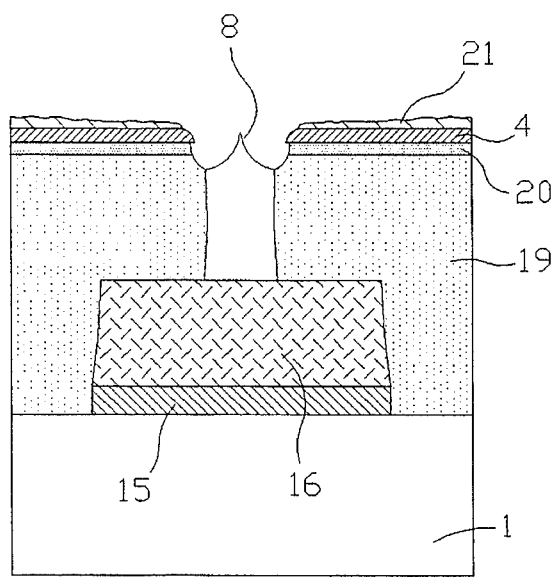

Next, as shown in FIG. 11, a self-aligned deposition of insulator material 20 is carried out, to form a layer of insulator material such as SiO, on which a layer of extractor metal 4 is deposited, following which an upper insulator layer 21 is deposited.

Subsequently, the "cap" comprising layers 18, 19, 20, and 4, is removed by isotropic etching of the TiW, to yield the emitter column 17 having isotropically etched tip 8 at its upper extremity, circumscribed by the layers including extractor electrode layer 4.

FIGS. 13–18 illustrate steps of a multi-step process for forming a field emitter structure according to a further embodiment of the invention.

Figure 13:
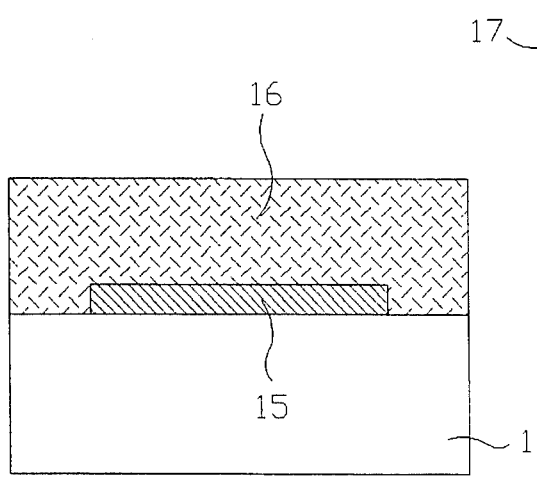
FIGS. 13–18 illustrate steps in a multi-step process for forming a field emitter structure according to a further embodiment of the invention, involving the formation of a vertically conductive resistor in each emitter element of a multi-element array.
Figure 14:
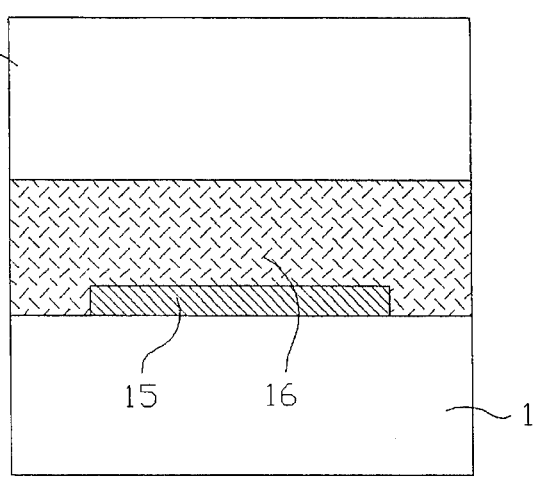

Referring first to FIG. 13, an emitter conductor 15 is deposited on the substrate 1, and the emitter conductor is patterned and etched. Resistor 16 then is deposited, following which a layer 17 of TiW or other suitable material such as tantalum or silicon is deposited at a film thickness on the order of 2–4 micrometers, as shown in FIG. 14.

Figure 15:
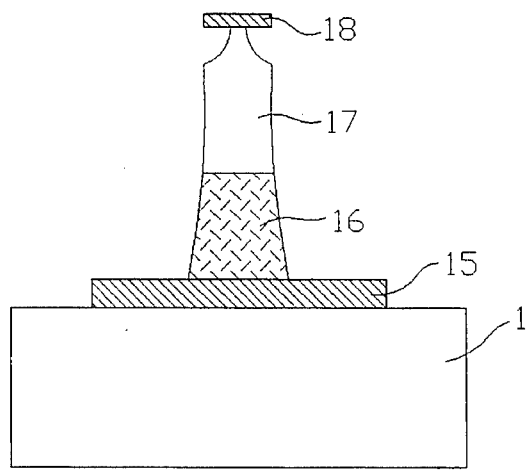
Figure 16:
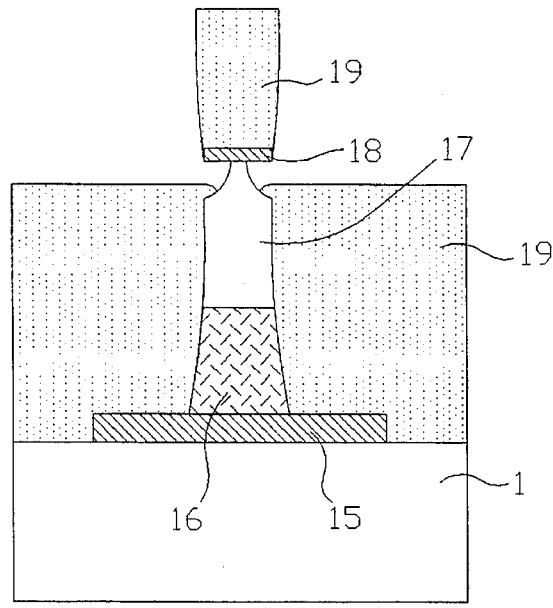

Next, as shown in FIG. 15, a mask material deposited on the TiW layer 17 is isotropically etched, together with the resistor. The emitter mask 18 may be of any suitable material. As shown in FIG. 16, a layer 19 of SiO$_2$ then is deposited, as shown in FIG. 16.

Figure 17:
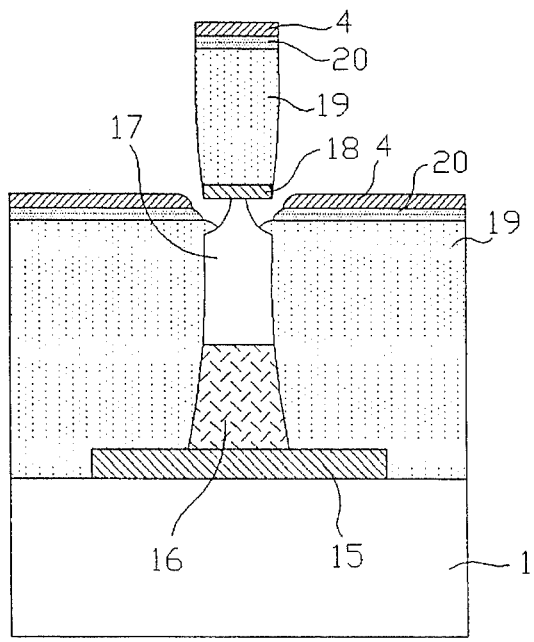
Figure 18:
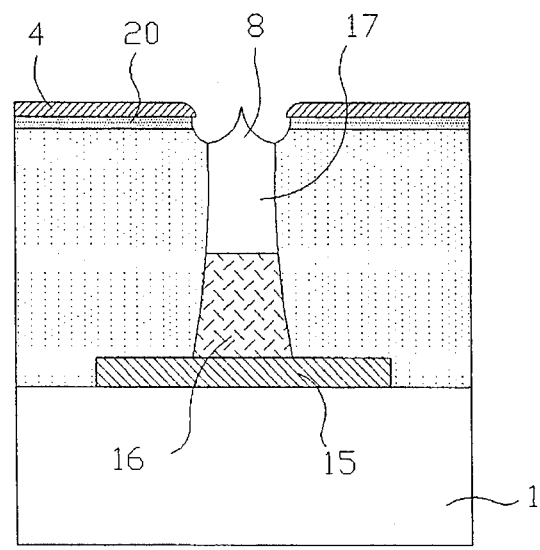

Next, as shown in FIG. 17, a self-aligned deposition of insulator 20, e.g., SiO, is carried out, followed by deposition of extractor metal layer 4. Thereupon, an isotropic etch of the TiW material is carried out, with concurrent etch back of the insulator 19 and insulator 20, yielding the emitter tip 8 shown in FIG. 18.

FIGS. 19–29 illustrate a multi-step process for forming a field emitter structure according to another embodiment of the invention, utilizing chemical vapor deposition techniques.

Figure 19:
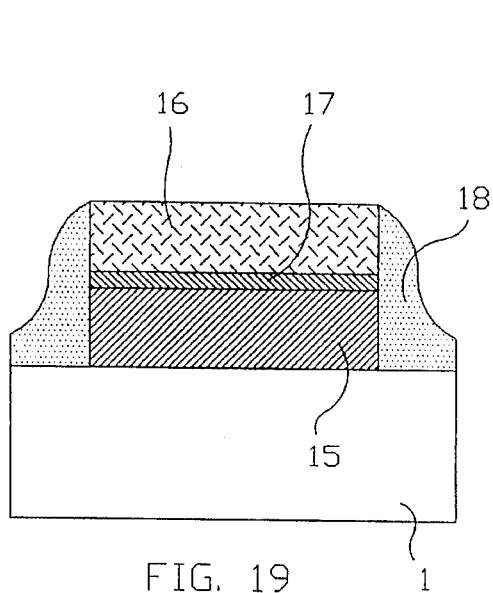
FIGS. 19–29 illustrate steps in a multi-step process for forming a field emitter structure according to yet another embodiment of the invention, involving chemical vapor deposition formation of a vertically conductive resistive layer.

As shown in FIG. 19, a substrate 1 has deposited thereon an emitter conductor 15, which may for example comprise AlCu (4%) and Si (1%). On the emitter conductor 15 is deposited TiW in a layer 17, following which resistor 16 is deposited. The structure then is patterned and etched to yield the structure shown in FIG. 19.

Figure 20:
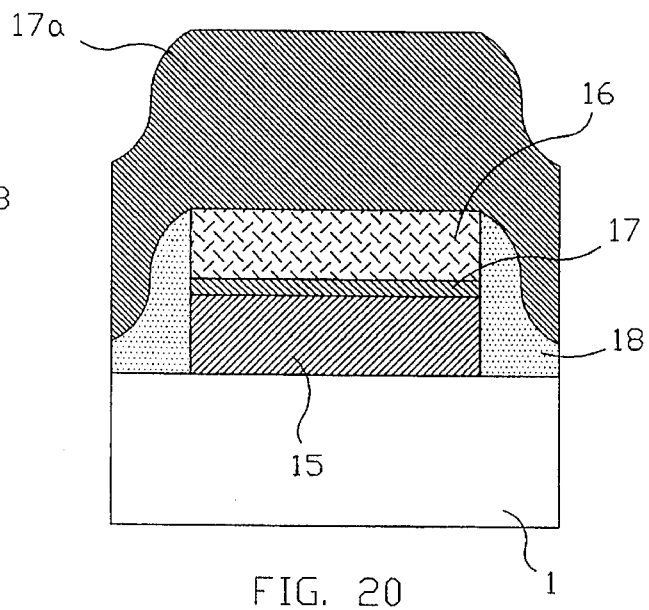
Figure 21:
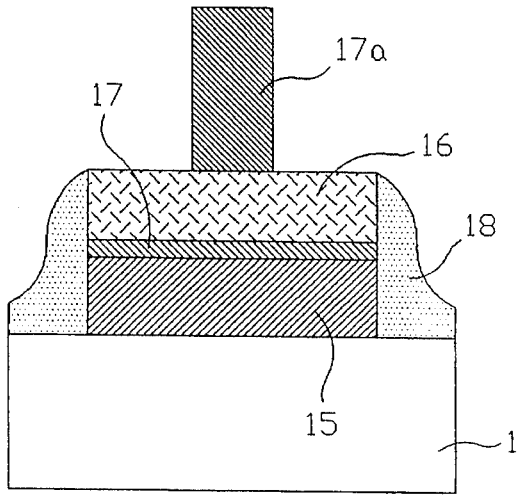
Figure 22:
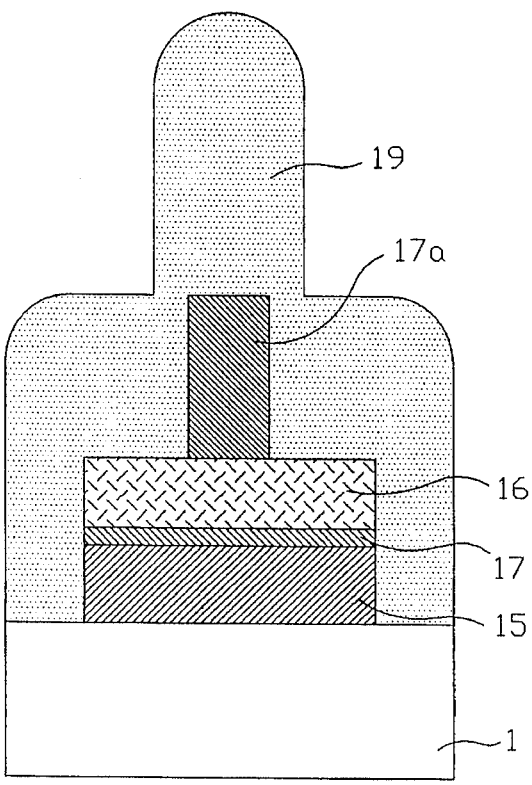

TiW at a thickness on the order of about 4 micrometers, then is deposited in layer 17a, as shown in FIG. 20. After subsequent patterning of the emitter mask, the TiW layer 17a is etched to yield the structure shown in FIG. 21. Next, the aluminum emitter mask 18 is removed, and a layer 19 a cathodically protective sacrificial of SiO$_2$ is deposited.

Figure 23:
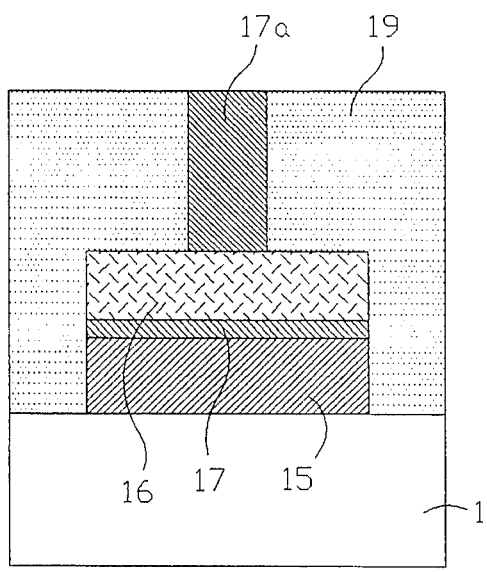
Figure 24:
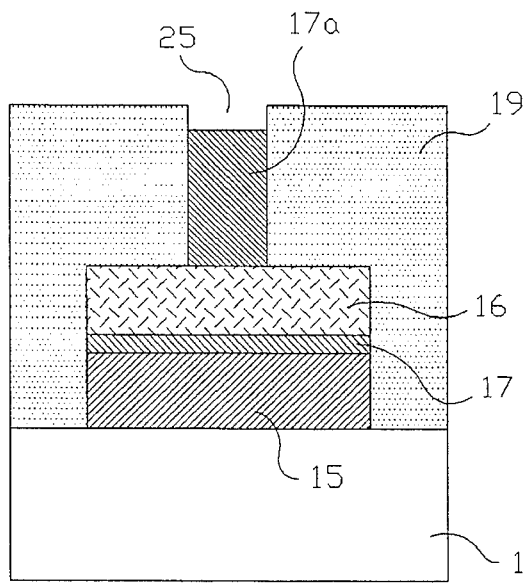
Figure 25:
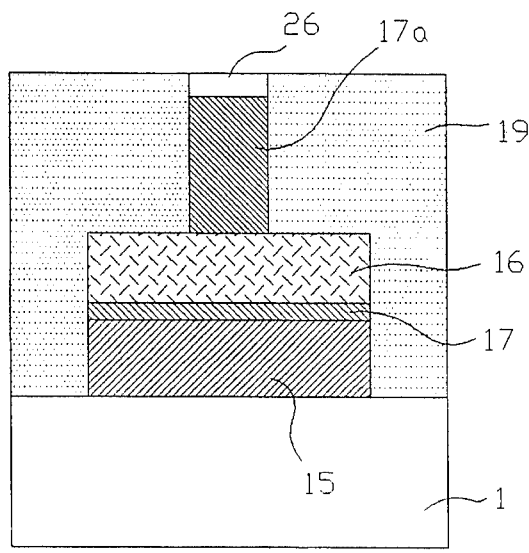

The oxide then is planarized by polishing, to yield the structure of FIG. 23. Next, the TiW column 17a is etched back, e.g., a distance of about 0.5 micrometer, to yield the structure shown in FIG. 24, following which the resulting cavity 25 is filled with a nitride insulator material 26, and the insulator is etched back to yield the structure shown in FIG. 25.

Figure 26:
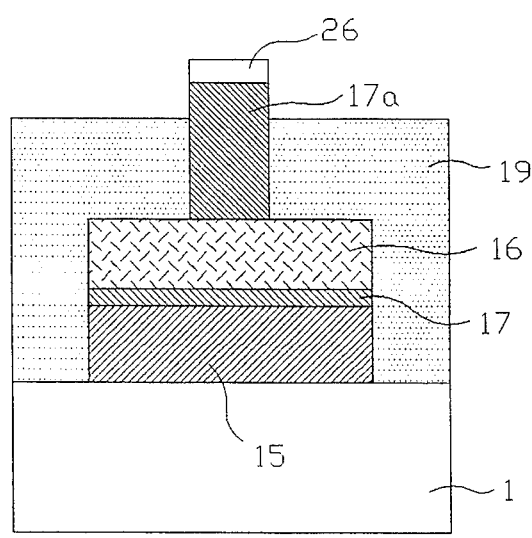
Figure 27:
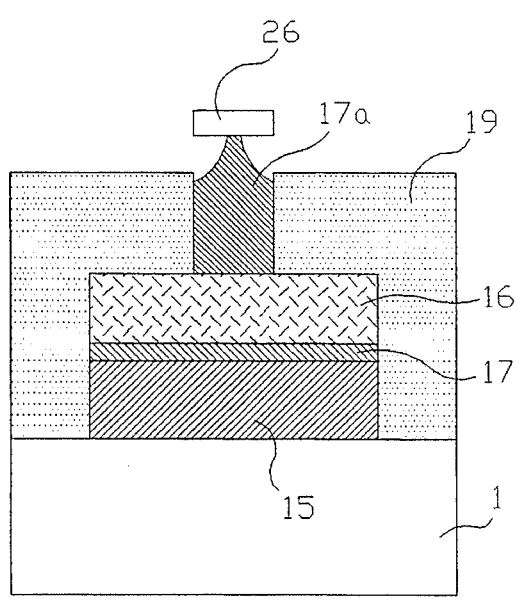
Figure 28:
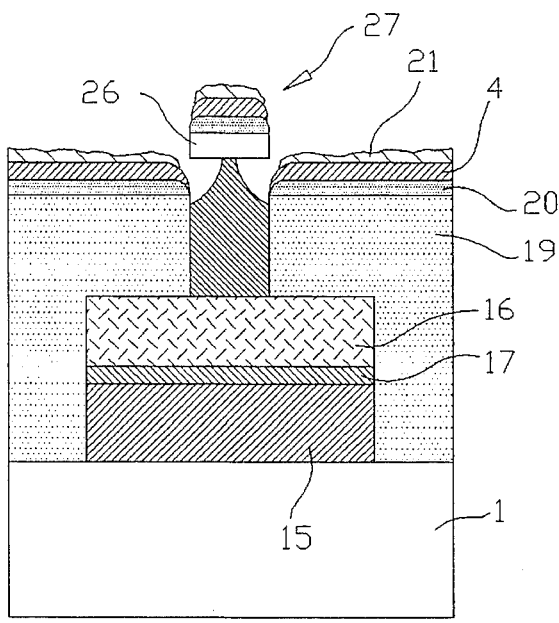
Figure 29:
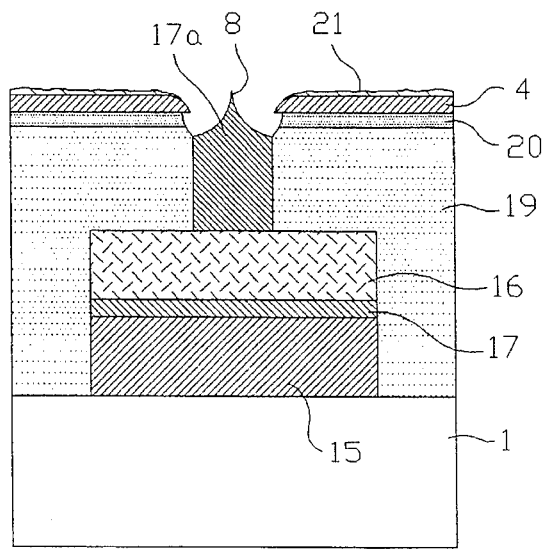

Following etch back of the oxide 19, yielding the structure of FIG. 26, an isotropic etch of the TiW column is carried out to form the emitter column 17a shown in FIG. 27. A self-aligning deposition of insulator 20, extractor metal 4, and upper insulator 21 then is carried out to yield the structure of FIG. 28, following which the cap 27 is removed by isotropic etching of column 17a, yielding the emitter tip 8 and the structure as shown in FIG. 29.

In the foregoing construction, doped silicon or other suitable material, may be employed in place of TiW.

FIGS. 30–41 (a, b, c) illustrate steps of a multi-step process for forming a field emitter structure according to a flip transfer process embodiment of the invention.

Figure 30:
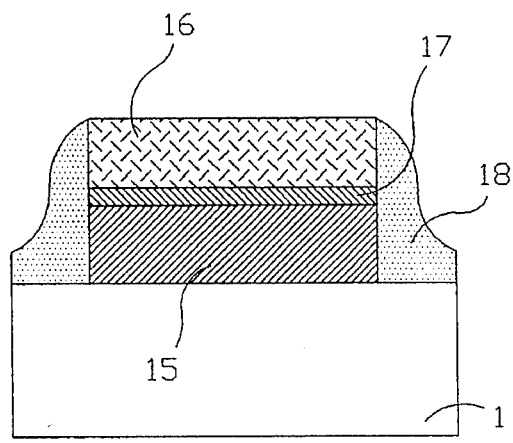
FIGS. 30–41 (a, b, c) illustrate steps in a multi-step process for forming a field emitter structure according to a flip transfer process embodiment of the invention.

As shown in FIG. 30, a substrate 1 has deposited thereon an emitter conductor 15, such as AlCu (4%) and Si (1%). On the emitter conductor 15 is deposited TiW in a layer 17, following which resistor 16 is deposited. The structure then is patterned and etched to yield the structure shown in FIG. 19, comprising aluminum emitter mask 18.

Figure 31:
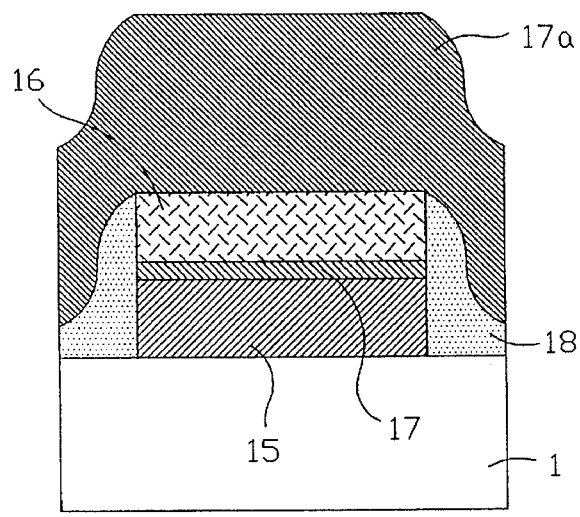
Figure 32:
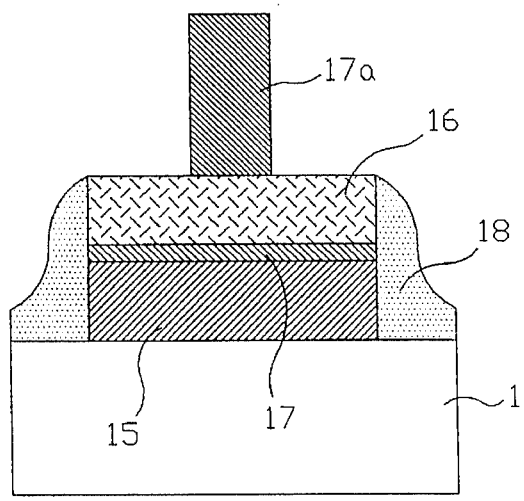
Figure 33:
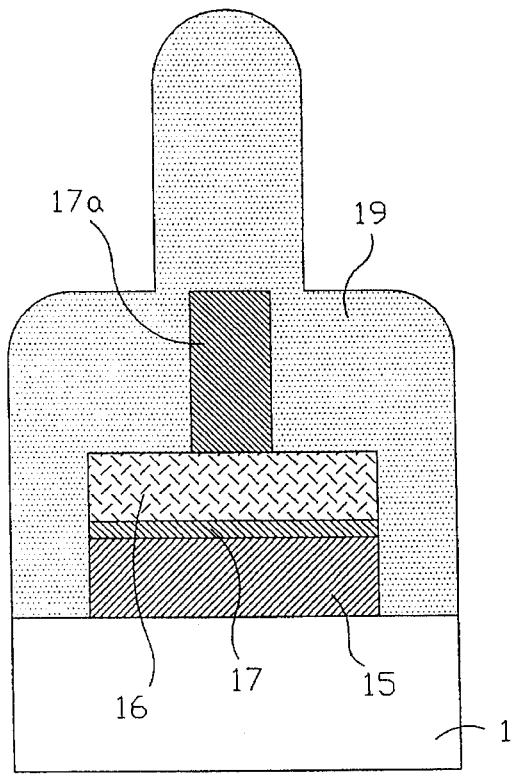

TiW at a thickness on the order of about 4 micrometers then is deposited in layer 17a, as shown in FIG. 31. After subsequent patterning of the emitter mask, TiW layer 17a is etched to yield the structure shown in FIG. 32. The aluminum emitter mask 18 then is removed, and a layer 19 of SiO$_2$ is deposited.

Figure 34:
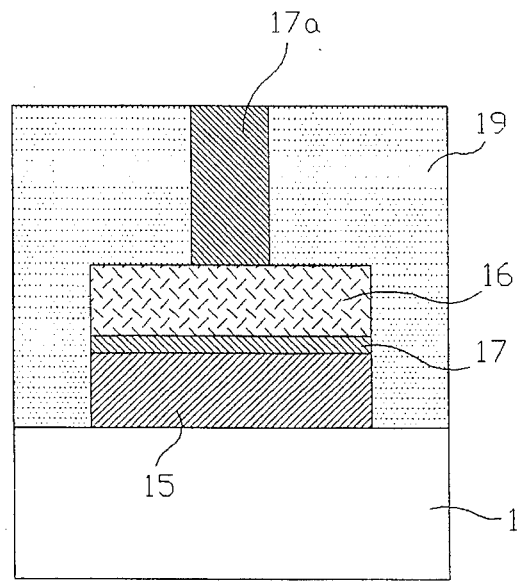

The oxide then is planarized by polishing to yield the structure of FIG. 34.

Figure 35:
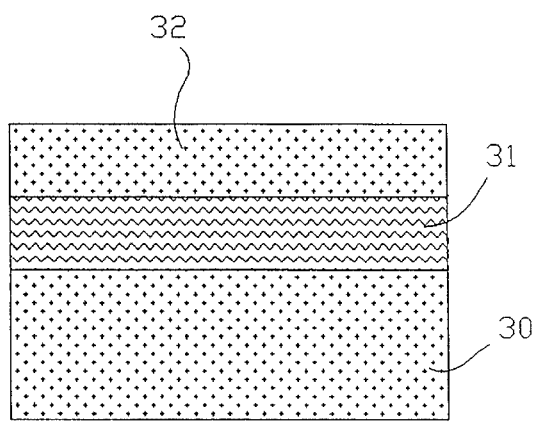

FIG. 35 is a sectional elevation view of a flip structure base including single crystal silicon film 30 coated with intermediate metal layer 31 and overlaid with a Wickle release layer 32. The metal intermediate layer 31 between the silicon film 30 and the Wickle release layer 32 is an optional feature of the flip transfer base, and may in some instances be omitted so that the base structure comprises only the silicon film 30 and the Wickle release layer 32.

Figure 36:
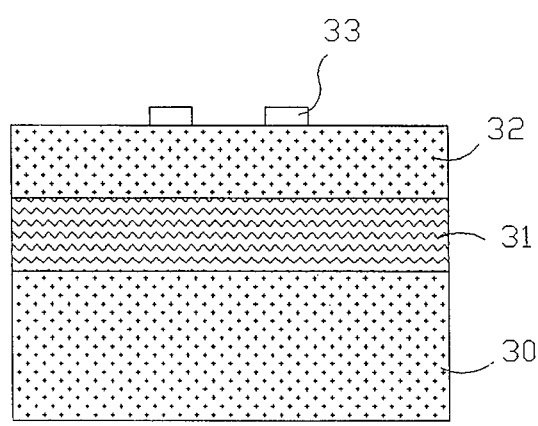
Figure 37:
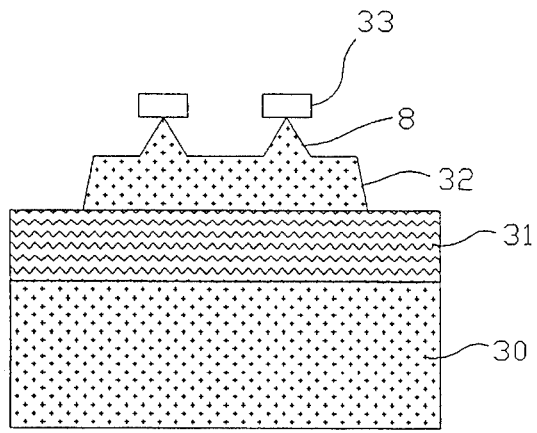

On the Wickle release layer of the flip transfer base is formed an LTO oxide in patterned form as shown in FIG. 36, comprising LTO oxide projections 33 on the Wickle release layer. A pyramidal silicon tip etching step then is carried out with etching of the edge of the silicon film, yielding the structure shown in FIG. 37, comprising emitter tip elements 8. The structure of FIG. 37 then is planarized with insulator 19 and evaporated SiO$_2$ layer 19a and annealed, to yield the structure shown in FIG. 38.

Figure 38:
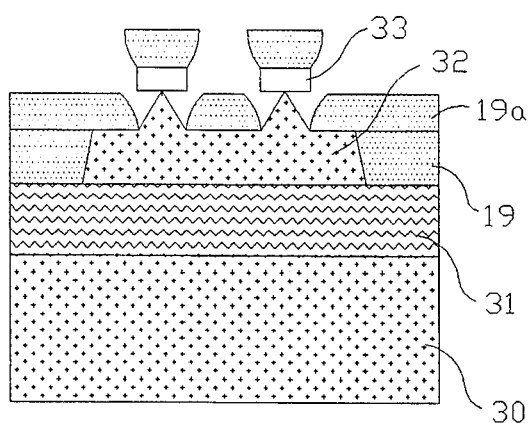
Figure 39:
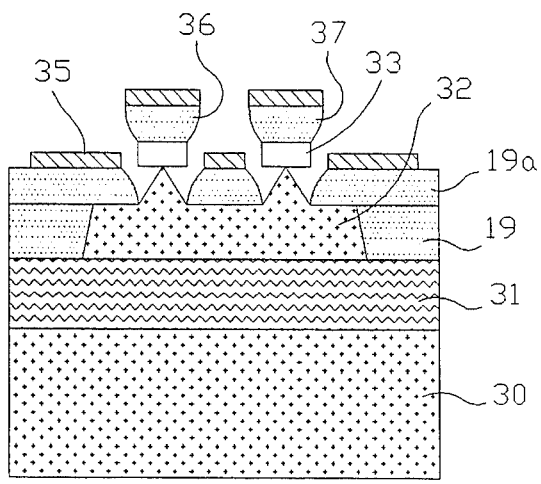
Figure 40:
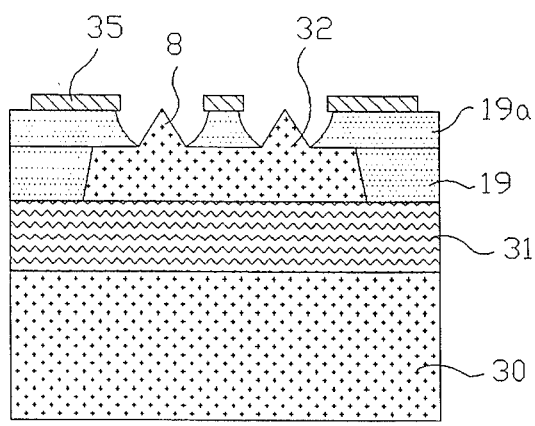

On the structure of FIG. 38 is evaporated SiO/gate metal/ SiO as overlayer 35, shown in FIG. 39, following which the "cap" comprising layers 36 and 37 is removed to yield the emitter tip structure shown in FIG. 40.

Figure 41A:
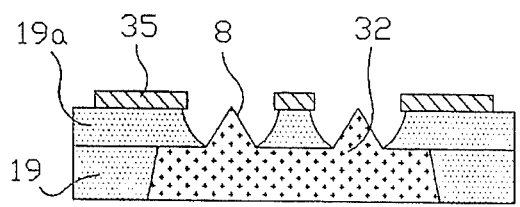
Figure 41B:
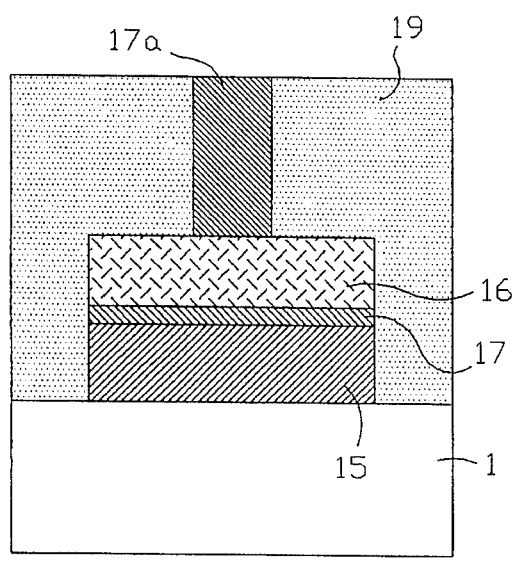
Figure 41C:
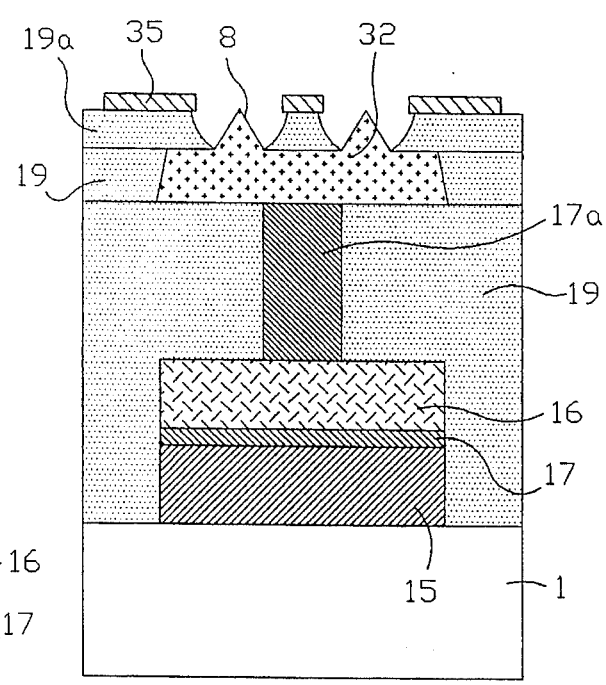

The emitter tip portion of the FIG. 40 structure is detached by removal of the Wickle release layer 32, yielding the gated emitter structure shown in FIG. 41a, which then is mated with the columnar assembly of FIG. 41b (which is identical to the structure shown in FIG. 34), to form an integral laminated structure as shown in FIG. 41c, as the field emitter device.

FIGS. 41–52 illustrate a further multi-step process for forming a field emitter structure according to the invention, involving the formation of a rim element on the column emitter.

Figure 42:
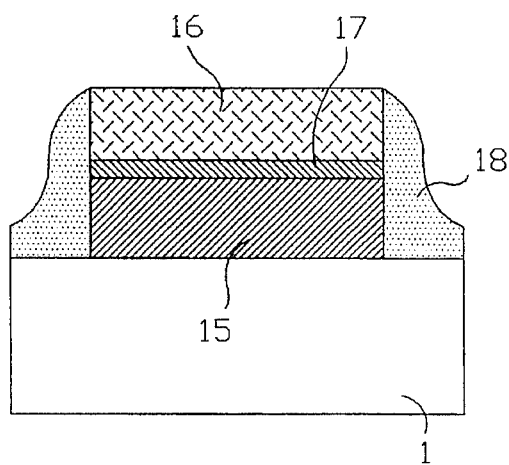
FIGS. 42–52 illustrate a further multi-step process for forming a field emitter structure according the invention, involving the formation of a rim element on the column emitter.

As shown in FIG. 42, a substrate 1 has deposited thereon an emitter conductor 15, such as a conductor comprising AlCu (4%) and Si (1%). On the emitter conductor 15 is deposited TiW in a layer 17, following which resistor 16 is deposited. The structure then is patterned and etched to yield the structure shown in FIG. 19, including aluminum emitter mask 18.

Figure 43:
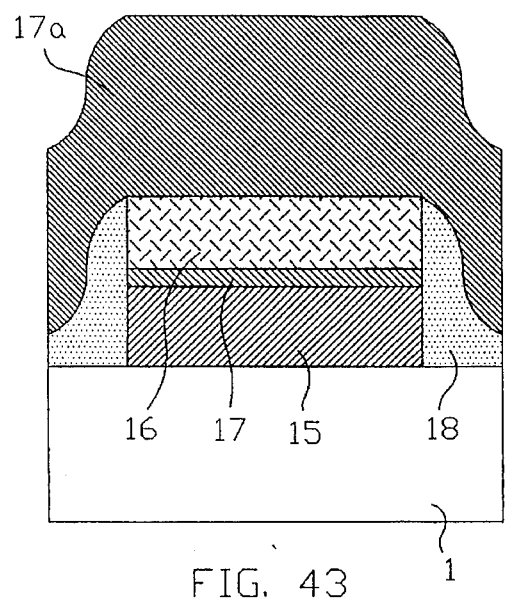
Figure 44:
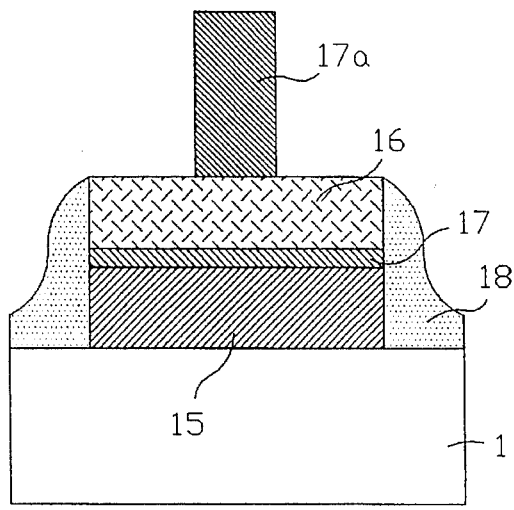
Figure 45:
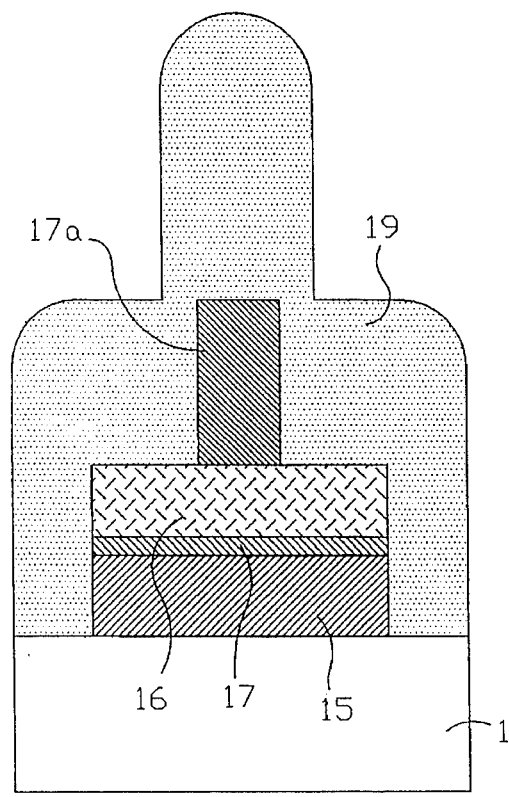

TiW at a thickness on the order of about 4 micrometers then is deposited in layer 17a, as shown in FIG. 43. After subsequent patterning of the emitter mask, the TiW layer 17a is etched to yield the structure shown in FIG. 44. Next, the aluminum emitter mask 18 is removed, and a layer 19 of SiO$_2$ is deposited.

Figure 46:
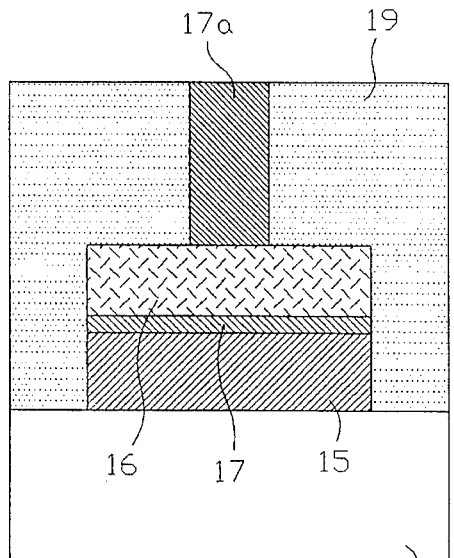
Figure 47:
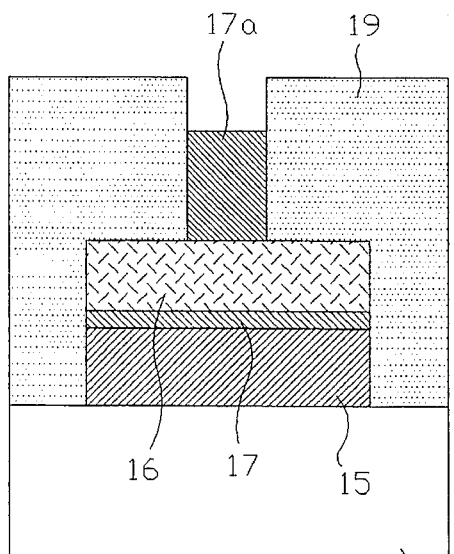
Figure 48:
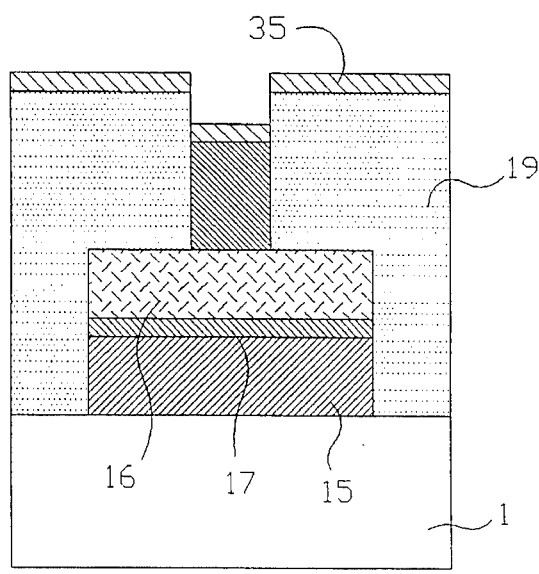

The oxide then is planarized by polishing, to yield the structure of FIG. 46. The TiW column 17a is etched back, e.g., a distance of about 0.5 micrometers to yield the structure shown in FIG. 47, following which a directional deposit of gate metal 35 is effected by appropriate deposition technique, to yield the structure shown in FIG. 48.

Figure 49:
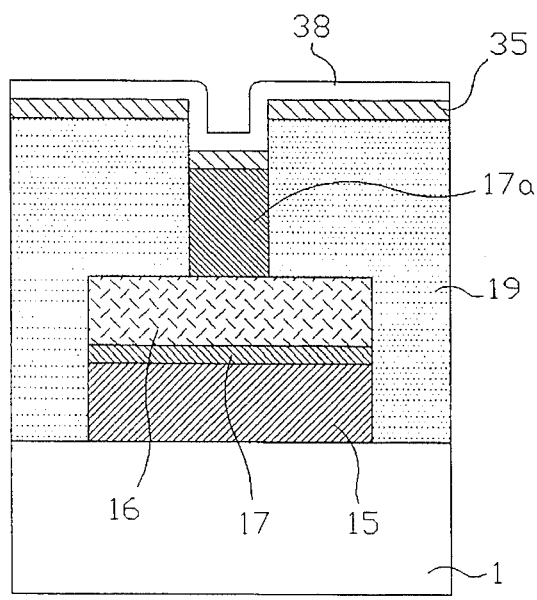
Figure 50:
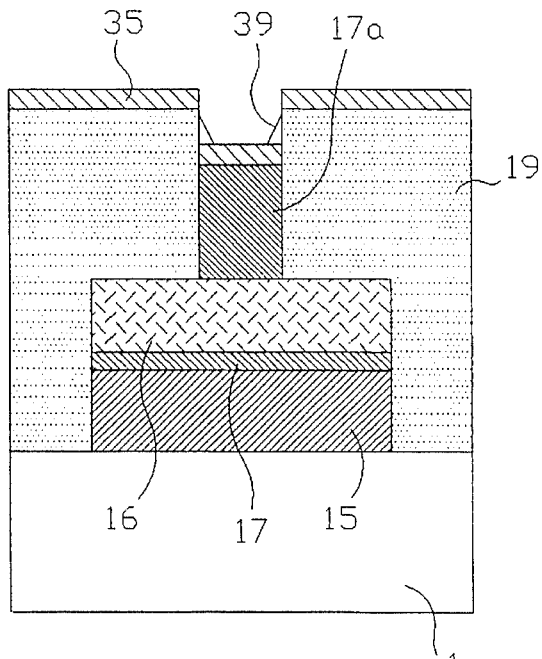
Figure 51:
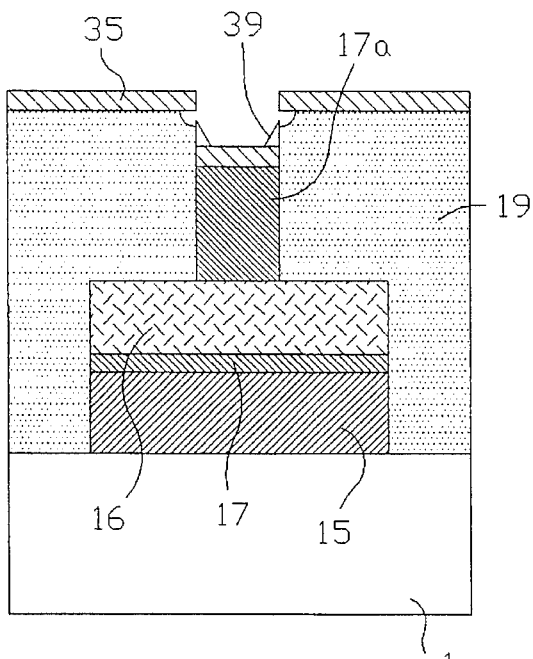
Figure 52:
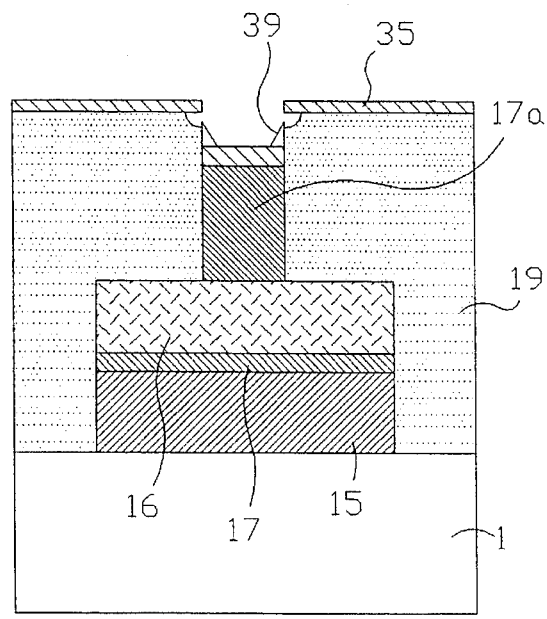

On this structure then is conformally deposited a diamond film 38 by a suitable deposit technique, such as chemical vapor deposition. The resulting structure is shown in FIG. 49. Next, the diamond film is subjected to an anisotropic etching process, to yield the structure shown in FIG. 50, wherein a central cavity above the mesa-shaped body of the emitter column 17a is etched to yield a circumscribing diamond rim 39, as shown in FIG. 50. Next, the insulator 19 is etched back, yielding the structure shown in FIG. 51, and finally, the gate metal layer 35 is etched back to yield the field emitter structure shown in FIG. 52.

FIGS. 53–61 illustrates steps of a multi-step process for forming a field emitter structure according to a still further embodiment of the invention, involving the formation of a resistor at the base of each of the emitter elements.

Figure 53:
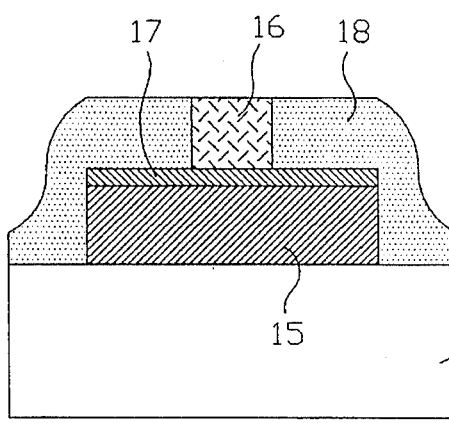
FIGS. 53–61 illustrate steps of a multi-step process for forming a field emitter structure according to a still further embodiment of the invention, involving the formation of a resistor in the base of each emitter element.

As shown in FIG. 53, a substrate 1 has deposited thereon an emitter conductor 15, on which in turn is deposited TiW in a layer 17, following which resistor 16 is deposited, with emitter mask 18.

Figure 54:
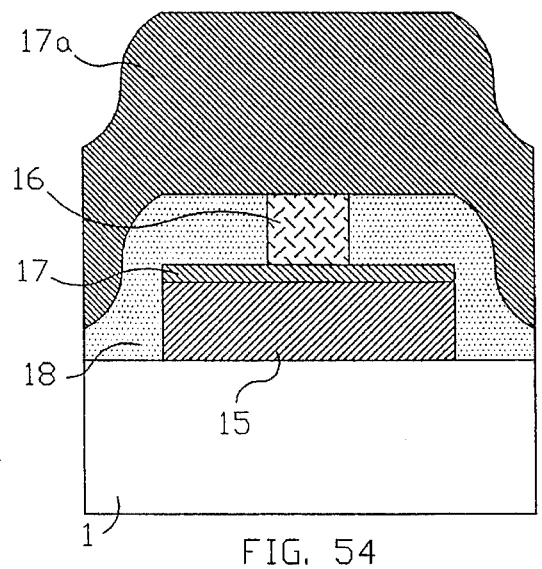
Figure 55:
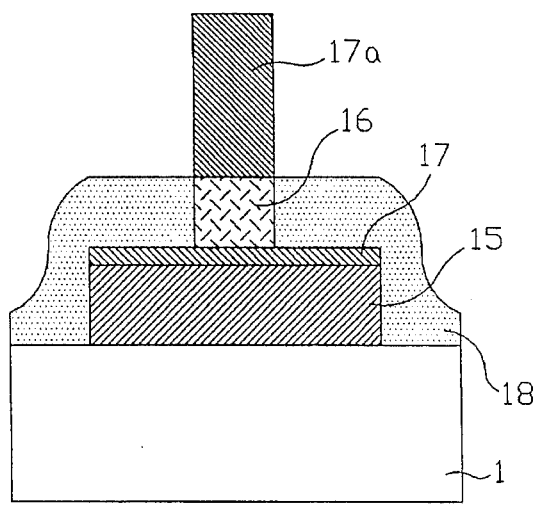
Figure 56:
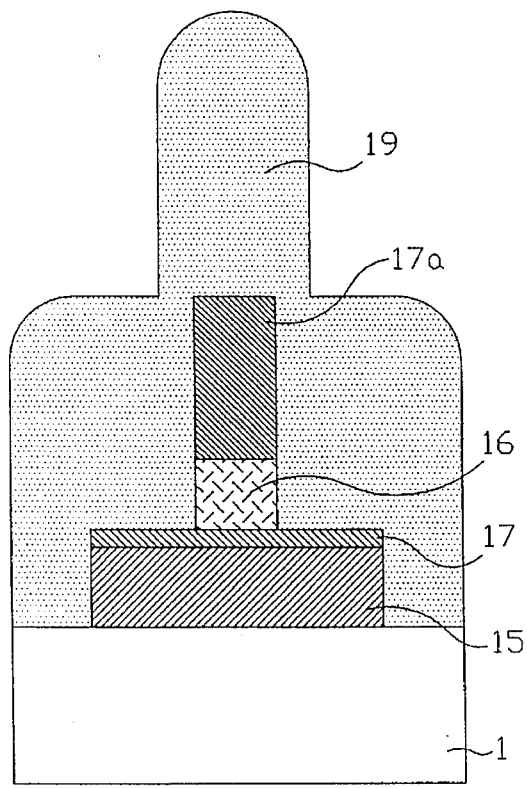

TiW at a thickness on the order of 4 micrometers then is deposited in layer 17a, as shown in FIG. 54. As an alternative to the use of TiW, silicon may be used in the formation of layer 17a. After subsequent patterning of the emitter mask, the TiW layer 17a is etched to yield the structure shown in FIG. 55. Next, the aluminum emitter mask 18 is removed, and a layer of SiO$_2$ is deposited, to yield the structure shown in FIG. 56.

Figure 57:
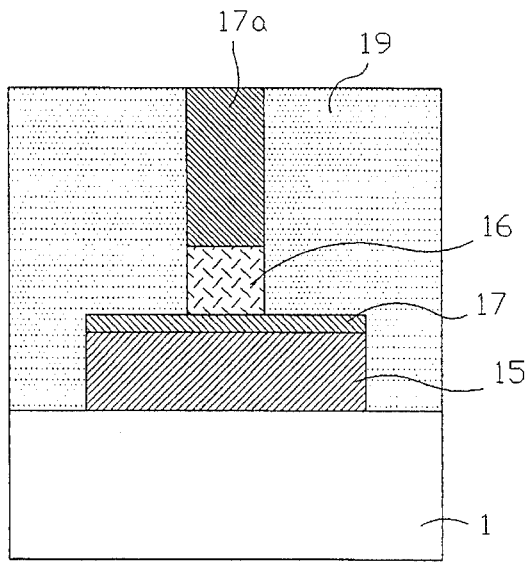
Figure 58:
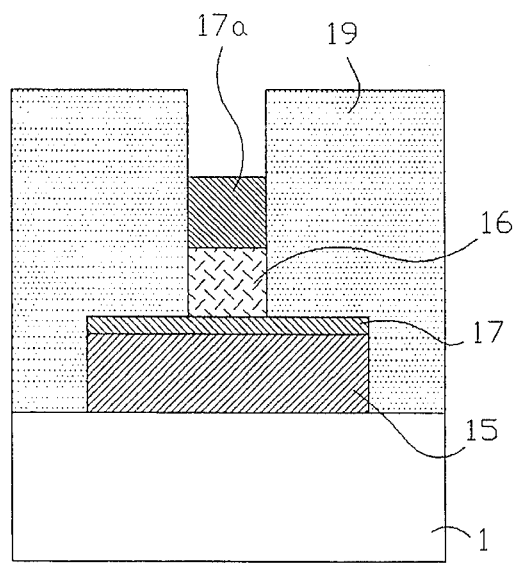

The oxide then is planarized by polishing, yielding the structure of FIG. 57, following which the TiW column 17a is etched back to yield the structure of FIG. 58.

Figure 59:
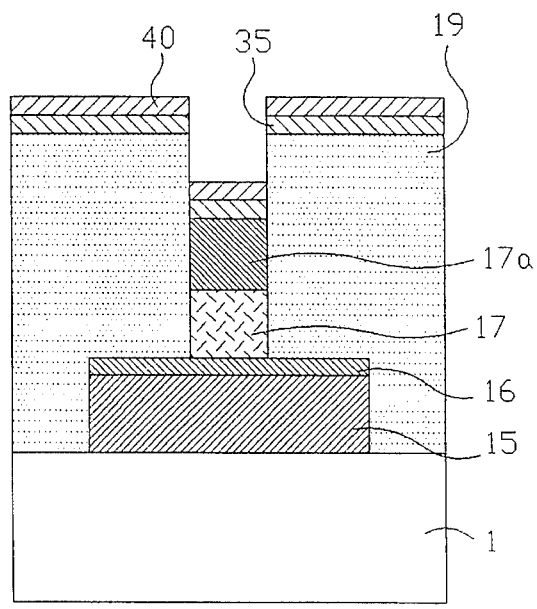

The structure then has deposited thereon a gate metal layer 35 and a release metal layer 40, to produce the structure shown in FIG. 59.

Figure 60:
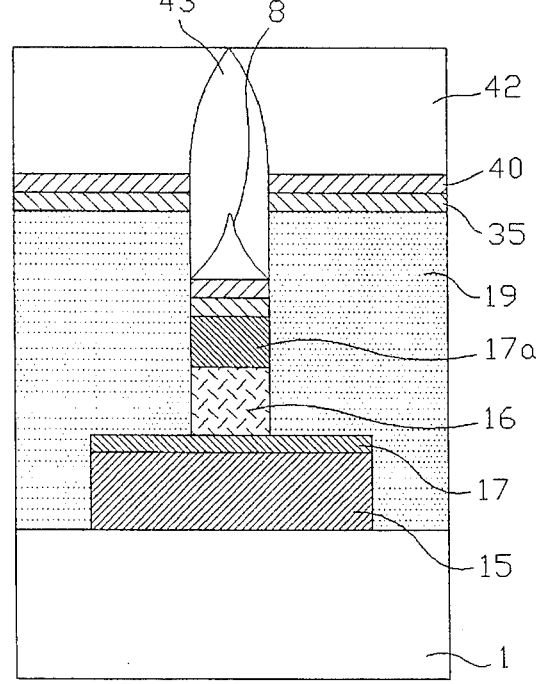

The FIG. 59 structure then is deposited, via directional/ side deposit technique, with an emitter metal 42, to yield the structure shown in FIG. 60, wherein the top emitter metal layer 42 overlies the emitter tip 8, bounding a cavity 43 therebetween.

Figure 61:
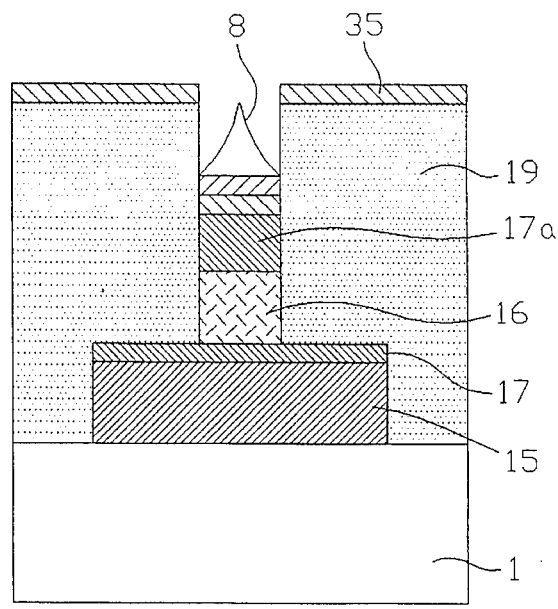

Subsequently, the overlying layer 42 of emitter metal is removed, together with release layer 40, yielding the field emitter structure shown in FIG. 61.

FIGS. 62–70 illustrated steps in a multi-step process for forming a field emitter structure according to yet another embodiment of the invention, to form a vertical resistive layer under groups of emitters.

Figure 62:
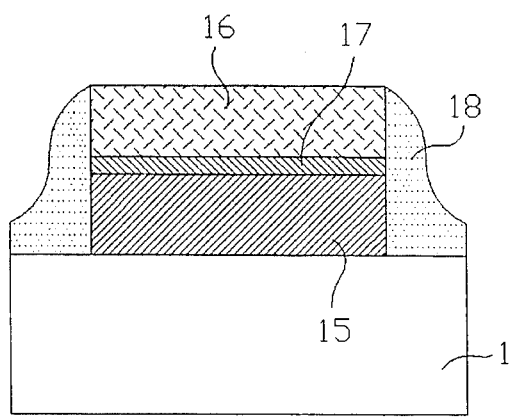

As shown in FIG. 62, substrate 1 has deposited thereon an emitter conductor 15, on which in turn is deposited a TiW layer 17, which then is overlaid with resistor 16, and with an aluminum emitter mask 18.

Figure 63:
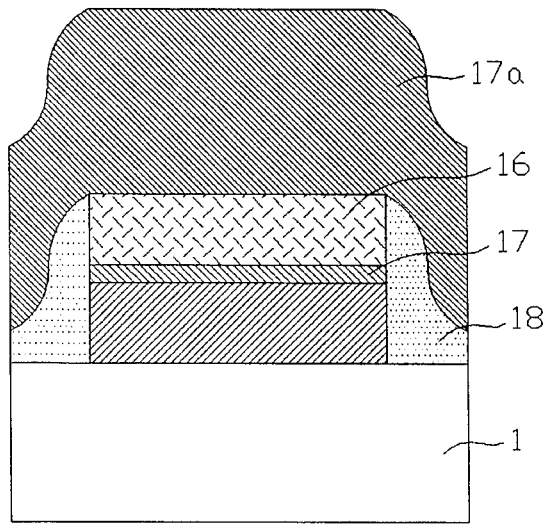
Figure 64:
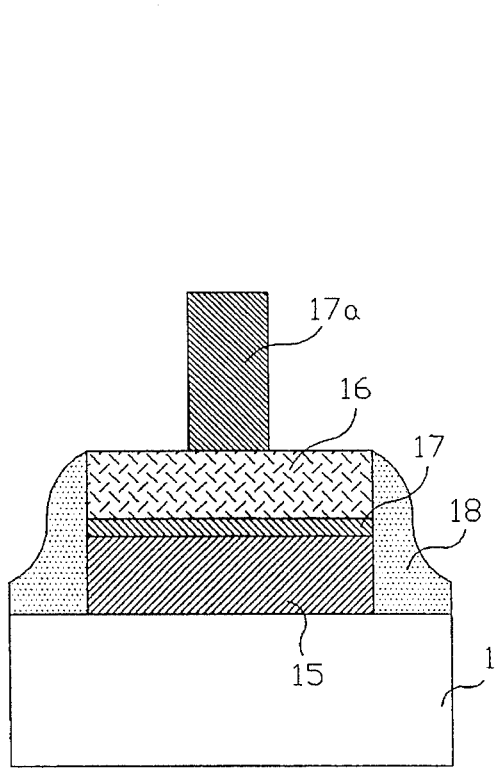
Figure 65:
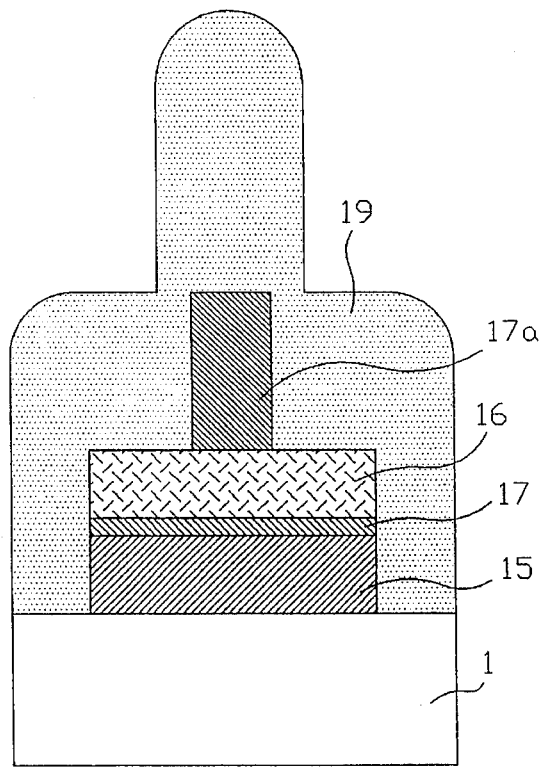

TiW then is deposited in layer 17a as shown in FIG. 63, and after patterning of the emitter mask, the TiW layer 17a is etched to yield the structure shown in FIG. 64. The aluminum emitter mask 18 then is removed, and a layer 19 of SiO$_2$ is deposited, producing the structure shown in FIG. 65.

Figure 66:
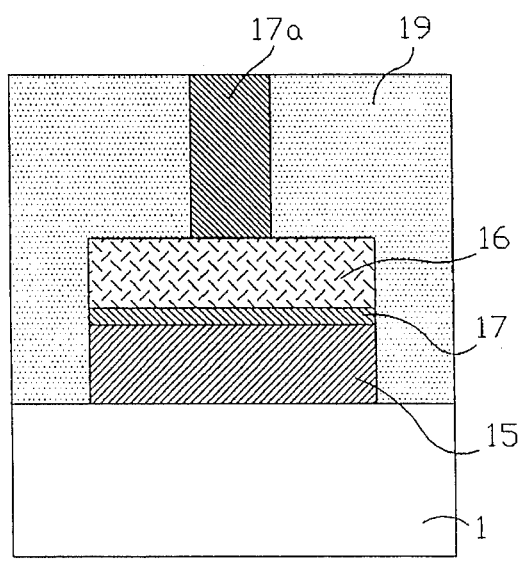
Figure 67:
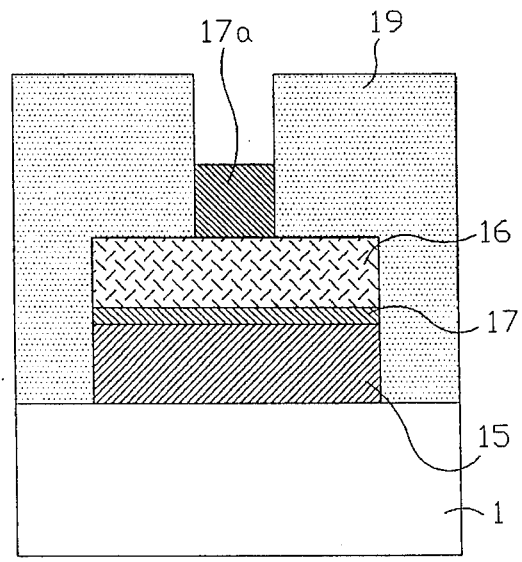

The oxide then is planarized by polishing, to yield the structure shown in FIG. 66, following which the TiW layer 17a is etched back as shown in FIG. 67.

Figure 68:
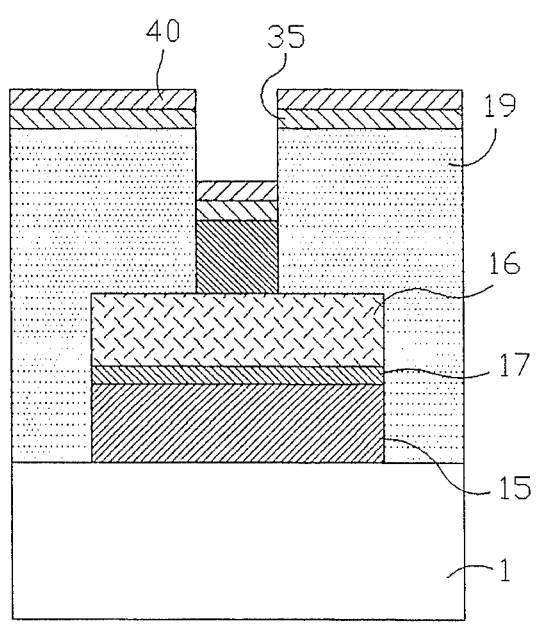

Next, gate metal layer 35 is deposited by directional deposition technique, and a release metal layer 40 is similarly applied, yielding the structure shown in FIG. 68.

Figure 69:
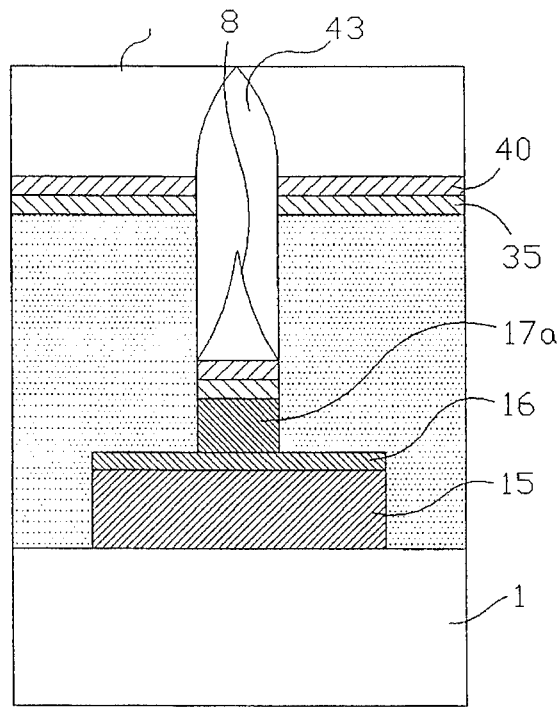

Emitter metal 42 then is deposited by directional/side deposit technique, to form the structure shown in FIG. 69, wherein emitter metal layer 42 forms a cavity 43 above emitter tip 8.

Figure 70:
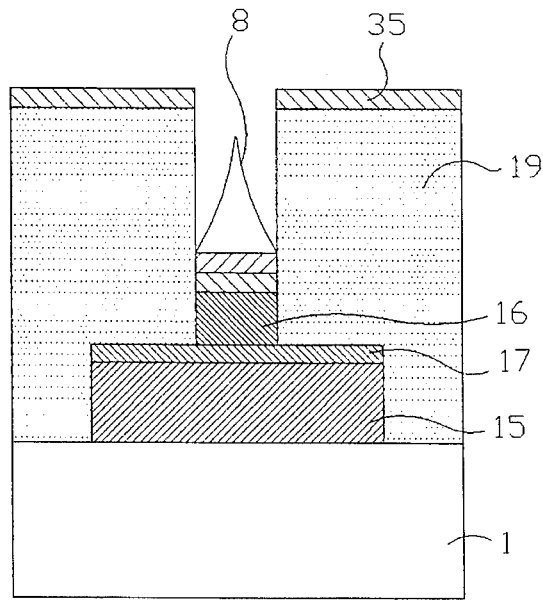

The emitter metal layer 42 then is removed together with the release metal layer 40, to yield the structure shown in FIG. 70.

As will be described hereinafter in greater detail, the field emitter structures of the present invention may be usefully employed in the fabrication of display panels, in which the field emitter structure is in spaced-apart relationship to an electroluminescent element comprising a phosphor or other electroluminescent element which when impinged by the electron beam from the emitter structure produces a photo-response at the locus of impingement. Such display panels may usefully employ the open frame structure shown in top plan view in FIG. 71, side elevation view in FIG. 72, and end elevation view in FIG. 73.

As shown in these Figures, the open frame spacer 100 includes spaced-apart side walls 102 and 104 defining a gap of width $W_g$ therebetween, wherein each of the walls has a thickness $W_b$ and with the frame spacer having an overall width $W_t$.

The open frame spacer 100 also comprises end walls 106 and 108, which are longitudinally spaced apart from each other to define an interior volume length $L_1$ therebetween, and the end walls 106 and 108 may have suitable thickness consistent with overall length $L_2$ of the panel.

The end wall 108 of the spacer frame 100 features a gap 110 therein of transverse extent (width) $W_a$.

The spacer frame shown in FIGS. 71–73 is usefully employed in small area displays and long, narrow displays, where sagging of the top and bottom display plates due to air pressure is not significant.

Figure 74:
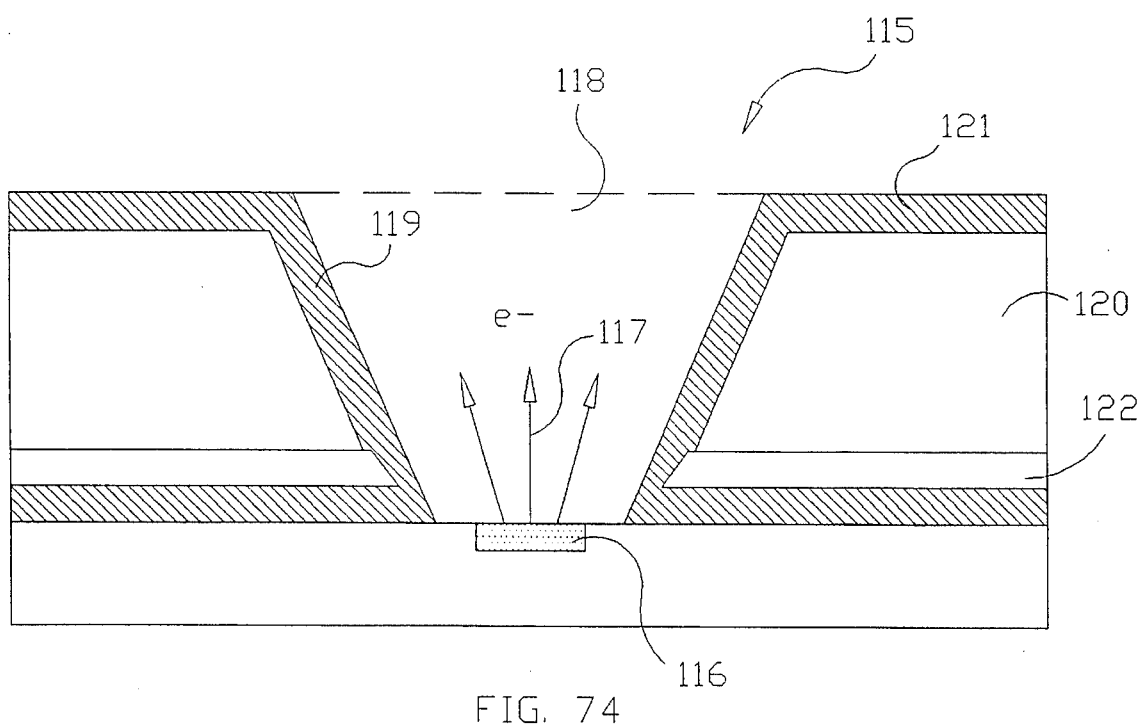
FIG. 74 is a side elevation view of a spacer structure which may be employed in display panels of the present invention, featuring a break-down resistant spacer with a conductive layer to shunt flashover.

As shown in FIG. 73, the spacer frame has a thickness X, which may for example be on the order of 0.05 centimeters. As also shown, the respective faces 112 and 114 of the spacer frame may be constituted by frits 112 and 114, of any suitable material of construction. FIG. 74 is a side elevation view of the spacer structure which may be employed in display panels of the present invention, featuring a breakdown resistant spacer with a conductive layer to shunt flashover.

The spacer 115 of FIG. 74 comprises a field emitter structure 116 mesa-shaped body disposed in pixel cavity 118, and emitting electron beams 117. The cavity 118 is of inverted frustoconical shape, and the cone angle of the side wall 119 is selected to minimize electron impact of the spacer walls. It will be recognized that the specific geometric characteristic of pixel cavity 118 may be varied widely in the broad practice of the present invention, and that cylindrical cavities as well as cones of reverse slope (to the pixel cavity bounding wall 119) may also be usefully employed in some applications of the invention.

The spacer 115 further comprises insulator 120, coated with a low electron emission coating 121 such as magnesium oxide (MgO). The insulator 120 may be a silica material. The spacer 115 further comprises a buried conductor 122 formed of a suitable material such as molybdenum or aluminum, connected to ground.

Figure 75:
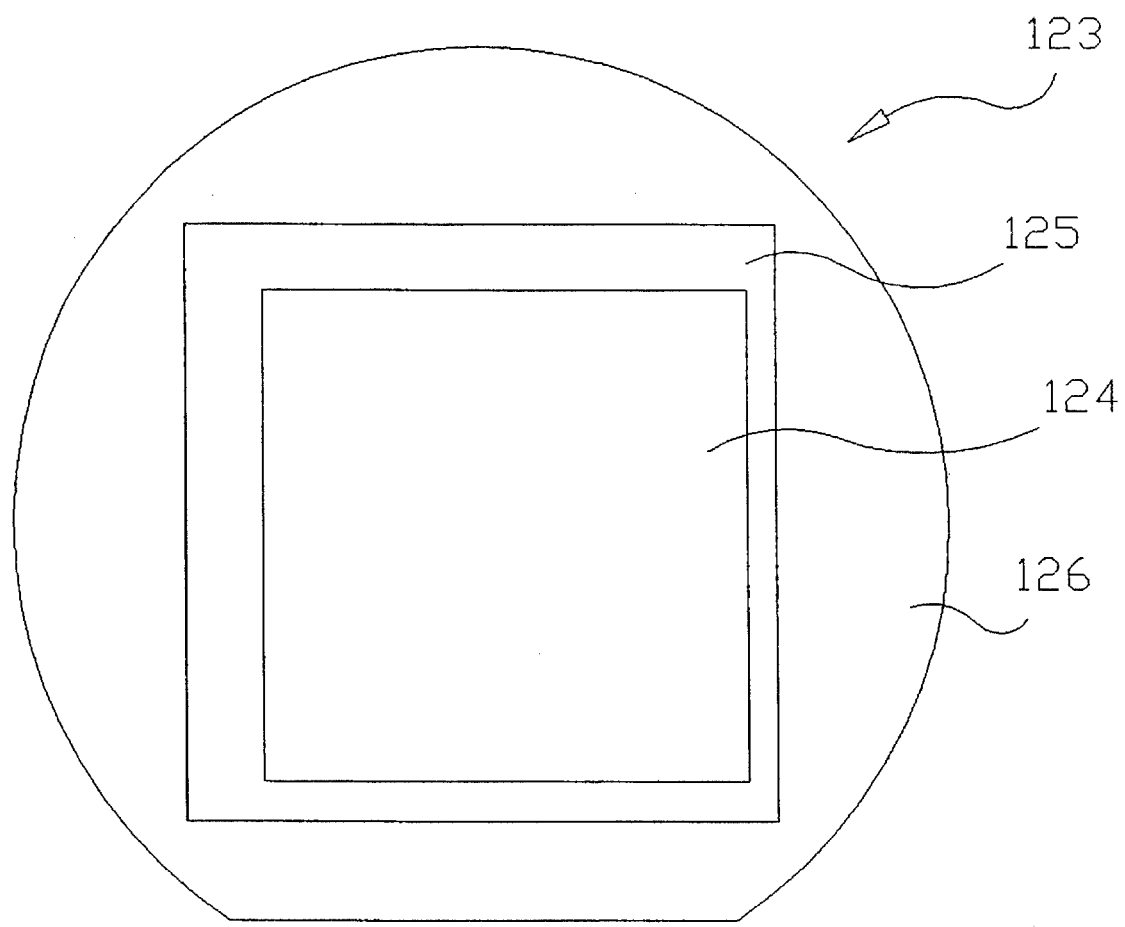
FIG. 75 is a top plan view of a display sub-assembly according to the invention, featuring an emitter array overlying a phosphor plate which in turn is disposed on a substrate.

FIG. 75 is a top plan view of a display sub-assembly 123 according to the invention, featuring an emitter array 124 overlying a phosphor plate 125, which in turn is disposed on a substrate 126. The emitter array 124 may comprise a plurality of 8×8 emitter arrays, characterized by 6750 μm stepping dimensions (600×600, 60, 30 μm).

Figure 76:
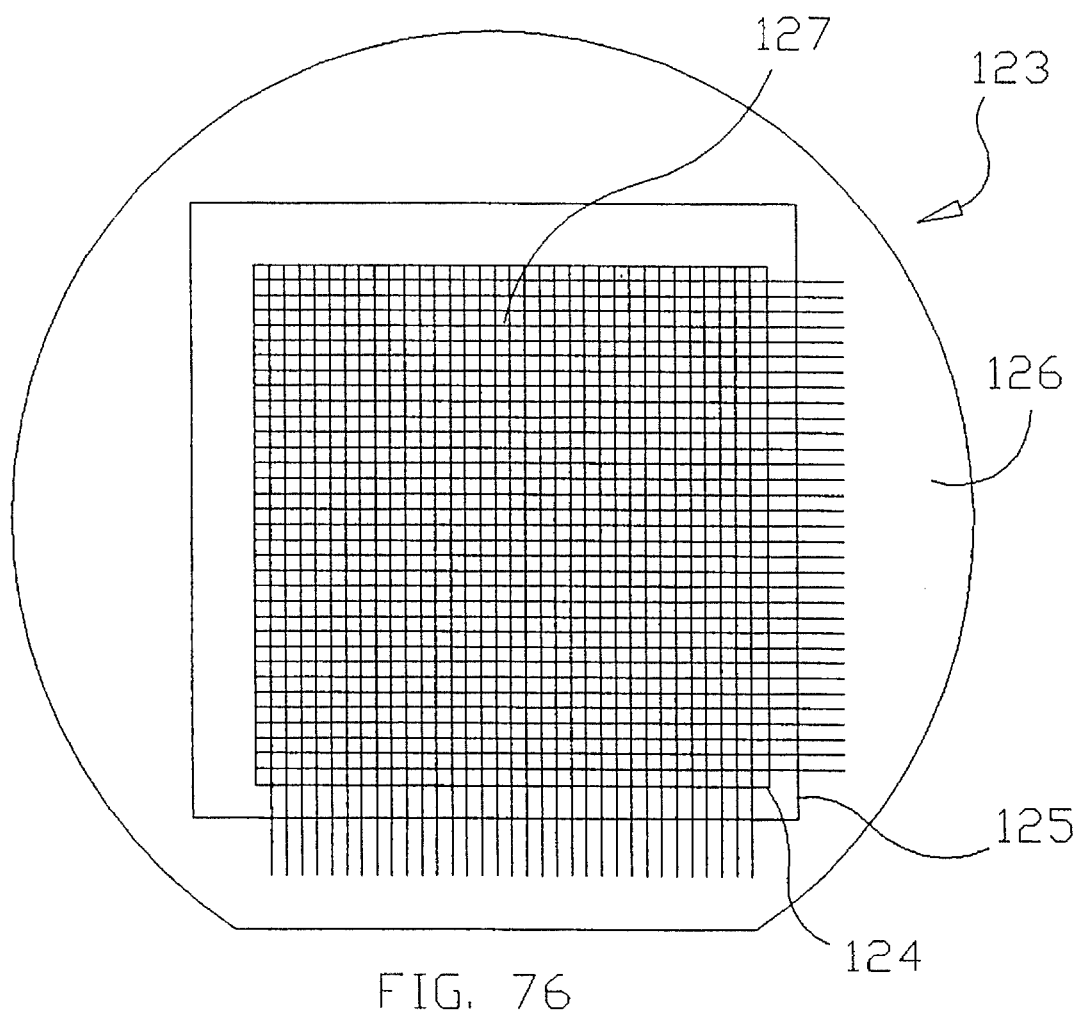
FIG. 76 is a top plan view of the sub-assembly of FIG. 75, featuring a grid pattern thereon.

FIG. 76 is a top plan view of the sub-assembly 123 of FIG. 75, featuring a grid pattern 127 thereon.

The grid pattern 127 may comprise 600 lines with 70 μm wide, 60, 750 μm long (8×9), and 90 μm center-to-center dimensions.

The present invention in one aspect contemplates the use of a dielectric spacer frame to separate two plates, one plate consisting of an electron source (field emitter structure) and the other consisting of a phosphor plate, in which the spacer frame is sealed to the upper and lower plates to form a vacuum-tight perimeter for the panel. The plates may be sealed in a vacuum, or sealed at atmospheric pressure with small openings to the interior of the display cavity. These displays then may be placed in a vacuum chamber, following which the interior volume is pumped to high vacuum, and the opening sealed to provide a vacuum-containing display panel. Glass frit seals, adhesives, solder, metal-to-metal bonding, dielectric-to-dielectric bonding, or dielectric-to-metal bonding may variously be used in such plate sealing operations, with glass frit sealing generally being preferred. Alternatively, a tubulation connection may be employed to effect sealing.

The use of offset anode and gate/emitter plate patterns to achieve arc resistant high voltage isolation is also contemplated in the broad practice of the present invention, wherein no overhang relationship exists between the anode conductor and the field emitter matrix conductors. Such use of offset anode and gate/emitter plate patterns also permits anode connection with minimal risk of shorting the anode to the control matrix.

The upper and lower plates of the display, described hereinabove, may be of different sizes (areal extents) to permit the electron source array plate leads and the anode plate to be easily accessed for connections to external circuitry. A partial cutout in the frame may be employed to permit partial sealing of the display and subsequent vacuum sealing. Further, the use of a tube extension from side port of the display may be employed to facilitate sealing of the display in a vacuum, with side or rear extensions of the panel also being employable for such purpose.

Spacer plates with leaky dielectric surfaces or low secondary electron generating characteristics may be employed in the practice of the invention to minimize secondary electron emission. Spacer plates of such type may be formed of any suitable material, such as amorphous silicon or diamond-like films, which are coated on the dielectric by any suitable process, as for example chemical vapor deposition, plasma-enhanced chemical vapor deposition, sputtering, or evaporation.

Low secondary emission surfaces may be employed on the spacer to reduce flashover, as in the spacer structure of FIG. 74, utilizing thin amorphous semiconductor such as silicon (e.g., of thickness between about 2 and about 500 nanometers), thin titanium or titanium oxide films, or thin diamond or diamond-like films. The spacer structure of FIG. 74 also utilizes a buried conductive layer to shunt voltage arcs, in the spacer, between plates in the panel, or as layers in the plates.

In the practice of the invention entailing use of spacer structures, high dielectric constant layers may be employed on the top and bottom of the spacer to decompress electric field lines at points of spacer discontinuity. In lieu of a single opening for each individual pixel, a matrix of openings defining each individual pixel may optionally be employed. The openings, as indicated, may be conical, frustoconical, cylindrical, or any other suitable shape.

An X and Y gate matrix may be built into the spacer grid array, which may be used to minimize driver count and manufacturing cost, albeit with some increase in power consumption.

A variety of approaches may be employed to effect alignment of top and bottom plates in panel assemblies according to the invention. The use of built-in frame corners may be employed to provide auto-alignment of the top and bottom plates to each other and with the spacer assembly, using side and/or corner justification to align the respective plates. Alternatively, a jig assembly may be employed to provide auto-alignment of the top and bottom plates to each other and the spacer assembly, utilizing side and/or corner justification to align and position the plates, and performing such alignment on many panel units at a time. Patterns on the plate may be justified to the edges of the glass to ensure pattern alignment when glass edges are positioned. As a further feature, extension columns or bars built into the spacer and between pixels may be employed to offset the spacer from the electron source and control grid.

The spacer structure described hereinabove permits the use of high voltages to improve pixel size control, brightness, and energy efficiency. This arrangement also permits accurate alignment of emitter and phosphor plates at low cost. Spacers are employed to keep the top and bottom plates from being pressed together by atmospheric pressure when the space between the plates is evacuated. Such spacers also accommodate the high voltages used to accelerate the electrons to the anode. Generally, higher accelerating voltages result in higher phosphor efficiencies and improved phosphor plate designs.

The spacer structure employed in panels of the invention may be constructed in various embodiments. The spacer assembly in general consists of a dielectric frame which separates the emitter arrays and the phosphor plates by a precise distance. Prior art efforts to achieve such separation, by means such as glass beads, metal rods, posts, and the like, have been difficult, time-consuming, and expensive to accurately implement, and typically such prior art structures are prone to high voltage arcing, and moreover are visible to the viewer of the display, thereby diminishing the aesthetic character of the display.

The spacer structure of the present invention permits simple fabrication of spacers for field emitter displays and power device designs. The spacers of the invention are part of the pixel pattern, and therefore unobtrusive to viewers of the display. In addition, the spacer structures of the invention afford ease of gas evacuation and sealing, aid in the alignment of the display's top and bottom plates, and simplify the sealing process, as well as aiding the maintenance of good long-term vacuum in the interior volume of the panel.

In one spacer embodiment, employed in applications where the spacer must maintain separation of top and bottom plates of the display over a large area, each row of pixels, each three-color pixel, or even each color sub-pixel may be provided with its own cavity. Such cavities are etched or formed openings in a plate, and the matrix extends through the center of the display to separate the plates.

The novelty inherent in this approach is in the definition of pixels or groups of pixels with a spacer instead of by electron dispersion alone. The spacer is a plate or frame, rather than a number of balls or columns. Such arrangement makes the spacer irrelevant to the eye, despite the fact that the spacer is of greater areal extent than prior art glass beads, metal rods, and other spacer means. The spacer arrangement of the invention also is characterized by the use of low secondary electron generating surfaces, the optional use of leaky surfaces to minimize the possibility of flashover, the incorporation of a conductive layer to shunt flashover, jig alignment capability, built-in vacuum getter coatings (as hereinafter more fully described) and regions in the black matrix/lines, direct incorporation of the frit or etch seal into the spacer, and a simplified vacuum, evacuation and sealing design.

Small edges may be employed on the perimeter of the display, or grooves may be employed in the center display area of the spacer, to provide plate separation during the vacuum pumping cycle, and to facilitate the egress of gas from the display cavity during vacuum pumping. Such spacer then may disappear when the display is brought back up to atmospheric pressure and the top and bottom plates in the display are pressed together, provided the outsides of the plates are at reduced pressure during pumping. This approach is particularly useful in the construction of large area displays.

Spacer frame perimeters may advantageously be coated with a frit or other sealing material prior to assembly, to minimize the width of the frame and to simplify the assembly process. Such approach eliminates an alignment step for open spacers, and can be employed to simplify the patterning of spacers containing a pixel matrix grid. The entire spacer may be coated, and part of the coating may optionally be removed. Screening of the frit or direct application along the perimeter may also be utilized in the fabrication of panels in accordance with the invention.

The panel may be constructed with rows of conductors built on, or into, the spacer, which can be used to shift the electron beam between sub-pixels within a macro-pixel. Such rows of conductors can be fabricated using standard circuit board fabrication techniques.

Figure 77:
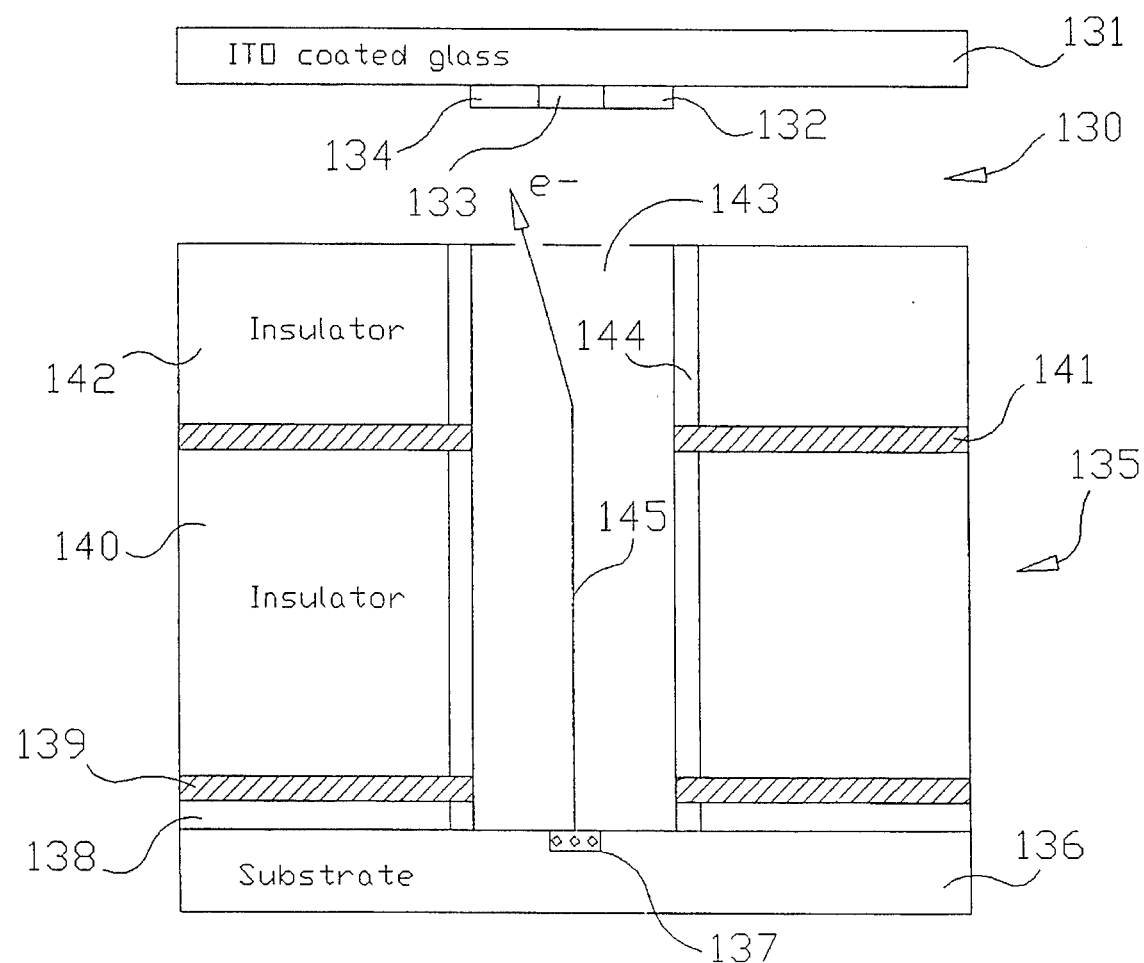
FIG. 77 is a front elevation view of a portion of a display panel comprising an electroluminescent plate element and emitter sub-assembly featuring deflector electrodes in a flashover protection layer.

FIG. 77 is a front elevation view of an electroluminescent plate element which may be utilized in a display panel according to the present invention, and an emitter subassembly featuring deflector electrodes in a flashover protection layer.

In the portion of the display panel 130 shown in FIG. 77, a plate 131 of ITO coated glass is provided with red, green, blue phosphor lines 132, 133, and 134, optionally coated with an aluminum coating to provide the visual display plate of the panel 130. In spaced relationship to the plate 131 is an emitter panel 135, comprising a substrate 136, a field emitter array 137, and insulator layers 138, 140, and 142. Intermediate insulator layers 138 and 140 is a flashover protection layer 139 of a suitable material, e.g., silicon oxide or silicon dioxide. Intermediate insulator layers 140 and 142 is a deflector layer 141, which may be formed of chromium.

The walls bounding cavity 143 constitute a low secondary electron emission surface and optionally may be coated with a high resistivity conductor layer 144, to enhance the efficiency of the emitter panel 135, in its emission of an electron beam 145 and direction thereof to an appropriate one of the phosphor lines 132, 133, and 134.

Figure 78A:
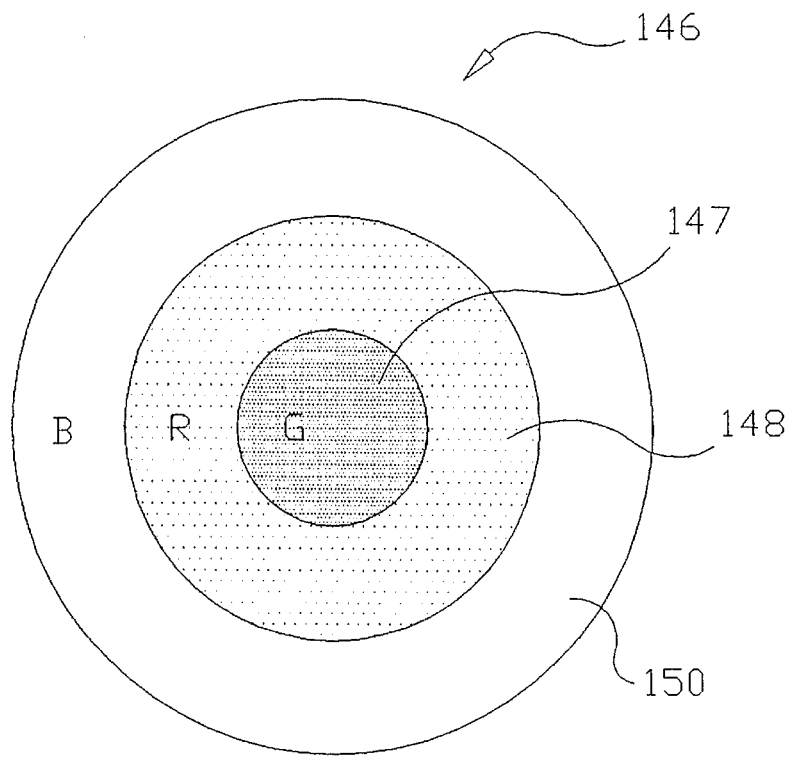
FIG. 78A shows a circular phosphor pattern which could be utilized in the display panel of FIG. 77.

FIG. 78A shows a circular phosphor pattern which could be used in connection with the display panel of FIG. 77. As shown, the phosphor pattern 146 comprises a central green phosphor 147, an intermediate concentric red phosphor 148, and a concentric outer blue phosphor 150.

Figure 78B:
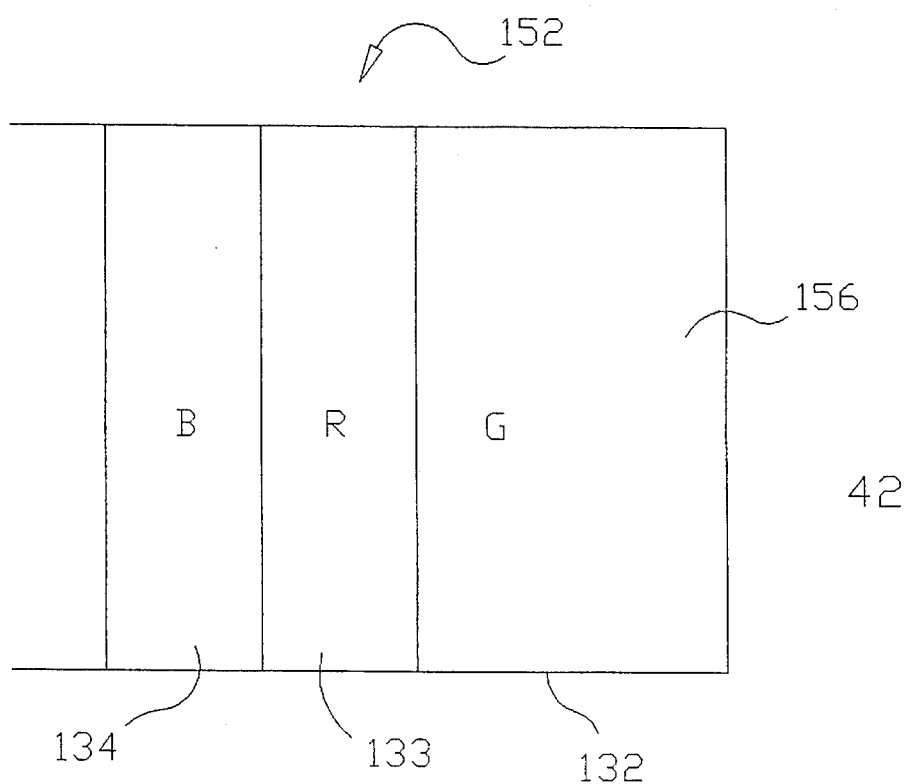
FIG. 78B illustrates a phosphor pattern (red, green, blue) pattern of phosphor lines, utilized in the display panel of FIG. 77.

FIG. 78B illustrates another phosphor line arrangement which may be usefully employed in the display panel of FIG. 77. As illustrated, the phosphor display 152 comprises a blue phosphor strip 134, an intermediate red phosphor strip 133, and a green phosphor strip 132, against a black matrix 156.

In the broad practice of the invention, in the fabrication of field emitter structures, spin-on, CVD, or spray-on dielectric may be used to planarize the regions between conductors, in order to reduce the electric field and the potential for high field breakdown from the emitter address line edges, as well as to smooth the gate-emitter dielectric for the gate metal surface.

FIGS. 79–92 illustrates steps of a multi-step process for forming a field emitter structure according to yet another embodiment of the invention.

Figure 79:
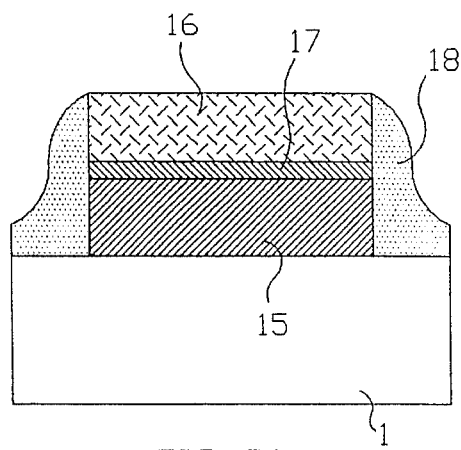
FIGS. 79–92 illustrate steps of a multi-step process for forming a field emitter structure according to another embodiment of the invention.

As shown in FIG. 79, a substrate 1 has deposited thereon an emitter conductor 15, on which in turn is deposited a layer 17 of TiW, overlying which is a layer of resistor 16, together with aluminum emitter mask 18.

Figure 80:
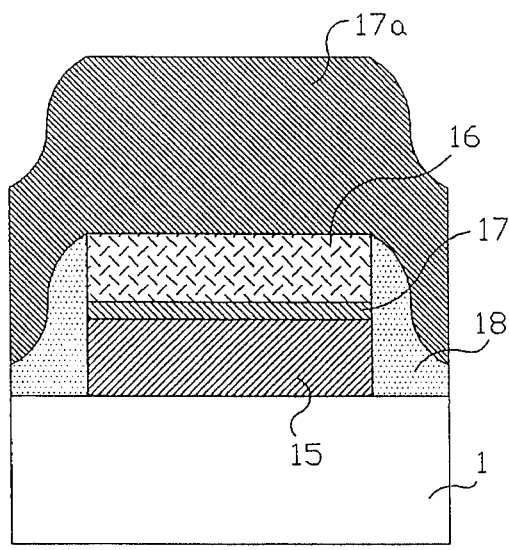
Figure 81:
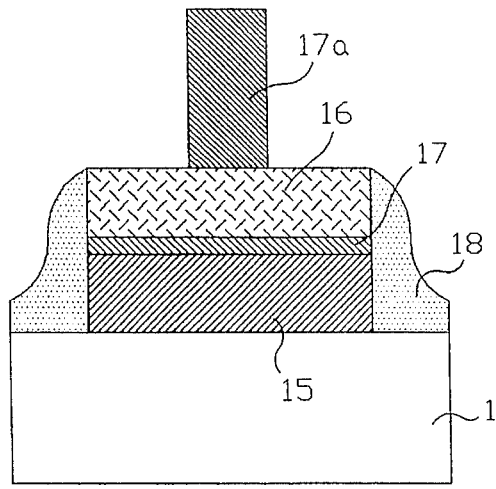
Figure 82:
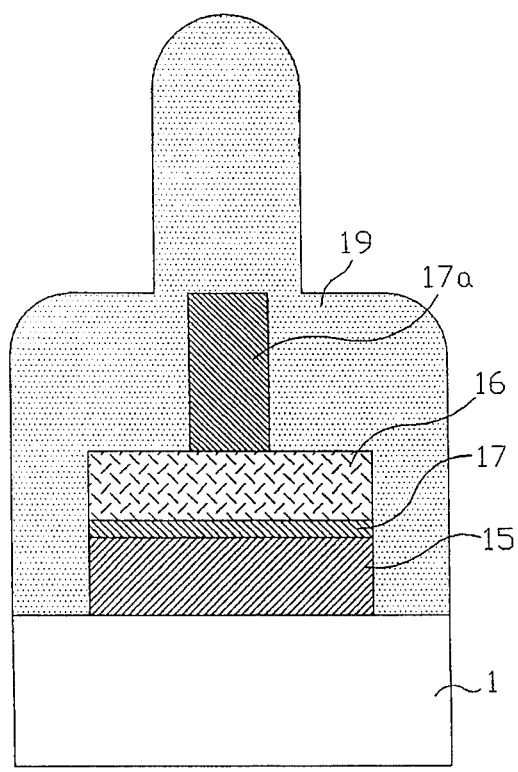

TiW is deposited at a thickness which may be for example on the order of about 4 micrometers, to produce the structure shown in FIG. 80. After subsequent patterning of the emitter mask, the TiW layer 17a is etched to yield the structure shown in FIG. 81. Next, the aluminum emitter mask 18 is removed, and a layer 19 of SiO$_2$ is deposited, to form the structure as shown in FIG. 82.

Figure 83:
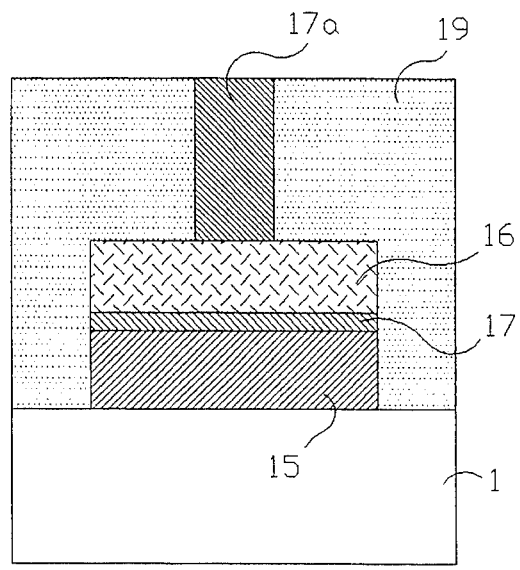
Figure 84:
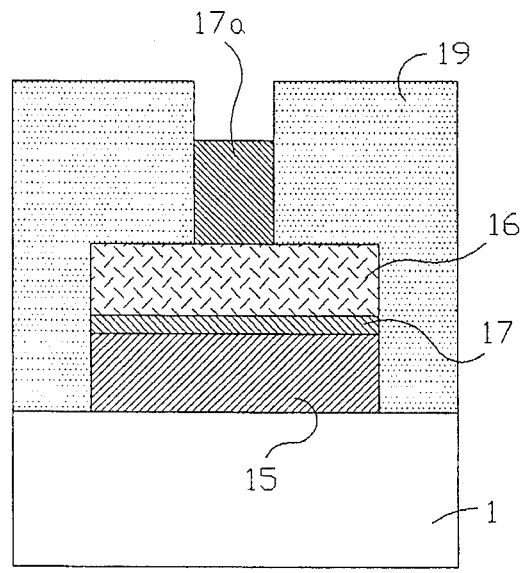
Figure 85:
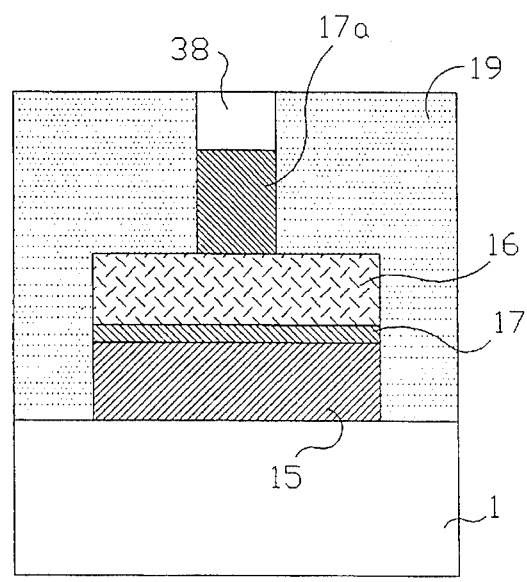
Figure 86:
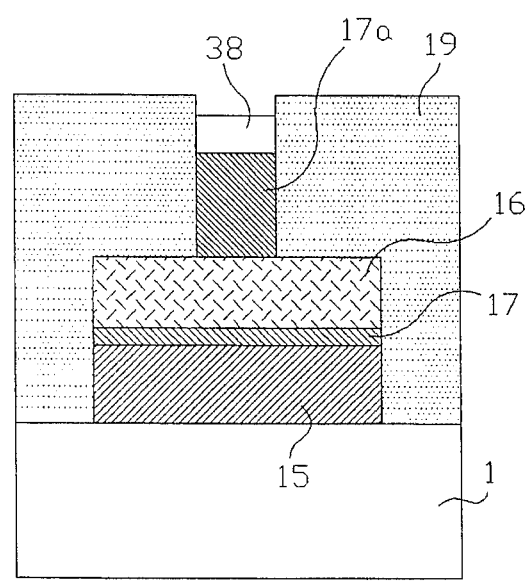

The oxide then is planarized by polishing, to form the structure shown in FIG. 83. The TiW column 17a is next etched back to yield the structure shown in FIG. 84, following which the resulting cavity is filled with a diamond film 38, as shown in FIG. 85, and this diamond film is etched back as shown in FIG. 86.

Figure 87:
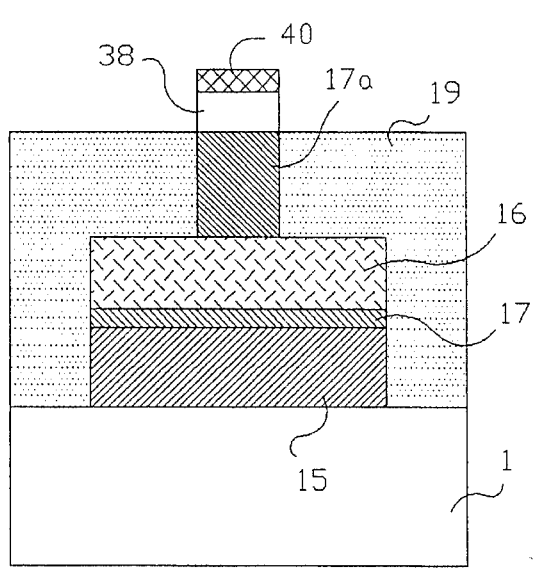
Figure 88:
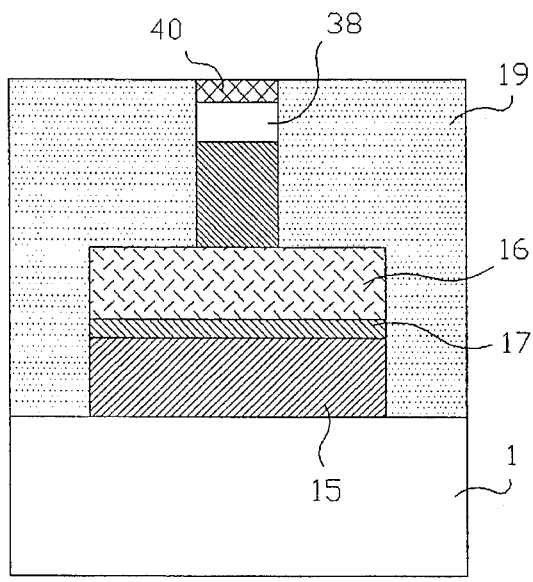

Subsequently, the LTO oxide 19 is etched back after a release layer 40 has been applied to the diamond film, yielding the structure shown in FIG. 87. This structure then is filled in with insulator 19 and etched back to yield the structure of FIG. 88.

Figure 89:
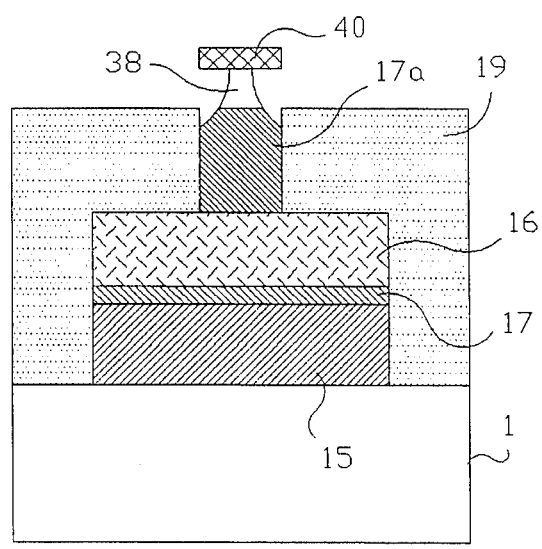

Next, the diamond film 38 is isotropically etched, together with the TiW layer 17A, to form the emitter precursor structure shown in FIG. 89.

Figure 90:
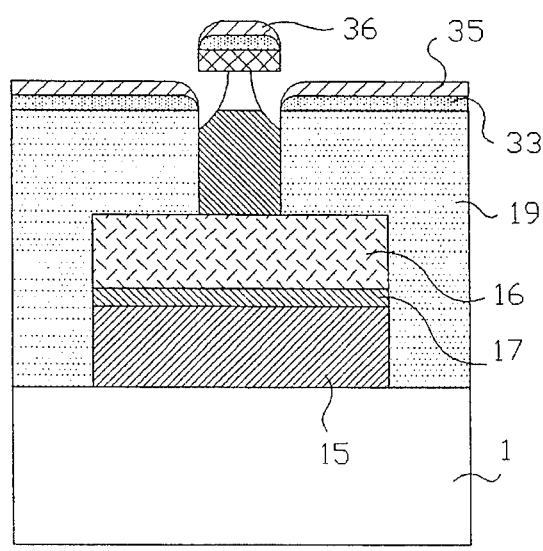

A self-aligning deposition of insulator 33, e.g., SiO, then effected together with deposition of a layer of extractor metal 35, yielding the structure shown in FIG. 90 including cap 36.

Figure 91:
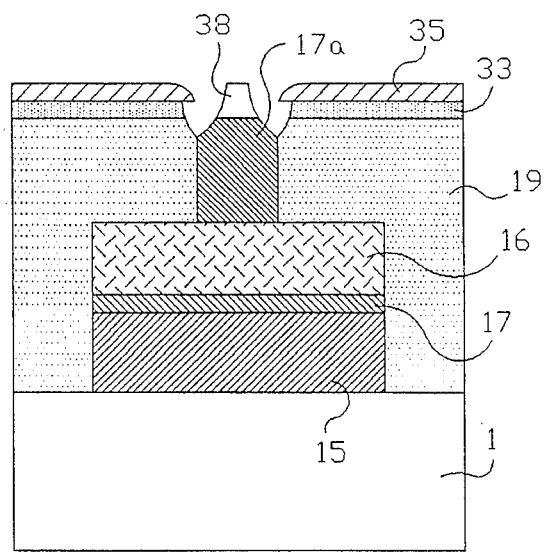
Figure 92:
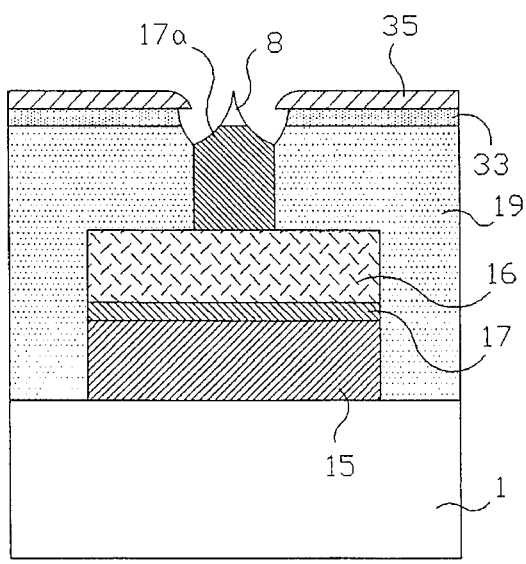

The cap then is removed as shown in FIG. 91, and optionally the diamond tip 8 is sharpened as shown in FIG. 92 to complete the field emitter structure.

Figure 93:
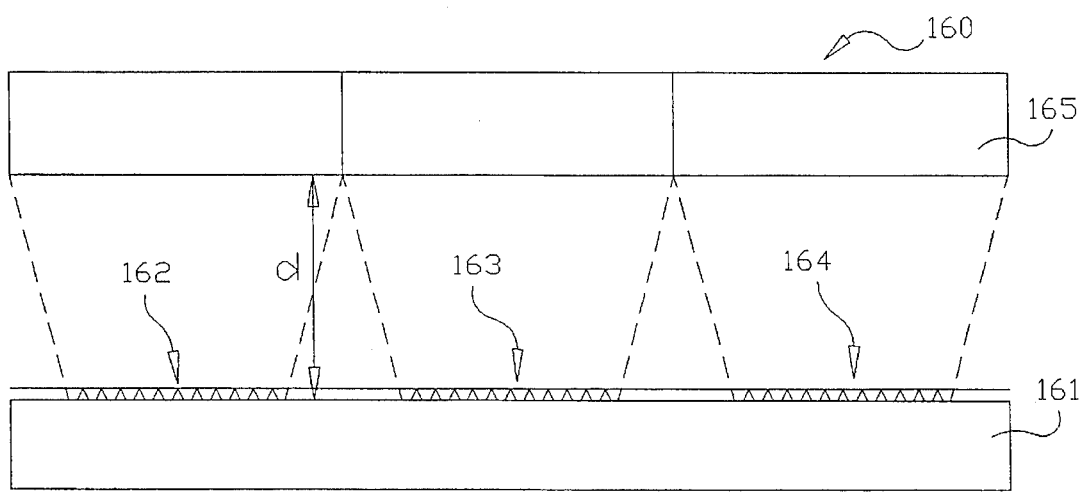
FIG. 93 is a front elevation view of a display panel structure according to one embodiment of the present invention, schematically showing the details thereof.

FIG. 93 is a front elevation view of a display panel structure of the invention, in one embodiment thereof, showing the details thereof. In this panel 160, an emitter plate assembly 161, featuring discrete arrays 162, 163, and 164 of field emitter elements formed in accordance with the invention, is provided in spaced relationship to the phosphor plate 165, with the spacing dimension D therebetween being secured by means of a spacer therebetween, which may be of a construction as illustratively described hereinabove.

Display panels in accordance with the invention may utilize emitter array pixels wherein the size of each emitter array pixel or each sub-pixel is set smaller than the phosphor dots to provide for dispersion of the electron beam, and to minimize electron impact on the spacer walls.

In order to maintain the interior volume of the display panel of the invention in an evacuated condition, various gettering means and structures may usefully be employed for chemisorbing getterable gases in the interior volume (evacuated enclosure) of the panel. Such getterable gases may be generated by outgassing of panel components, as well as in-leakage of atmospheric gases, subsequent to initial evacuation and sealing of the panel assembly. Getter materials also may be employed for self-pumping or initial evacuation of the chamber, or as an adjunct to mechanical rough-pumping of the enclosure, to reach a suitably low vacuum pressure in the enclosure, e.g., less than 1 mmHg pressure, and more preferably below 1 micrometer Hg pressure.

The getter may be deposited as a thin film of chemically active material, such as titanium, tantalum, aluminum, and/or barium. Such thin film getter material preferably is deposited on the anode side of the spacer via evaporation of the getter compound or element. A single or shaped group of shields may also be employed to minimize deposition on other parts of the display, other than the deposition locus. The getter film also may be deposited on the anode if kept thin enough so that it does not require greatly increased electron acceleration potential. The getter may be deposited in a non-vacuum environment, as long as adequate care is taken to protect its surface from depletion, so that high activity is maintained. Any suitable film thickness of the deposited getter film may be employed, however, in general applications, film thicknesses on the order of about 5 to about 100 nanometers usefully may be employed.

A moving swing source of a heated source wire coated with a desired getter material can be used to deposit the getter uniformly between plates, or the plates may be handled separately via robotic means in the vacuum separately before alignment, thereby permitting conventional sputter, ion beam, and evaporation processes to be employed for getter deposition.

The getter material may advantageously be deposited on the spacer side walls in order to minimize any adsorbed gases on such surfaces which might otherwise promote high voltage arc flashover.

As mentioned, built-in frame corners may be employed to provide auto-alignment of top and bottom plates to each other and with the spacer assembly, in fabrication of the panels according to the invention. Such frame corners may also be employed for deposition of the getter, such as by use of corner vacuum cavity extensions with a getter in position, or a fitted feedthrough in the back of the field emitter plate, or in an inactive area of the panel structure. This type structure may be formed of metal ceramic or glass, with glass generally being most preferred.

Figure 94:
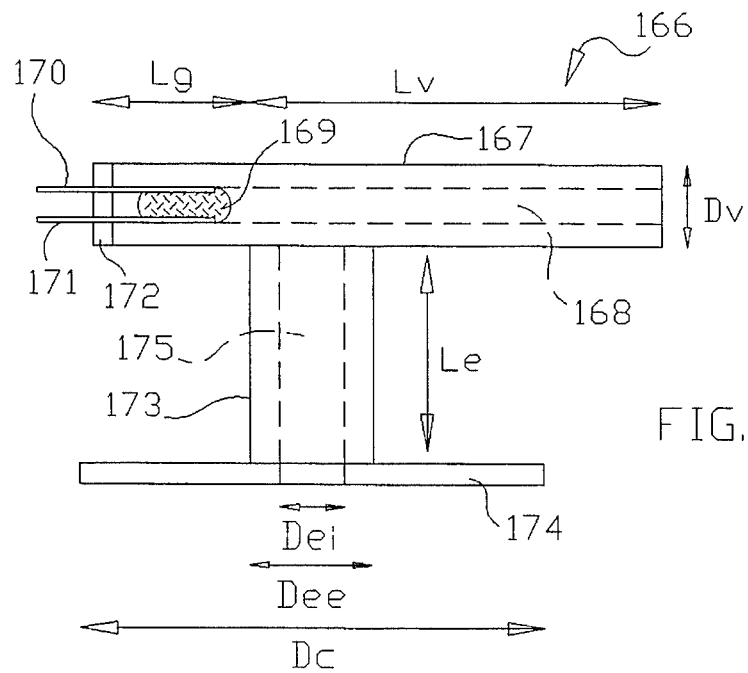
FIG. 94 is an elevation view of a round flange vacuum connection structure which may be usefully employed in a flat panel display article according to one embodiment of the invention.

FIG. 94 is an elevation view of a round flange vacuum connection structure which may be usefully employed in a flat panel display article according to one embodiment of the invention, featuring a getter material.

As shown, the vacuum connection 166 comprises an upper flange member 167 defining an interior passage 168 therewithin, in which a pellet 169 of suitable getter material is disposed, with the pellet 169 being in contact with electrical resistance wires 170 and 171 for heating of the pellet to volatilize the getter to a depositable vapor. Alternatively, the getter may be provided in the shape of a ring or other suitable conformation, to accommodate RF induction heating of the getter.

The flange member 167 may have a thickness $D_v$ which may be on the order of 0.5 centimeter, and the length of the interior passage containing the getter, $L_g$, may be on the order of 2 centimeters, with the remaining length $l_v$ being on the order of 1 centimeter. The electrical resistance heating wires 170 and 171 pass through an end cap 172 of the flange element, and the flange member is connected by means of axle member 173 to lower flange member 174. The lower flange member 174 is frit sealed to the inside of a plate of the flat panel display.

The first tube member 167 has a diameter $D_v$, which may be on the order of 0.3 centimeter. The spindle member 173 has a length $L_e$ which may be 1.5 centimeters, with an interior passage 175 of diameter $D_{ei}$ of for example 0.15 centimeter, with the spindle itself having an outer diameter $D_{ee}$ of about 0.6 centimeter, wherein the central passage 175 of the spindle member communicates with the interior passage 168 of the tubular member 167.

The round flange 174 has a diameter $D_c$ which may for example be on the order of about 0.6 centimeters.

Figure 95:
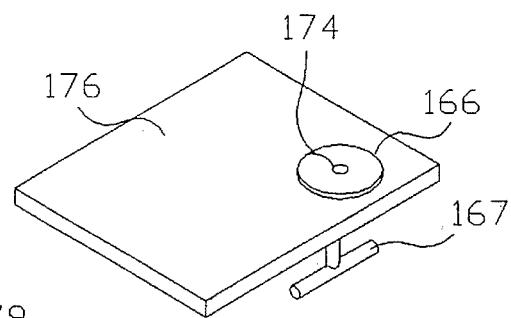
FIG. 95 is a perspective view of a panel display utilizing the round flange vacuum connection means of FIG. 94.

FIG. 95 is a perspective view of a display panel utilizing the round flange vacuum connection means of FIG. 94. As shown, the vacuum flange means 166 is secured in the vicinity of a corner edge of the panel 176, with the tubular member 167 being deployed on an opposite side of the panel from circular flange 174.

Figure 96:
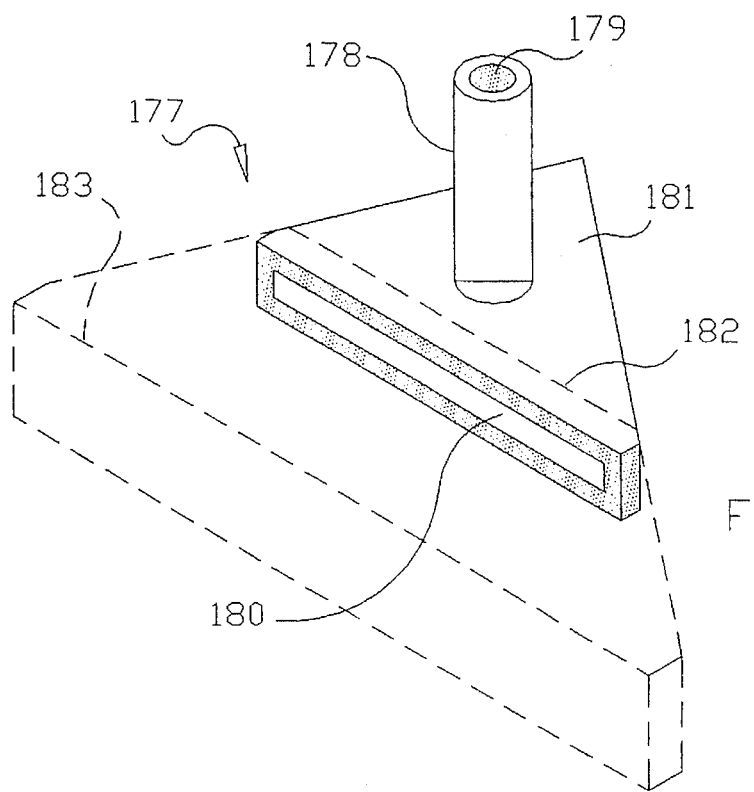
FIG. 96 is a perspective view of a corner flange vacuum connection which may be usefully employed in a flat panel display according to the present invention.

FIG. 96 is a perspective view of a corner flange vacuum connection 177 which may be usefully employed in the flat panel display according to the present invention.

As shown, the vacuum connection 177 features a cylindrical vacuum connection member 178 having a central bore 179 therein communicating with the interior of the connection structure and the vacuum opening 180, as shown.

Disposed in the interior of connection 177, in corner 181, is a suitable getter material (not shown) which facilitates chemisorption of gases from the interior volume of the display panel. The dashed line 182 shown in FIG. 96 demarcates the frit seal surface of the connection, by means of which the corner flange vacuum connection is secured at a correspondingly shaped beveled edge of a flat panel display main portion 183, as shown in dashed line representation in FIG. 96.

It will be recognized that the vacuum connection means shown in FIGS. 94–96 may be variously configured, as desirable or otherwise appropriate for a given end use application. For example, the vacuum connection may be in the form of a Y-shaped connection means, or a T-shaped connection means. The getter alternatively could be inserted in a tube after evacuation and sealed; such arrangement simplifies the feed-through of getter to the interior volume of the vacuum space, but complicates the pumping and sealing means and operation. A vacuum port or conduit, such as the member 178 of FIG. 96, may be pinched, melted, or otherwise modified to effect leak-tight closure of the connector means at the desired point during the fabrication of the display panel.

Referring again to the spacer elements usefully employed in display panels of the invention, pre-stamped or pressed patterns may be employed on such spacers to form the pixel matrix pattern. By preforming small recesses in the spacer plate and then coating the plate with an etch-resistant material, the pixel matrix can be etched without the need for photolithography.

Charged, uniformly-sized particles may be employed in solution to provide an even spacing of dot patterns on a surface, for the patterning of the emitter level, without photolithographic patterning. These solutions can be made using zeolites, latex spheres with positive or negative zeta potential additives, or other charged particles. When placed in solution, suspensions of these particles evenly distribute. By increasing the viscosity of the solution a (in primary solution of water or a non-polar solvent that does not dissolve the particles), using a volatile compound such as ethylene glycol or polyvinyl alcohol, these particles can be kept evenly spaced when a solution is coated on a surface. Once the solution is removed by vaporization (via heat or vacuum technique), the remaining particles can be used as an etch mask. Some cleaning of the surface with a plasma (e.g., oxygen) to remove thin film residuals may be advantageously employed.

Latex spheres are widely commercially available in specific size particles. Chemical additives such as selective zeolites may be added to increase the etch resistance and the intrinsic charge of these particles prior to or after the etch, and the intrinsic charges of these particles prior to or after formation of the suspension. The use of self-spacing particle liquids constitutes another aspect of the present invention. Films may potentially be applied from such solutions or suspension by the appropriate application means, such as dipping, settling, spinning or spray coating, with Langmere Blodgett film application being the preferred methodology.

Particles of the aforementioned type may be employed as the etch mask for RIE transfer of the emitters or emitter columns. A second low resolution lithography step may be employed prior to or following this step, in order to localize the positioning of the particles. A lithography step prior to distribution of the particles could be employed to prevent adherence of the particles to the substrate, in selected areas. A thin film may be employed to promote or prevent adherence of particles to certain surfaces. Materials such as a positive zeta potential polyimide can prevent deposition of particles, or an easily removable layer of a material such as polyvinyl alcohol could be deposited and patterned on select areas which could be dissolved or lifted away, along with the particles on top of the film. A resist film can also be deposited and photolithographically patterned after etching of the emitters, to protect selected areas of emitters from a subsequent etch step, thereby leaving only the protected emitter structures.

Chemical additives of low volatility, including organic as well as inorganic materials, may also be employed in the particle suspension in order to improve the process and permit the particles to survive long reactive ion etch cycles.

FIGS. 97–100 illustrate steps of a multi-step process for forming spacers form pre-indented substrates, such as may be employed in the practice of the present invention.

Figure 97:
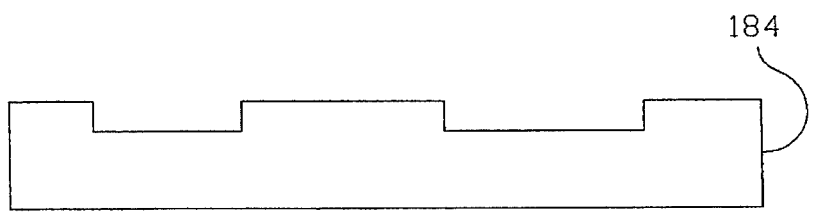
FIGS. 97–100 illustrate steps of a multi-step process for forming spacers from pre-indented substrates, such as may be employed in the practice of the present invention.
Figure 98:
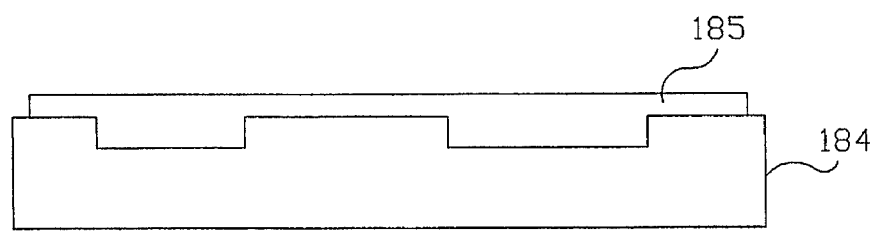

As shown in FIG. 97, a pressed or pre-indented substrate 184 is employed, which may be formed of any suitable material, such as glass. As shown in FIG. 98, the substrate 184 is coated with a resist material layer 185, which may be for example a spin or spray coat of suitable resist material. The resist is etched back, such as by oxygen plasma etching, to yield the structure shown in FIG. 99, and thereafter, the substrate is etched to provide a series of holes or bore openings 186 therethrough, as shown in FIG. 100. Such etching may be carried out utilizing plasma etching, RIE or wet etching, or any other suitable technique, depending on the hole size and shape desired.

Figure 99:
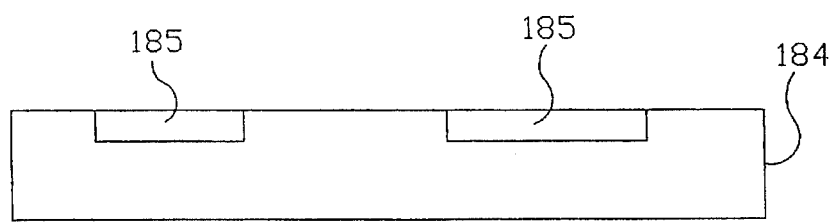
Figure 100:
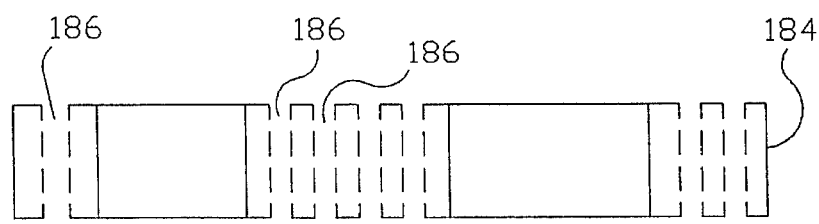

Reversing image patterning is achievable by adding a partition etch step after producing the structure of FIG. 99, followed by cleaning of the substrate and repetition of the steps corresponding to FIGS. 97–100, or passivating the surface which is not to be etched. This process may be employed to pattern both sides of the plate and etching may be performed from both sides, simultaneously. A lithographic method may also be employed where both sides are coated with photoresist and simultaneously exposed, developed, and used as etch masks. Exposure may be carried from one side providing that the light employed is highly collimated in character.

FIGS. 101–104 illustrate steps of a multi-step process employing particles to form emitter patterns on substrates, according to one embodiment of the invention.

Figure 101:
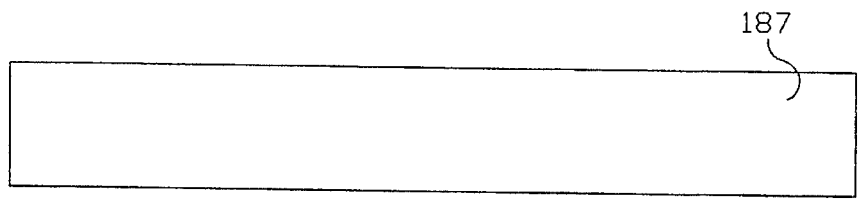
FIGS. 101–104 illustrate steps of a multi-step process employing particles to form emitter patterns on substrates, such as may be employed in the present invention.
Figure 102:
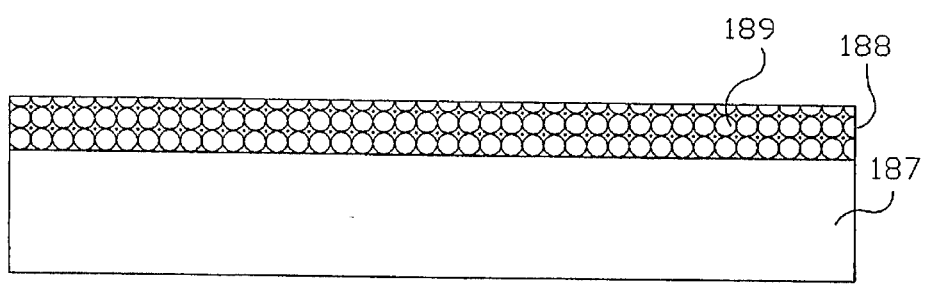
Figure 103:
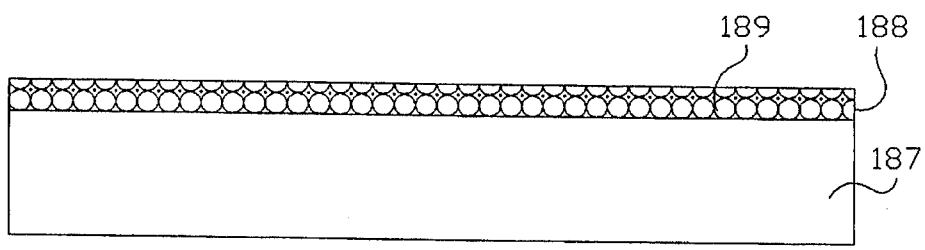

As shown in FIG. 101, an emitter column material 187 is provided. This material may for example comprise polysilicon.

The emitter column material 187 then is coated with a particle-containing fluid to form a particle-containing liquid layer 188 comprising particles 189 on the upper surface of the emitter column material.

Figure 104:
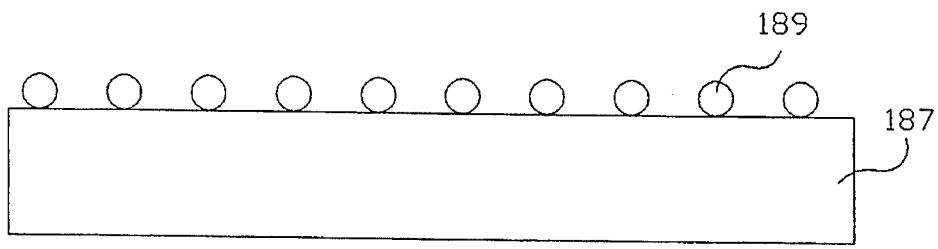

Next, the particle-containing liquid layer 188 is thinned, via mist dilution or Langmere Blodgett pulling, thereby permitting particles 189 to evenly space on the substrate, on the basis of the intrinsic charge of the particles. The thinned layer 188 shown in FIG. 103 then is dried and etched to define a pattern, as shown in FIG. 104. RIE or heating may be employed to finely adjust the particle size to yield particles 189 on the substrate 187. The substrate then may be etched using the particle mask.

As discussed hereinabove in connection with FIG. 78B, alternating strips of red, green, and blue phosphors may be employed with strips of black matrix material added, to improve vacuum gettering and pixel contrast. The spacer frame is suitably aligned with the black lines so as not to block light from the pixels. Tops and bottoms of the pixels are defined by the edges of the electron beam from the field emitter array, with edges being defined by the black matrix. This design makes alignment between the spacer and the phosphor plate simpler, since it reduces the criticality of vertical positioning. The spacer may be designed with striped spacer lines inside the array, or in standard rectangular cells. White stripes or othercolored stripes may be added for specific chromaticity or brightness requirements.

FIG. 105 is a top plan view of a portion of a display panel according to an embodiment of the invention, showing the alignment of spacer elements with respect to alternating strips of red, green, and blue phosphors.

As illustrated, the display panel phosphor plate array 190 features a series of black strips 191,192, and 193, alternating with phosphor strips 194 and 195 comprising red phosphor strips 196, green phosphor strips 197, and blue phosphor strips 198, to define pixels 199, 200, 201,202, 203, and 204. In this arrangement, the spacer aligns under the black stripes and optionally between horizontal dead zones.

This arrangement provides plate-to-plate spacing control, voltage control, ease of alignment, high area phosphors for high brightness, and superior pixel definition.

Figure 106A:
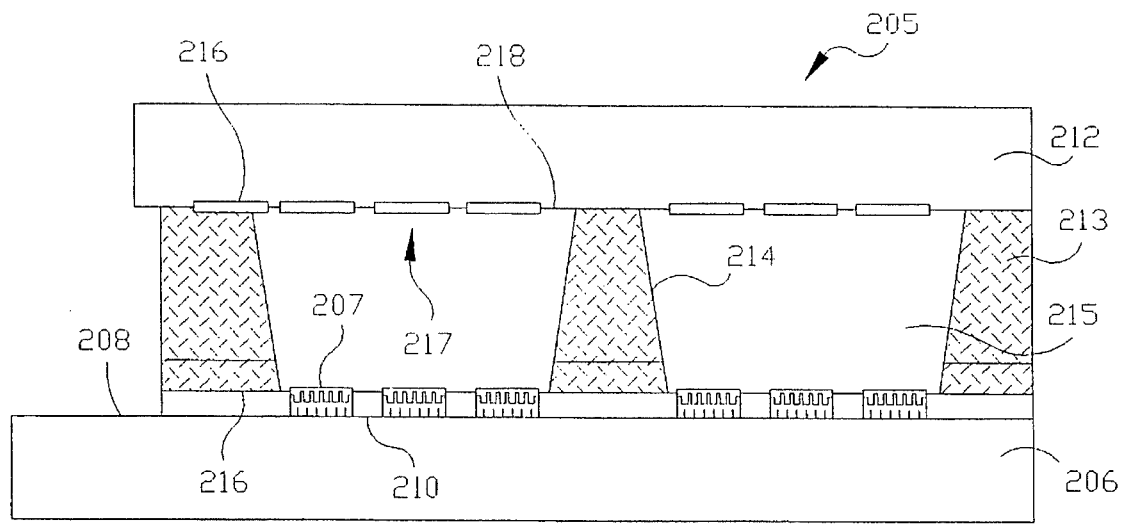
Figure 106B:
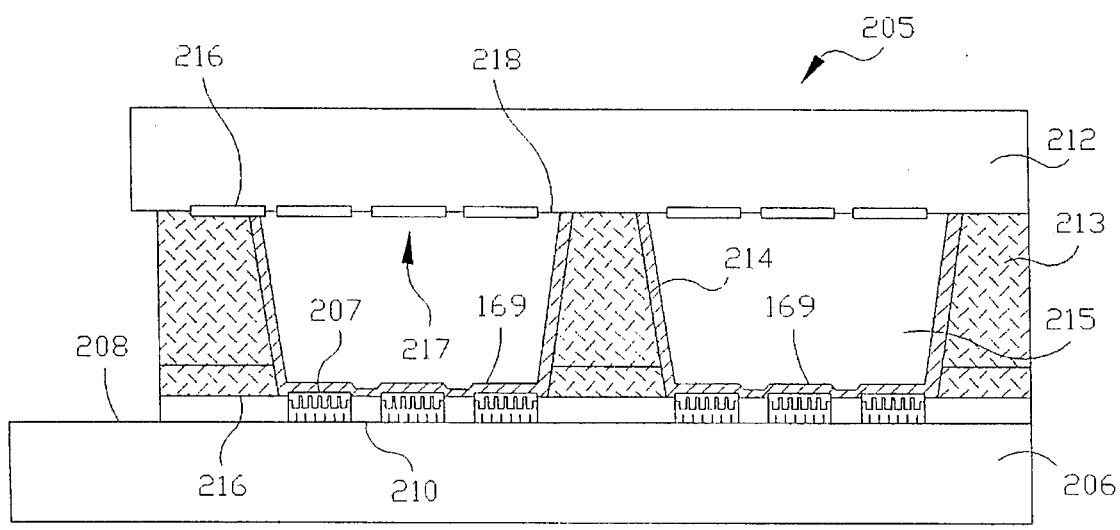

FIGS. 106a and 106b are two illustrations of variations of the present invention, each showing a sectional elevation view of a flat panel display. The display panel 205 comprises a bottom plate 206 which may be formed of glass or other suitable material, on the top surface which is provided a series of emitters 207, wherein the emitter connections are oriented perpendicular to the plane of the drawing page. The emitters 207 are provided with gate row connections 208, and gate lines 210. The emitters are constructed over a vertically conducting resistor layer on the substrate. The panel 205 comprises a top plate 212 of a suitable material such as glass. The top plate is maintained in spaced relationship to the bottom plate by means of spacer elements 213, which feature a flash-over control coating 214 on their surfaces exposed to vacuum space 215. FIG. 106b shows the variation of this embodiment further comprising a gettering material 169, such as is shown in FIG. 96. having been deposited on surfaces of the display element, and the spacer elements (on top of the overlayer dielectric coating 214).

The spacers at the sides of the display may be sealed to the associated plates by means of frits 216, which may for example comprise silica as their material of construction. The top plate 212 may be coated on its lower surface with a black matrix material, such as a mixture of barium and titanium, and the RGB phosphors 217 are disposed on the top plate against the black matrix material 218. The RGB phosphors may optionally be coated with a thin aluminum coating, and may be provided with an ITO underlayer.

The emitters shown in the panel arrangement of FIG. 106 may alternatively be organized in monochrome displays, light panels, sequenceable light strips, and other configurations.

Figure 107:
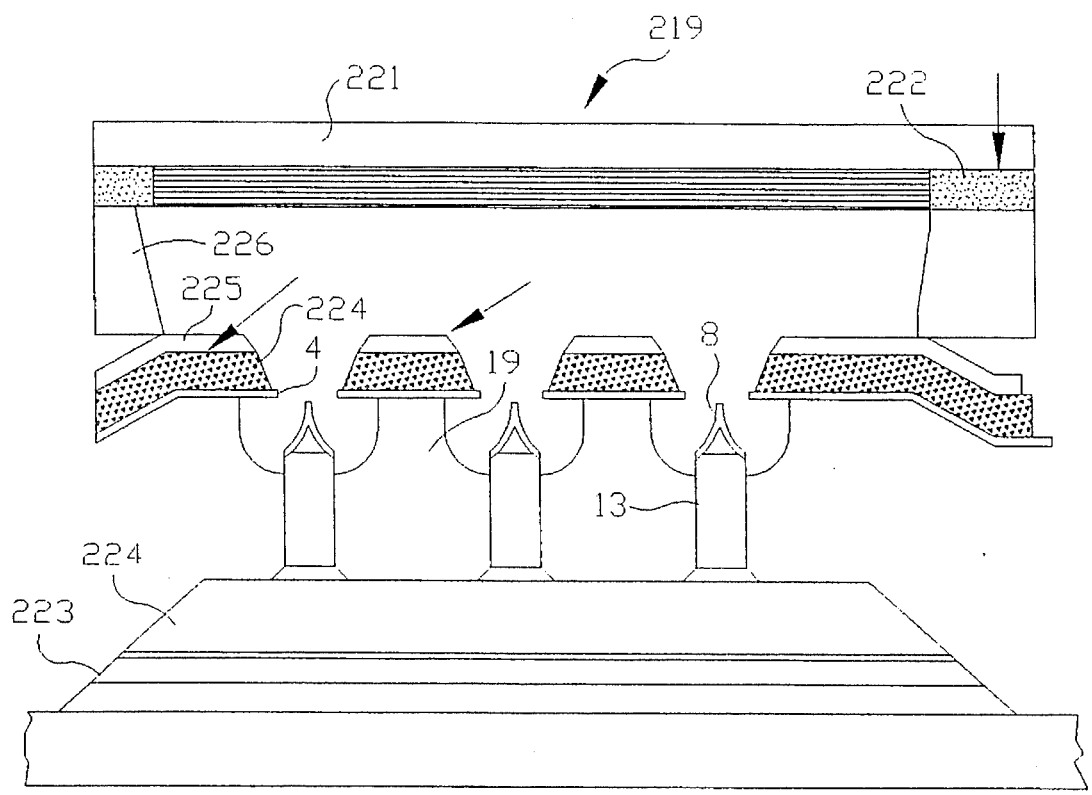
FIG. 107 is a sectional elevation view of a columnar field emitter display panel, according to another embodiment of the invention.

FIG. 107 is a sectional elevation view of a columnar field emitter display panel according to another embodiment of the invention.

The illustrated display panel 219 comprises a substrate 220 of a suitable material such as glass, in spaced relationship to a face plate 221 of glass or other suitable material of construction. Coated on the surface of face plate 221 is a black matrix material 222, such as a composition of elemental carbon, titanium, and barium. The face plate may be coated with a thin aluminum coating on the phosphor which in turn is disposed on the ITO as a single pixel anode structure.

On the glass substrate is provided an emitter conductor 223, such as a Cr-Cu-Cr trilayer element. On the emitter conductor member 223 is deposited a resistor layer 224, e.g., of Cr and $SiO_2$.

On resistor layer 224 is provided a multiplicity of emitter columns 13 of suitable material such as silicon, at the upper extremity of which is provided an emitter tip 8 of diamond or other suitable material.

The emitter columns 13 are contained in a matrix of insulator 19, such as $SiO_2$. A gate structure comprises extraction electrode 4, gate conductor 224, and insulator 225. The insulator layer 225 in turn is in contact with spacers 226 at the periphery of the pixel illustrated.

In the panel 21 9 shown in FIG. 107, multiple gated emitters are employed for each color sub-pixel, and thousands of emitters may be used per pixel. In this arrangement, the black matrix 222 is polyfunctional providing vacuum gettering action as well as enhancing contrast in the display.

Figure 108:
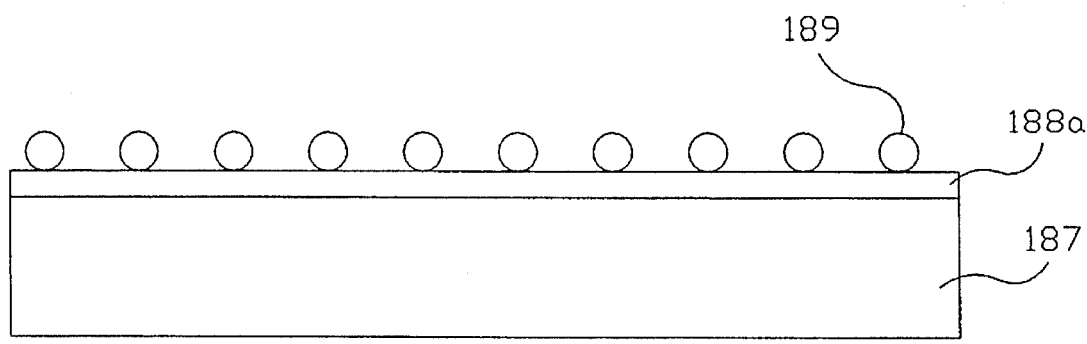
FIG. 108 is a side elevation view of a particle-coated substrate article similar to that shown in FIG. 104, but with a thin film layer intermediate the particles and the substrate element.

FIG. 108 is an elevation view of a deposited particle array of particles 189 formed from a solution of charged, uniformly-sized particles as described hereinabove, wherein the particles are deposited on a layer 188a of a resinous or film-forming material such as polyvinyl alcohol, polyvinylbutyral, or the like, as an easily removable layer on substrate 187. Deposited particle structures of this type may be employed as etch masks for RIE transfer of emitters or emitter columns, as discussed hereinabove.

The field emitter structure of the invention, as discussed hereinabove, employs sputtered or evaporated dielectric and self-aligned sputtered or evaporated gate metal to minimize the gate to emitter gap and provide for low cost fabrication. In the structure of the invention, column or tip elements are placed on a high resistivity layer such as a cermet. Conduction through the resistance film is vertical, rather than horizontal, and the film is of substantially higher resistivity than in prior art emitter structures. Such placement of columnar tip structures on high resistivity layers eliminates the need for an extra mask. While many film compositions and materials may be employed in the practice of the invention, Cr (55%)-$SiO_2$ (45%) is an illustrative film composition which provides 0.01–20 G$\Omega$ resistances in each emitter, utilizing 2 micron thick films. As discussed, the resistor layer may be used as an etch stop and left most in fact, and such layer may also be etched to form isolated column resistors under the emitters.

Evaporated or sputtered resistance films may be formed by lift off in the same vacuum cycle as the metal lines feeding current to the emitters. Chemical vapor deposition of the resistor layer is possible, but may require an additional mask layer, unless patterned using the same masking step as the metal level below.

Figure 109:
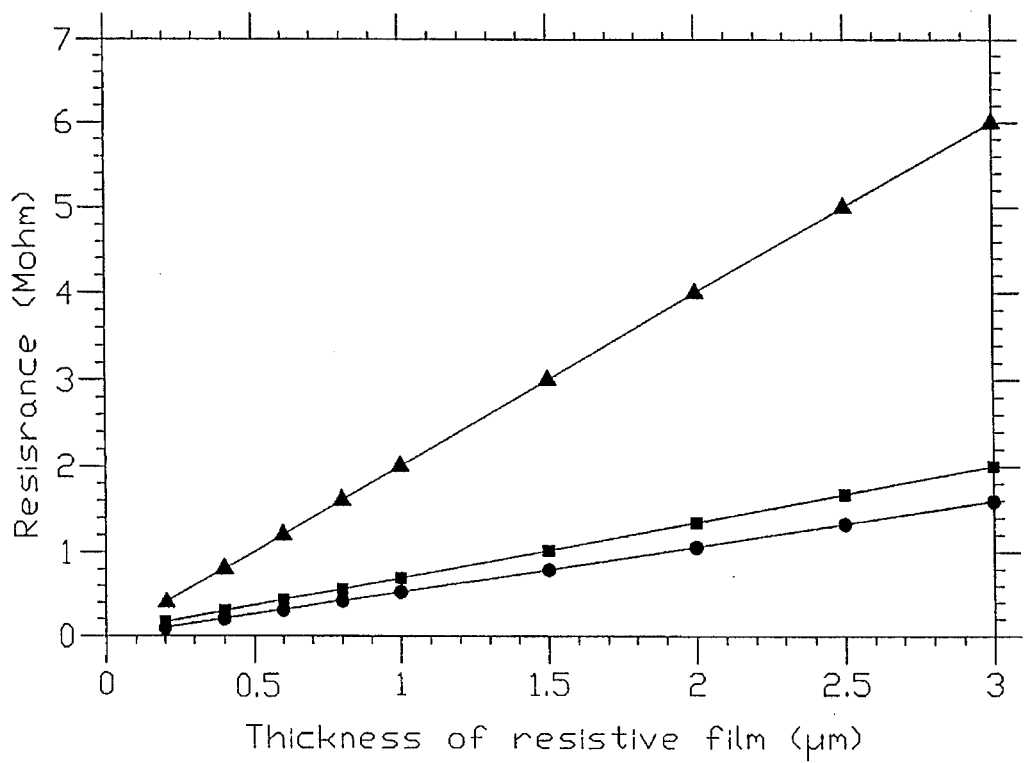
FIG. 109 is a plot of resistance, in Mohm, as a function of resistive film thickness, in micrometers, for a chromium and silicon dioxide resistive film.

FIG. 109 is a graph of resistance, in Mohms, as a function of thickness of resistive film, in micrometers, for a film of Cr: $SiO_2$ in a ratio of 1:2, as nitrogen and oxygen annealed in various tests. In the graph, the triangular datapoints ($\Delta$) represent the Cr:$SiO_2$ film annealed in flowing oxygen for 8 hours at 400° C.; the circular data points (●) represents Cr: $SiO_2$ films annealed for 24 hours in flowing nitrogen and 400° C., and the square datapoint ($\square$) represents Cr:$SiO_2$ films as deposited, without any post-deposition annealing treatment. The data show that at higher resistive film thicknesses, above 0.5 micrometer, the oxygen-annealed Cr:$SiO_2$ films demonstrated substantially higher resistance characteristics, as compared to the corresponding as-deposited films and nitrogen-annealed films.

The high resistivity layer is deposited on top of conductive lines. Aluminum-copper alloys may be employed. Three layer conductive lines of Cr-Cu-Cr at respective thicknesses of 50 nanometers, 450 nanometers, and 50 nanometers may be illustratively employed for row or column conductors. Each conductive line addresses a group of emitters designated a pixel or sub-pixel. When the gate voltage is raised and emitter voltage is lowered, the electrons are emitted toward the anode. Switching voltages are selected so that negligible numbers of electrons are emitted when just one line or row is addressed. Both must be addressed for strong turn-on of a pixel. Electrons pick up the majority of their energy from the anode bias (generally >200 V and up to 20 KV–40 KV depending upon design). The high resisitivity layer enhances uniformity in the display by becoming the principal factor in determining the current emitted when a pixel is addressed, and not the emitter radius of curvature or emitter work function (provided all devices are biased above turn-on levels). The high resistance resistors also make the display immune to shorting defects. Each emitter functions independently, and groups of emitters close together can still function is one is shorted. Little added current is drawn to the overall display when a few emitters are shorted. The display can still be virtually perfect when many emitters are used in each pixel, e.g., >50 emitters/pixel, since no one emitter will affect even one pixel by >5% brightness.

Once the display or triode arrays are assembled and sealed, the resistive layers can be removed without a lithographic process, since the frit or other seal protects the resistors inside the vacuum cavity from the etchant. This step is desired, to allow for connection of the emitter conductors. The same or similar steps may be employed to remove dielectric on top of the gate conductors at the perimeter of the display or triode array.

In use, gray scale brightness is preferably controlled by pulse duration of the selected pixels or sub-pixels, but control is also possible using current or voltage level modulation on the gates or emitters.

The use of a dual dielectric under the metal gate to minimize surface leakage over the surface of the dielectric between the gate and emitter is also advantageously employed, to provide combined undercut dielectric and an unetched dielectric layer immediately under the gate metal, for creation of a dielectric "cave" with low electric fields across the dielectric. Such structure also protects the dielectric gate-emitter side walls during the deposition of low work function coatings on the emitter tip. Useful low work function coatings include barium and diamond.

Such coatings are applied using the natural overhang mask of the gate conductor. Shadow masks, patterning and etching, or lift off patterning may optionally be employed to provide coating-free perimeters or sections of the display. An additional lift off layer may be deposited during the gate conductor deposition process and used to permit lift off removal or neutralization of the coating. Since an insulator is deposited on top of the gate, removal of low work function coating from the gates is optional as long as it does not interfere with frit sealing at the edges of the display, or unless very high anode voltages are employed.

FIGS. 110 and 111 are top plan views of two respective arrangements of field emitter arrays, including a block array 250 in FIG. 110 and a sub-group pixel cell array 251 in FIG. 111, each of which is shown with its associated resistor 252 and gate conductor 253.

Trenches may be etched into the ceramic or glass substrate, and subsequently metal and optional resistor lines may be deposited into the trench and then lifted off. Such approach minimizes the step coverage problems associated with gate conductor crossovers over the emitter conductor and resistor lines. A spin-on, spray-on, or reflowed CVD material and an etch back step such as RIE may be employed to fill any crevices at the edge of these trenches as an option. Horizontally, or vertically, conducting resistors also may be built into gate lines.

FIG. 112 is a sectional elevation view of an emitter structure 254, according to a further embodiment of the invention.

The emitter structure 254 comprises a substrate 265 on which a base member 256 comprising an emitter conductor layer and a resistor layer is provided, surrounded by insulator or dielectric 257, with the base structure 256 supporting a column emitter 13 with emitter tip 8 in spaced relationship to the gate conductor 35, which in turn is overlaid with a resistor 16, and a metal strap 258 to the gate conductor, which can be the same metal as the gate conductor itself. The resistor 16 may cover all the gate conductor, or just be near the gap.

FIG. 113 is a sectional elevation view of another field emitter structure 260, wherein corresponding parts are numbered correspondingly to FIG. 112, but featuring a different gate conductor arrangement. On the bulk insulator 257 is provided a top insulator layer 261 which may be of SiO, overlying which is a gate conductor layer 262 at the emitter locus. Gate conductor 262 in turn is overlaid with an upper insulating coating 263 which may for example be formed of SiO. The gate conductor 262 may itself be formed of molybdenum or other suitable material.

A primary gate conductor 264 is provided, which is overlaid with resistive layer 265. The primary gate conductor 264 may be etched back at region 266 to eliminate shorting problems.

FIGS. 114–117 illustrates steps of a multi-step process for forming a trench conductor structure according to a further embodiment of the invention.

Figure 114:
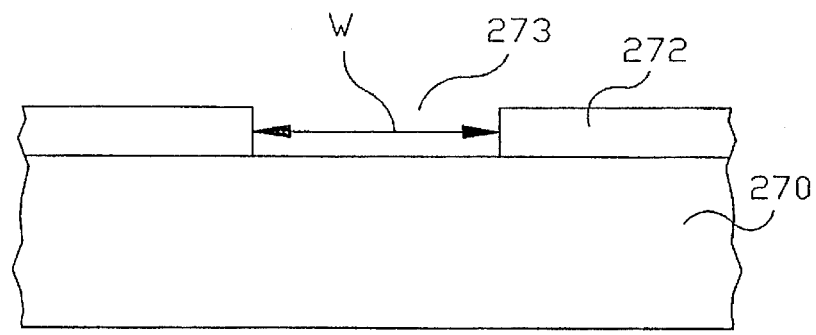
FIGS. 114–117 illustrate steps in a multi-step process for forming a trench conductor structure according to a further embodiment of the invention.

As shown in FIG. 114, a substrate 270, e.g., of $SiO_2$, is patterned with a resist layer 272, to define a non-resist region 273 whose width W may be on the order of 20 nanometers. The resist itself may be approximately 1.5 micrometers in thickness, and may suitably comprise a positive novalak resist material.

Figure 115:
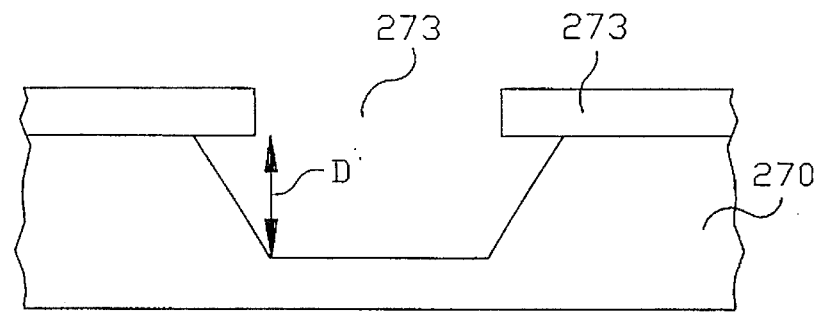

Next, as shown in FIG. 115, the $SiO_2$ substrate 270 is etched to a depth, as indicated by dimension D, of approximately 3 micrometers, with the etching being carried by RIE, plasma, or wet chemistry techniques.

Figure 116:
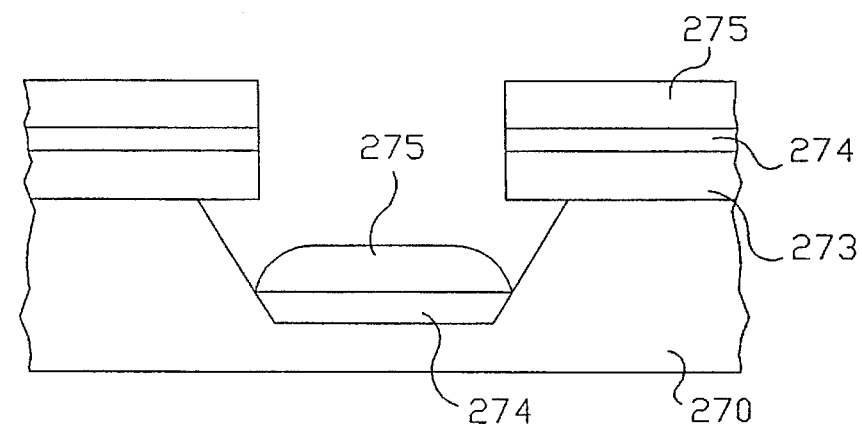

Subsequently, as shown in FIG. 116, a conductor 274 is deposited on the structure, followed by deposition of resistor 275, yielding the structure shown in FIG. 116. The conductor may be formed of Cr/Cu/Cr at a thickness of 1 nanometer, and the resistor 275 may comprise a cermet material at a thickness on the order of about 2 nanometers.

Figure 117:
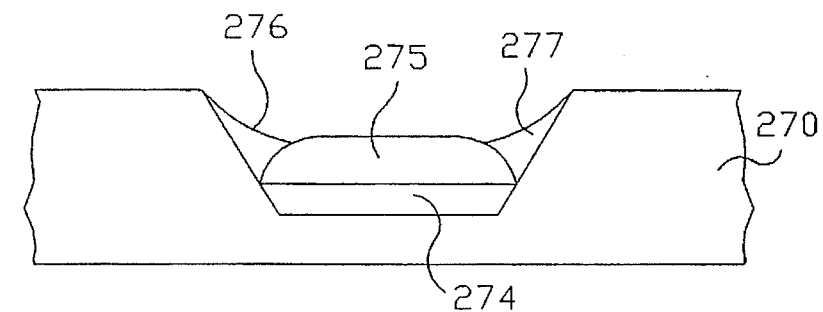

Solvent stripping then is carried out to remove layers 273, 274, and 275 from the upper main surface of the substrate 270, yielding the structure shown in FIG. 117, wherein the conductor 274 having resistor 275 overlaid thereon is disposed in cavity 276, and the edges 277 of the cavity surrounding the resistor may be filled as shown to complete the structure.

An optional dielectric may be employed to provide an etch stop in the field regions of the device. The sputter dielectric can be of a material such as aluminum oxide or silicon nitride. It self-aligns and separates from the emitters during the deposition due to the undercut of the emitter cap, but remains in the field between the metal lines. The sputtered dielectric minimizes the undercut of dielectric in the field of the devices, and thereby increases high voltage breakdown resistance.

As discussed hereinabove, vacuum gettering may be employed in the panel, and such gettering may be incorporated into the anode as a coating, into the black matrix around phosphor pixels or phosphor lines, into/on the spacer, on the gates, or in a section of the display provided as an appendage, all as previously described.

Figure 118:
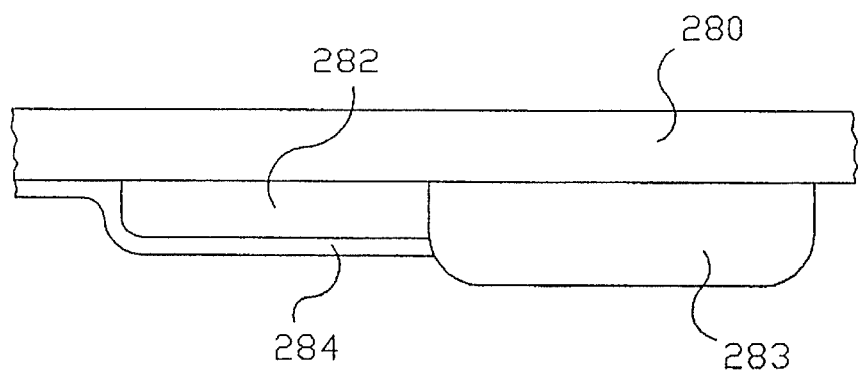
FIG. 118 is a sectional elevation view of a vacuum gettering structure according to one embodiment of the invention.

FIG. 118 is a sectional elevational view of a vacuum gettering structure according to one embodiment of the invention, showing a glass plate 280 having a phosphor 282 thereon, contiguous to getter 283. The getter 283 may suitably comprise a titanium and carbon composition, optionally with barium as a black matrix/line material, and the phosphor may be coated with an aluminum coating 284 for reflection enhancement. The aluminum coating 284 may be on the order of 60 nanometers in thickness, and the aluminum coating may in turn be coated with a thin film, e.g., 1–2 nanometers thickness, of barium to enhance the gettering activity of the structure shown in FIG. 118. Generally, such barium layer is not over 2–3 nanometers in thickness, since at higher thickness levels, electron absorption effects are significant, unless high voltages are used.

Figure 119:
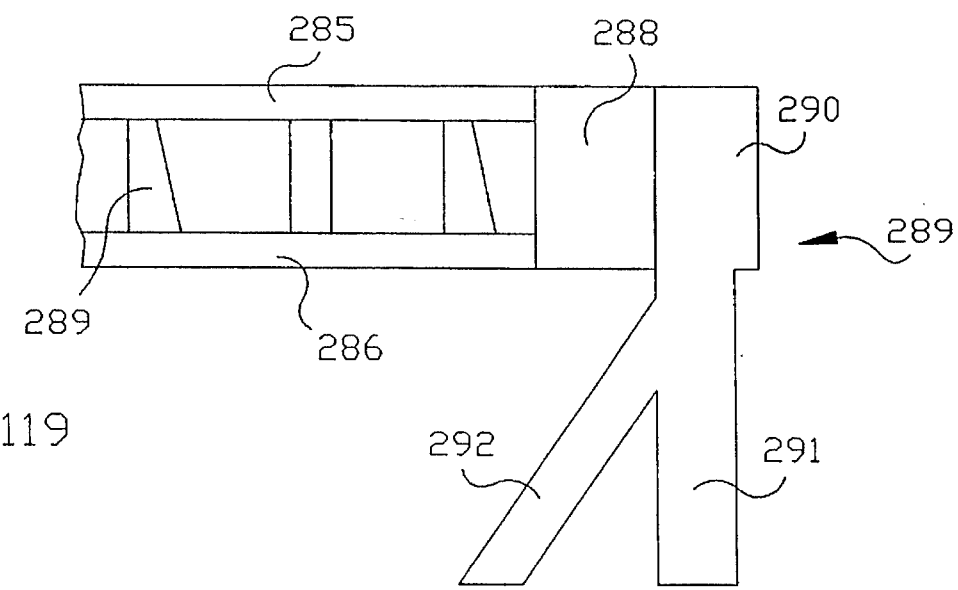
FIG. 119 is a sectional elevation view of another vacuum gettering structure, according to a further embodiment of the invention.

FIG. 119 is a sectional elevation view of another vacuum gettering structure according to a further embodiment of the invention, wherein the top plate 285 and bottom plate 286 are spaced apart by suitable spacer means 287, and the etch portion 288 of the panel is connected to a vacuum-forming device 289 comprising a connection 290 which may be joined to the etch 288 of the panel in gas flow communication relationship, by any appropriate coupling, connection, or sealing means or method. The vacuum-drawing structure 289 comprises a main vacuum pump tube 291, which is selectively sealable, and may be initially coupled to vacuum-drawing means, such as a mechanical vacuum pump. Alternatively, the tube 291 may be provided with closure means which are selectively openable to join the panel to such mechanical vacuum-drawing means, whereby the panel may be reconditioned by mechanical pump-down to suitably low vacuum levels, e.g., when the getter in vacuum structure 289 is depleted. Adjacent the tube 291 is an extension chamber 292 having a suitable getter (not shown) disposed therewithin. The extension 292 is in gas flow communication with the coupling 292 and interior volume of the panel, so that the getter therein exerts an effective gettering action on extraneous gases contained in the vacuum enclosure. The extension 292 is formed so that localized heat can be applied thereto, since the rate of chemisorption or gettering is increased with higher temperature. Thus, the getter may be heated to enhance this activity and actively take up additional nitrogen and oxygen resulting from inleakage into the panel during use thereof, or extended storage before use.

Figure 120:
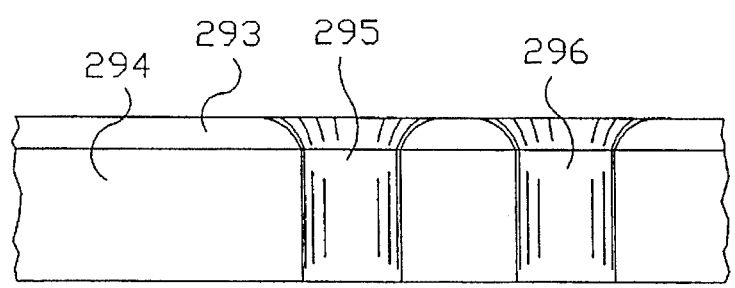
FIG. 120 is view of still another vacuum gettering structure, according to a further embodiment of the invention.

FIG. 120 is a still further vacuum gettering structure according to a further embodiment of the invention, in which a layer of barium or other suitable gettering material 293 is deposited on the anode side of spacer 294 having pixel openings 295 and 296 therein.

Figure 121:
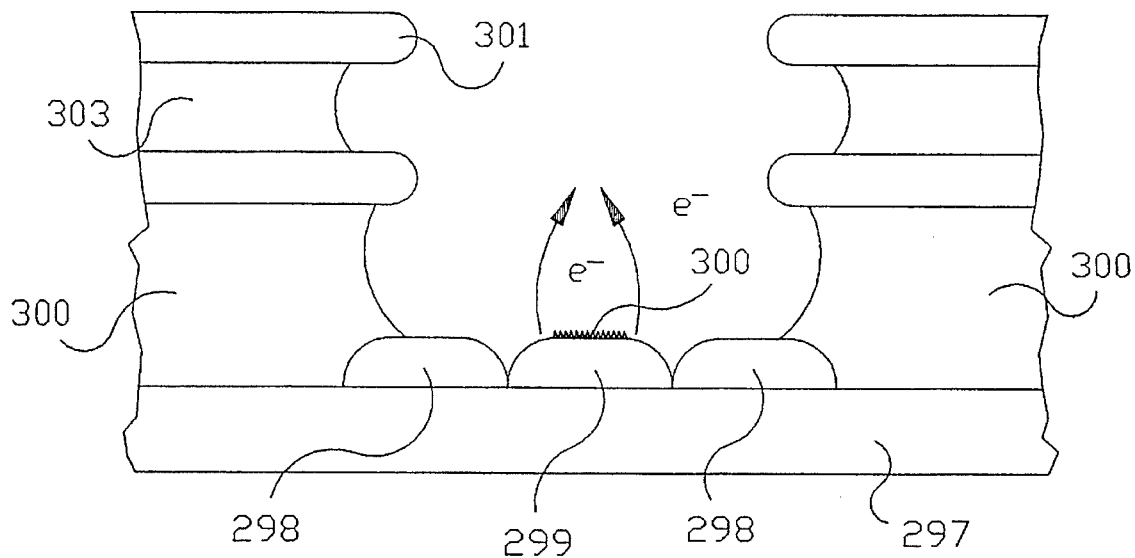
FIG. 121 is a sectional elevation view of a field emitter structure according to another embodiment of the invention, featuring a flat top emitter.

FIG. 121 is a sectional elevational view of field emitter structure according to another embodiment of the invention, featuring a flat top emitter.

As illustrated, the structure includes a substrate 297 of glass or other suitable material, on which is deposited a high work function material 298, on either side of an intermediate low work function material 299. The high work function material 298 may for example comprise silicon or molybdenum, and the low work function material may for example comprise diamond. Overlying the substrate and portion of the high work function material 298 is an insulator layer 300, overlying which is an array of gate electrodes 301 and 302 separated by insulator layer 303, as shown. The gate electrodes 301 and 302 by this arrangement, in which the low work function material 299 is disposed between deposits of high work function material 298, provides a self-focusing emitter structure, in which the electron flux is focused to the central axis of the cavity containing the low work function material having flat top, and bounded by the edges of gate electrodes 301 and 302.

Gate electrode pairs may also be built on the substrate or separately formed from the spacer and placed on the emitter array. Such a spacer will require X-Y grid lines as used in multi-chip modules.

Figure 122:
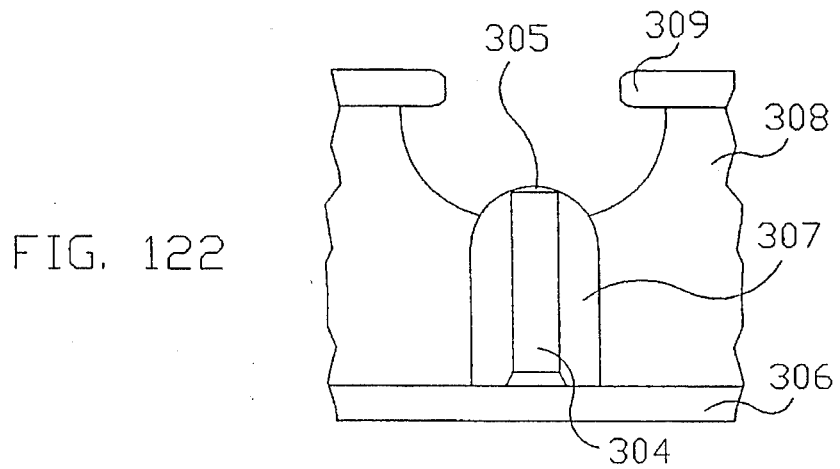
FIG. 122 is a sectional elevation view of a column version of a flat top emitter structure according to an embodiment of the invention.

FIG. 122 is a sectional elevation view of a column version of a flat top emitter structure according to an embodiment of the invention, in which the column 304, of material such as silicon and having a flat diamond layer 305 on its upper surface, is disposed on substrate 306, and a high work function material 307, such as molybdenum, is deposited along the side surfaces (shank) of the column emitter 304, with the high work function material in turn being contacted by the insulation or dielectric layer 308, on which is disposed a gate electrode 309.

Referring again to FIG. 121, the flat top emitter of low work function material 299 may optionally have a roughened top surface 310, such as diamond micro-crystallites formed thereon.

In the columnar structure shown in FIG. 122, the high work function side walls 307 promote self-focusing of electrons emitted from the upper diamond emission surface 305.

Figure 123:
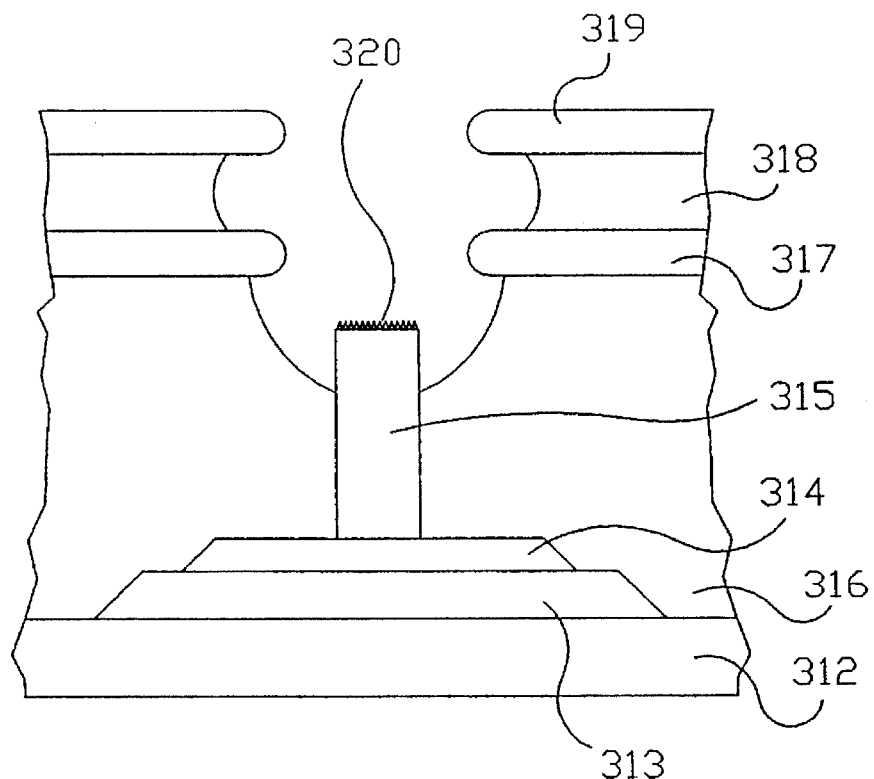
FIG. 123 is a field emitter structure comprising a polished column emitter element with a ring emitter rim on its upper extremity.

FIG. 123 is a field emitter structure comprising a polished column emitter element with a ring emitter rim on its upper extremity.

The use in the structures of FIGS. 121 and 122 of a high work function side wall or shoulder element serves to effectively promote self-focusing of emitted electrons, and increase the surface path length between the emitter and gate, thereby reducing potential dielectric surface leakage.

As shown, the emitter structure comprises a substrate 312 of glass or other suitable material, on which a conductor layer, e.g., Cr-Cu-Cr composition, is deposited as layer 313. On the conductor layer 313 is deposited a resistive layer 314, which may be formed of Cr and $SiO_2$. On the resistive layer is provided a column 315 of suitable material such as silicon and antimony, and the post 315, resistive layer 314, and conductor layer 313 are disposed in contact with insulator layer 316, which may be formed of $SiO_2$ or other suitable material. Overlying the insulator layer 316 is an upper insulating layer 317 which may be formed of SiO or other suitable material, on which is deposited a conductor metal 318 such as molybdenum, and a top insulator layer 319 of SiO or other suitable material. On the upper extremity of column 315 is provided a diamond rim 320 of microcrystallite structure. This polished column emitter featuring a ring emitter on its upper extremity provides a low cost option for emitter construction. It affords a sharp edge of low work function emitter material such as diamond on top of a low capacitance column or post.

As a further structural alternative, a gated field emitter structure may be formed using conductive posts, optionally over resistors, with evaporated cones on top of the column, wherein the cones are of the type disclosed in Spindt et al U.S. Pat. No. 3,665,241, with the top of the column being polished.

The present invention also contemplates virtual column emitter structures for use in fabrication of low power, high brightness field emission based flat panel display structures. This aspect of the invention contemplates a virtual column isolation structure for field emitter devices and provides a method of setting precise resistance values in each emitter base not provided by lateral conduction approaches. The resulting film must be resistive or conductive under the emitters, and highly resistant or insulating in the regions around and away from the emitters.

A low cost, self-aligned gate and emitter process with emission control and protection resistance built into each field emitter is provided in a structure comprising a conductor layer, an optional resistor layer, a modifiable conductor or insulator layer self-aligned to the emitters, and the gated emitter. Such virtual column structure can be combined with many types of emitter structures.

As used herein, a "virtual column field emitter structure" is a structure comprising an emitter or gated emitter with conductive columns connecting the emitter to an underlying resistor or conductor structure which is formed by chemical or dopant modification of a portion or portions of an underlying layer.

Figure 124:
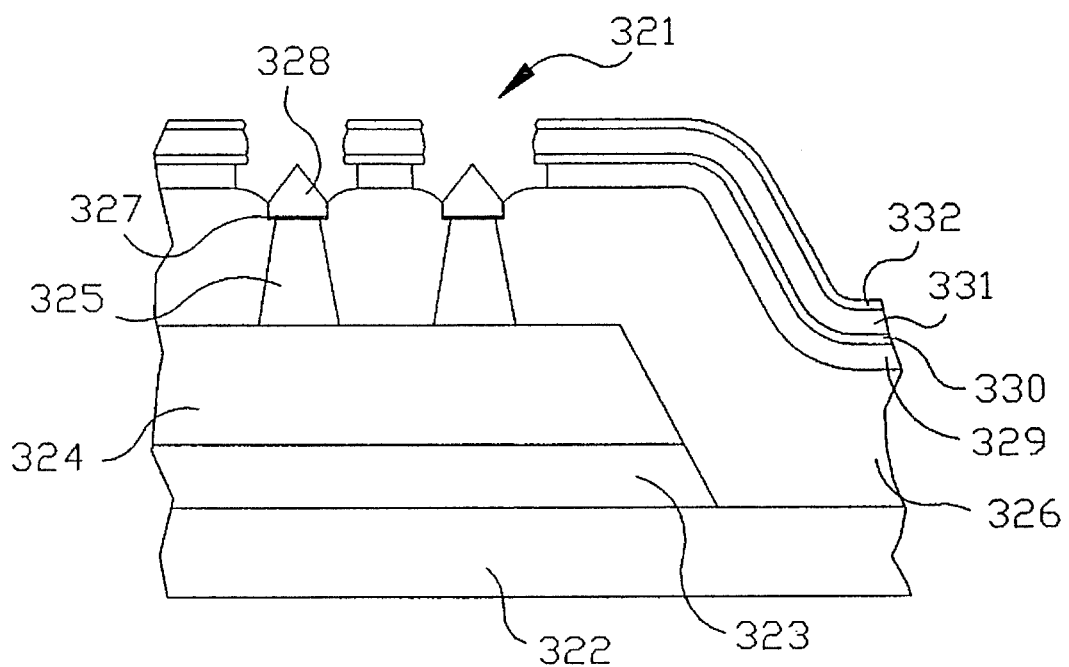
FIG. 124 is a sectional elevation view of a virtual column field emitter structure according to one embodiment of the invention.

FIG. 124 is a sectional elevation view of a virtual column field emitter structure according to one embodiment of the invention.

As shown, the virtual column field emitter structure 321 comprises a substrate 322, such as a sodium glass material, on a portion of which is deposited a conductor layer 323 which may for example comprise a layer of aluminum and copper. Overlying the conductor layer 323 is a resistor layer 324, which may for example comprise a cermet material such as $Cr+SiO_2$.

On the resistor layer 324 is provided a conductive or resistive region 325, and an insulating portion 326 of a modifiable film. The conductive or resistive region may comprise aluminum or silicon, while the insulating portion 326 may after modification comprise alumina ($Al_2O_3$) or silica ($SiO_2$). Alternatively, the conductive or resistive region 325 may comprise a polymer, and 326 may comprise a non-conductive polymer.

On the top surfaces of the conductive or resistive regions 325 is provided a layer 327 of a base conductor such as titanium or chromium, and on such base conductor layer is provided an emitter tip structure 328, optionally coated with a material such as N-doped diamond, which may be formed of a material such as polysilicon.

Adjacent to the emitter tips 328 is a gate array including insulative layer 329, which may comprise $SiO_2$, second insulative layer 330 of an insulator material such as SiO, a conductor layer 331 of metal such as aluminum or copper, and an upper insulator layer 332 of a material such as SiO.

Base conductor layer 327 may be dispensed with in some applications and embodiments, but generally is preferred to ensure highly efficient field emitter operation.

Figure 125:
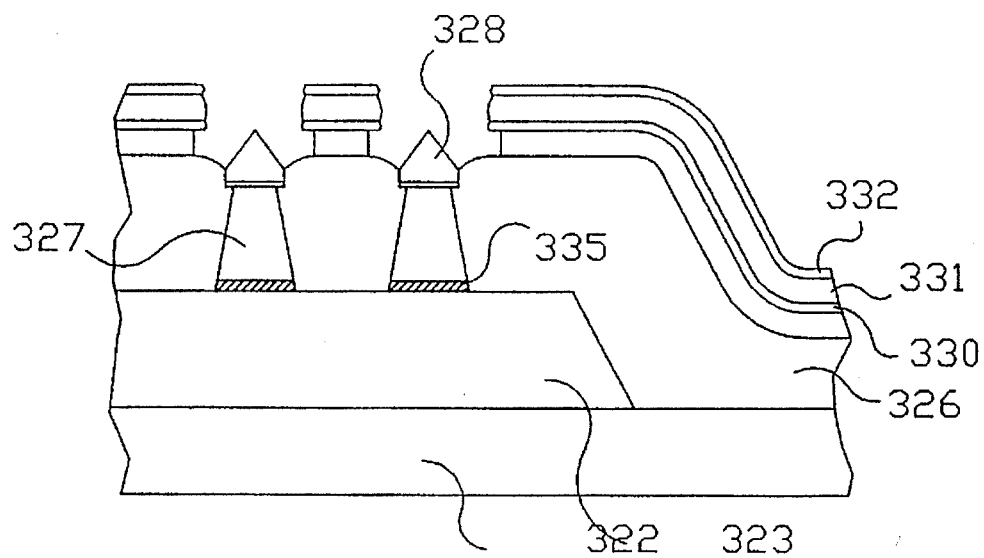
FIG. 125 is a sectional elevation view of another virtual column field emitter structure of the invention.

FIG. 125 is a sectional elevation view of another virtual column field emitter structure of the invention, which does not comprise a resistor layer as in the embodiment shown in FIG. 124. In FIG. 125, corresponding elements are numbered correspondingly with respect to FIG. 124. In contrast to the FIG. 124 embodiment, however, the structure shown in FIG. 125 does not employ a resistor layer, and additionally the FIG. 125 structure employs an optional base conductor layer 335 between the conductive or resistive region 327, and the conductor 323.

FIGS. 126–133 illustrate steps of a multi-step process for forming a virtual column emitter structure.

Figure 126:
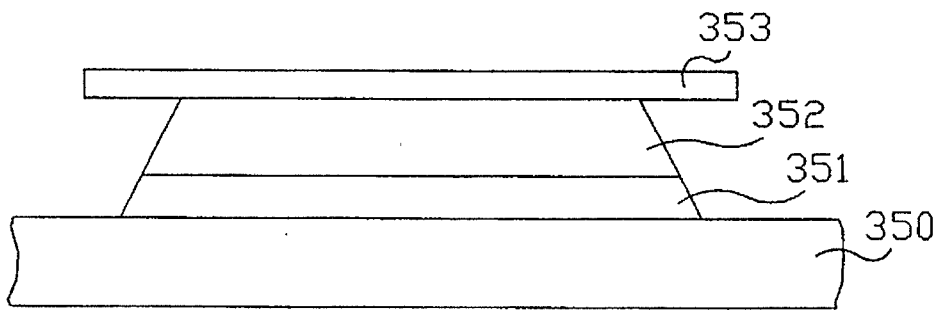
FIGS. 126–133 illustrates steps in a multi-step process for forming a virtual column emitter structure.

As shown in FIG. 126, a substrate 350 of glass or other suitable material (insulator material, or insulator-coated conductors may be employed in the fabrication of displays, conductive substrates being acceptable for non-addressed X-Y address sources), and on this substrate a conductor layer 351 is deposited, such as a layer of sputtered aluminum +4% copper, at a thickness of 1 micrometer.

Next, a resistor layer 352 is optionally deposited, and such layer may for example comprise sputtered silicon dioxide+ chromium, at a thickness of 1.5 micrometers.

The coated substrate is the patterned and etched, utilizing a resist film 353; optionally, a lift-off patterning step could be employed.

Figure 127:
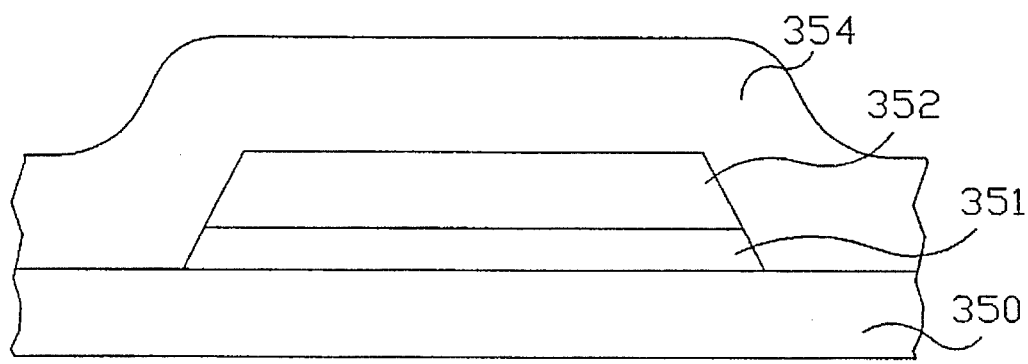

The resist is removed, and as shown in FIG. 127, an intermediate modifiable layer 354 is deposited.

This intermediate modifiable layer 354 may be provided as an insulating layer (non-conductive film) which may comprise undoped amorphous silicon or a non-conductive photopolymer; alternatively, the modifiable layer may be provided as a conductive film as for example of aluminum, sputtered doped silicon, or conductive polymer. Within the broad scope of the invention, any method of creating a variable conductivity structure is contemplated, which connects emitter bases to underlying conductors or resistors, e.g., chemical modification such as oxidation or anodization, ion implantation or ion damage, or forming porous regimes which can be chemically deactivated such as with porous silicon exposed to heated $H_2O_2$ or $O_3$. Photomodification or organic or inorganic deposits may be employed to change the resistivity of regions not covered by emitter patterns. For example, organic conductive polymers may be exposed to ion beams or UV radiation, or mixtures of metal particles and oxidizers can be optically activated. The modifiable layer 354 may optionally be etched to separate addressing lines. The use of such a modifiable layer in the dual role of connector and resistor as illustratively described eliminates a separate resistive layer. Thus, the same intermediate layer 354 may be selectively provided with conductive portions and non-conductive portions, consistent with the prior description of FIGS. 124 and 125.

Figure 128:
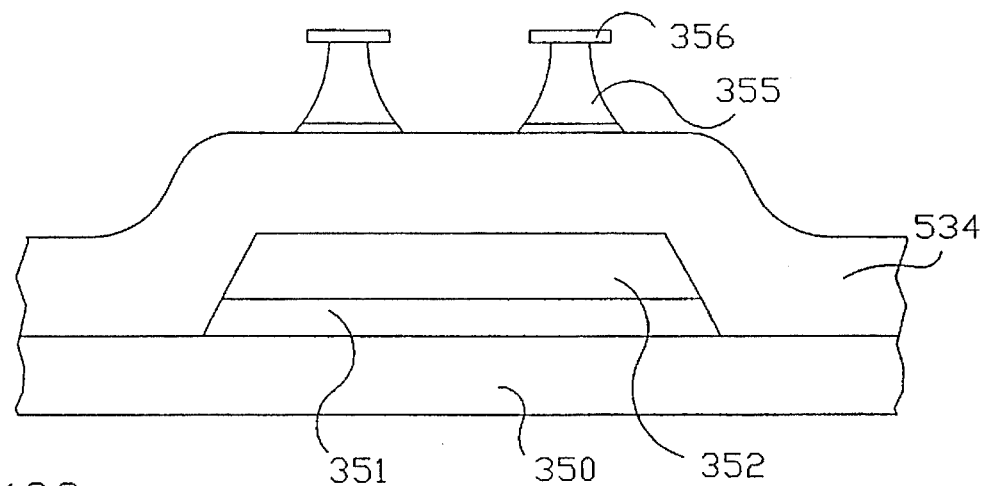

Following the provision of the modifiable intermediate layer 354 the emitter base is deposited. The base is formed by depositing a base layer 355 as shown in FIG. 128, followed by deposition of a cap layer 356. The base layer 355 may be of sputtered silicon or tantalum, and the cap layer 356 may be formed of $SiO_2N_4$ by plasma enhanced chemical vapor deposition (PECVD), followed by etching to form mesas, as shown in FIG. 128, wherein the non-conductive film 354 may be formed of undoped amorphous silicon or non-conductive photopolymer.

For the formation of evaporated emitters of the structure described in Spindt et al U.S. Pat. No. 3,665,241, the transformation of the underlayer 354 should occur after point formation unless a patterned conductive layer is deposited under the emitter area.

Figure 129:
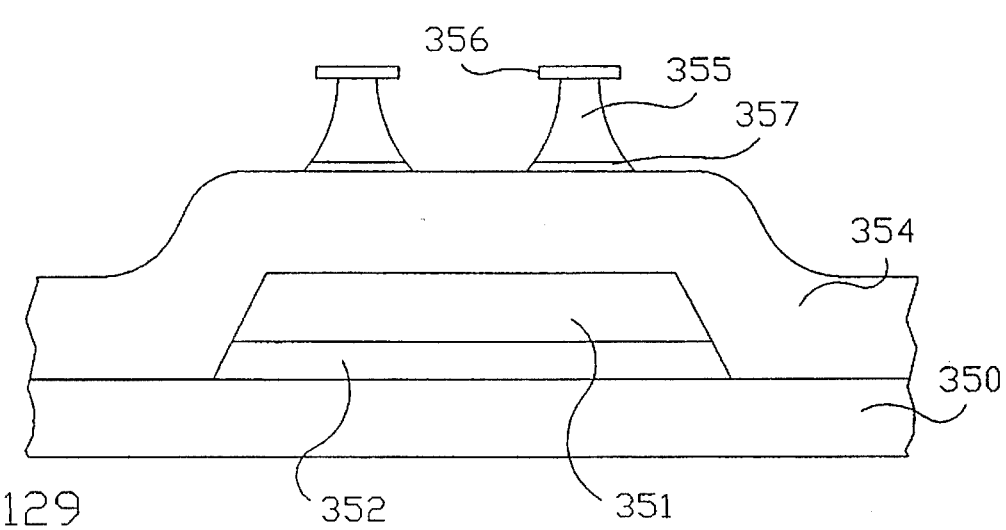

FIG. 129 corresponds to FIG. 128 and shows the deposited emitter base on a conductive film 354, in which an optional base conductor layer 357, of tantalum, titanium, TiW, Cr, or other suitable material, is provided under the base layer 355. In this embodiment, the conductive film 354 may be formed of aluminum, polysilicon/-amorphous silicon, or conductive polymer.

Figure 130:
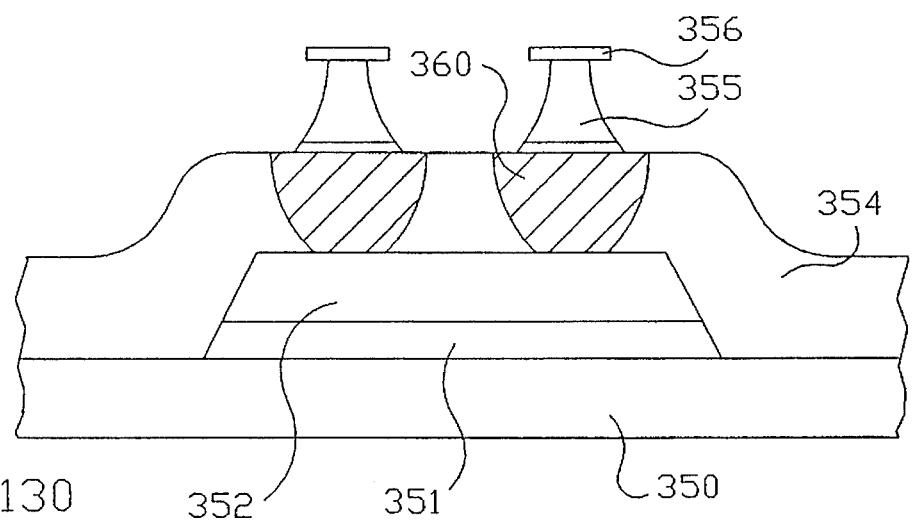
Figure 131:
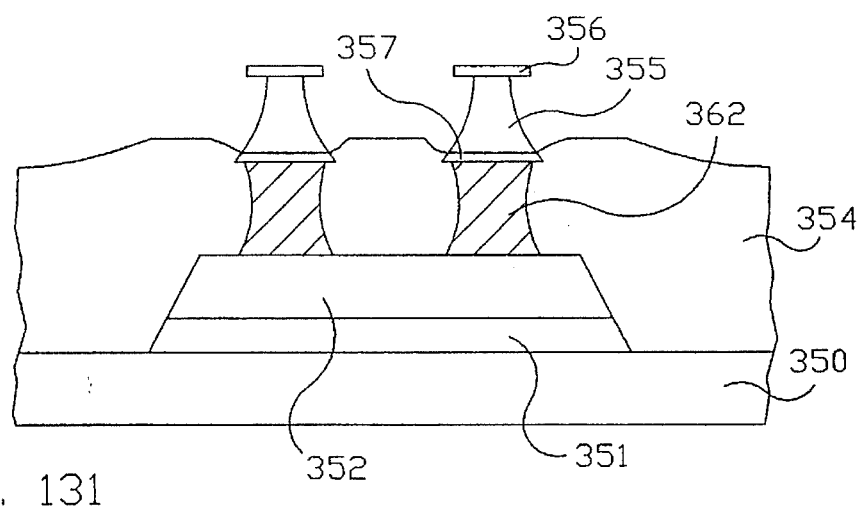

Next, the emitter base is modified to provide variable conductivity regions, as alternatively shown in FIGS. 130 and 131, FIG. 130 corresponding to FIG. 128 as a further fabricated structure thereof, and FIG. 131 corresponding to FIG. 129 as a further fabricated structure thereof.

Referring to FIG. 130, the non-conductive film layer 354 is treated with a dopant or reactant which diffuses or otherwise penetrates into the regions 360 to increase the conductivity thereof, as for example for diffusion of platinum into the layer 354, in regions 360.

Referring to FIG. 131, conductive layer 354 may in the regions around the emitters, outside of regions 362, may be made non-conductive in character in any suitable manner, depending on the composition and character of layer 354.

For example, when layer 354 is aluminum, the portions outside regions 362 may be made non-conductive by anodizing the aluminum outside of such regions. In the case of silicon, the silicon may be rendered porous and oxidized in $O_3$ or $H_2O_2$. In the case of a conductive photopolymer as layer 354, the polymer may be exposed to UV or ion beam radiation, to render the polymer non-conductive in such areas outside of region 362.

A gated emitter structure then is formed by any suitable method, such as the method disclosed in Spindt et al U.S. Pat. No. 3,665,241. Evaporated emitters of the type disclosed in this patent may be formed with modifiable layer transformations after deposition, unless a patterned conductive layer is deposited under the emitter areas to define the resistivity-modified regions prior to deposition. In the formation of the gated emitter structure, gate material is deposited, along with gate insulator material, and emitter tips are etched to a point, followed by lift-off of caps.

Figure 132:
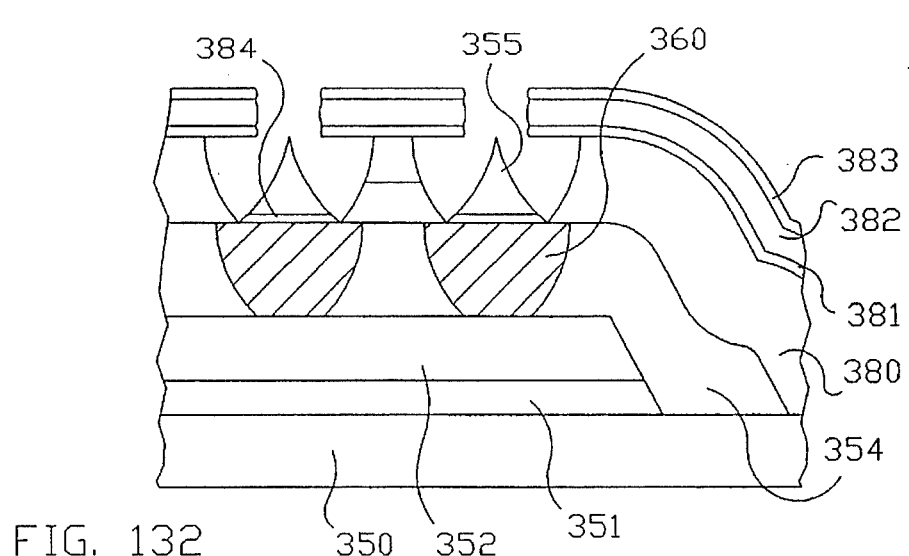

FIG. 132 corresponds to FIG. 130 and shows the gated emitter structure formed from the structure of such earlier drawing.

As shown, the layer 354 comprises a non-modified region of non-conductive material outside of regions 360, overlying which on an optional base layer 384 of platinum is disposed the emitter tip 355, surrounding which is the gate comprising insulator layer 381, conductor layer 382, and insulator layer 383.

Figure 133:
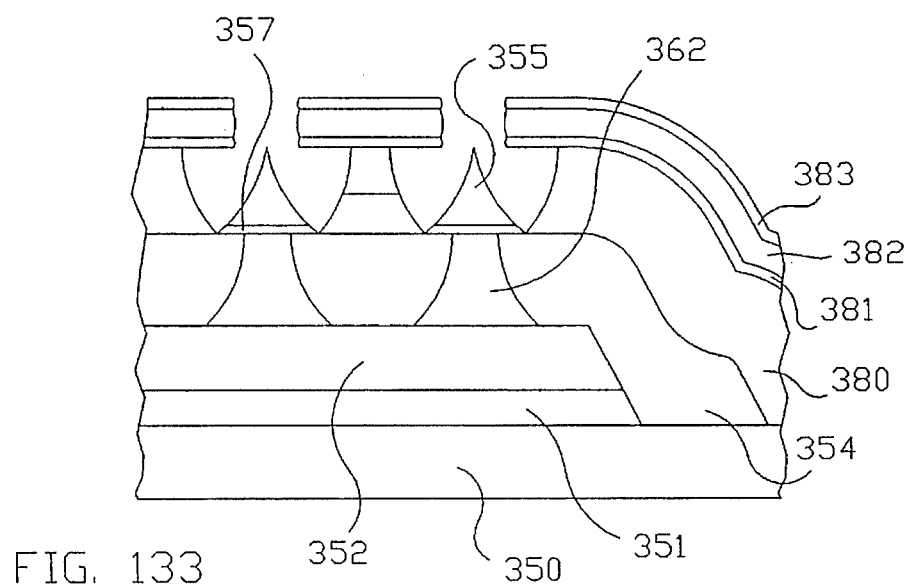

FIG. 133 is numbered correspondingly to FIG. 132, as a further fabricated structure of FIG. 131, comprising non-modified regions 362 of modifiable layer 354, wherein the regions 362 are conductive in character, and overlaid by layer 357, the optional base conductor layer, and in which the emitter tips are overlaid and surrounded by gate comprising insulator 381, metal layer 382, and insulator layer 383.

The emitter tips 355 in the embodiment shown in FIGS. 132 and 133 may optionally be coated with a layer of diamond or other low work function material.

The virtual column field emitter structure of the invention thus usefully employs a resistivity-modifiable layer between emitters and a conductor or resistor layer. Such modifiable layer may start out as conductive, resistive, or insulative in character. The resulting film as modified must be resistive or conductive under the emitters, and highly resistive or insulating in the regions around and away from the emitters. Source layers may as described above be employed to modify conductivity of self-aligned connections to individual emitters, and oxidation, chemical modification, anodization, ion implantation, or permeation may be employed to increase the resistivity or form insulators from the regions surrounding emitters, while leaving a conductive region underneath the emitters.

Porous silicon structures may be formed in uncovered regions around emitters which then may be made highly resistive by chemical oxidation. Photomodification may also be employed, and such modifiable layer may be optionally patterned over address lines. A resistive layer may be employed under the modifiable layer where the size of the emitter base and resistive layer conductivity determines the emitter base resistance, and a modifiable layer may be employed as a resistor in each emitter base. Finally, a stable base layer may be employed under the emitters to provide a constant emitter base area electrical connection during conversion of the modifiable layer.

The present invention further contemplates permeable base substrates. Substrates with perforations and additional spacer and plate (such spacer and plate elements being combinable into a single unitary structure if desired) may be employed to create a cavity for getter distribution. Such arrangement permits large area chemical getter to be used to provide high vacuum in the panel enclosure, and reduces the conductance distance that gases to be gettered must travel in order to be chemisorbed.

Electrical feedthroughs may be provided to resistance heat the getter for activation thereof, or other heating processes such as laser activation may be employed which do not require electrical feedthroughs. In all instances, the getter should be prevented from affecting the phosphors or the emitter/interconnect structures. This may be achieved by high aspect ratio holes in the field emitter array substrate, with placement of the getter away from the holes, or by using protection structures over the perforations, such as spacer positioning, mesh, or another perforated plate.

Figure 134:
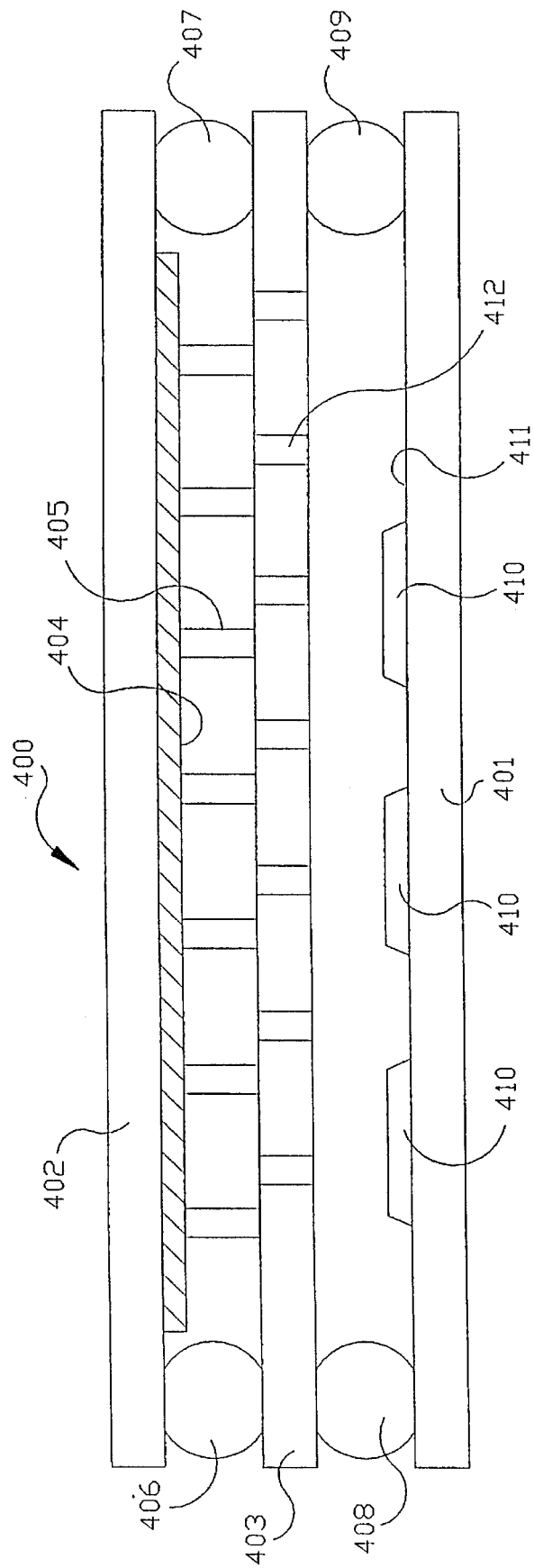
FIG. 134 is a front elevation, sectional view of a portion of a display panel according to another embodiment of the invention.

FIG. 134 is a front elevation sectional view of a portion of a display panel according to another embodiment of the invention. The display panel 400 includes glass end plates 401 and 402 in spaced-apart relationship to one another, and with a porous base 403 of glass or other suitable material therebetween.

A phosphor pattern 404 is provided on plate 402, optionally with ITO or aluminum coating, and optionally with black lines of materials such as titanium and barium and carbon. A spacer matrix 405 of glass or other suitable material is provided between plates 402 and 403, and plates 402 and 403 are bonded to one another by means of glass frits 406 and 407, as shown. In like manner, plates 401 and 403 are leak-tightly joined to one another by means of glass frits 408 and 409. Connections to an X-Y address grid are also utilized as a part of the structure illustrated, but are not shown in the drawing. On the interior surface of plate 401 is disposed a chemical gettering material 410, which optionally may be contacted by resistance heating wire(s) 411, joined exteriorly of the panel housing to electrical power means for effecting heating of the chemical getter to activate same or enhance the activity thereof. The holes 412 in the porous base 403 may be located to minimize the effect on addressing lines and emitters and phosphors.

Thus, the present invention contemplates the provision of perforated substrates and an additional spacer and plate structure to create a cavity for getter distribution, as well as use of a chamber behind the porous emitter array to effectuate vacuum gettering. Activation of the getter may be achieved by patterned lines under/over the frit seal or by other activation processes such as flash high intensity light or laser heating through the backside.

Figure 135:
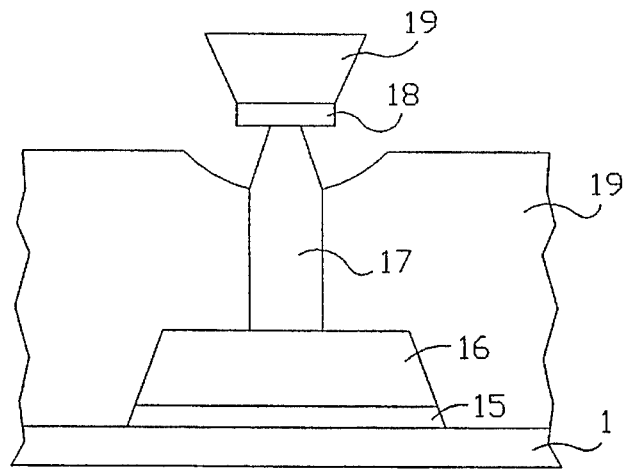
FIGS. 135–137 illustrate steps in a multi-step process for forming a field emitter structure according to yet another embodiment of the invention.
Figure 136:
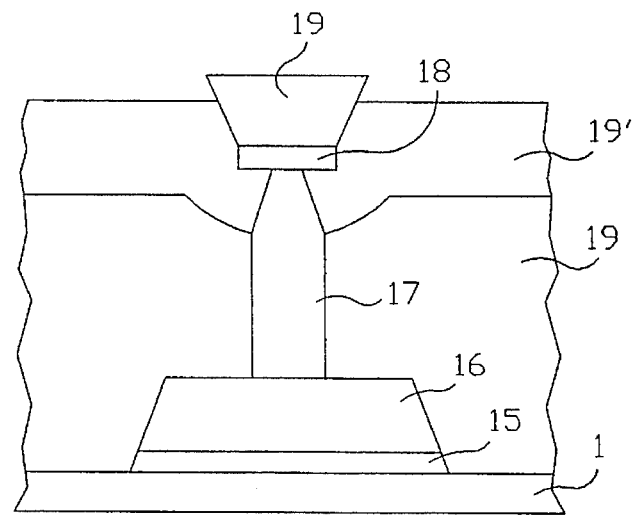
Figure 137:
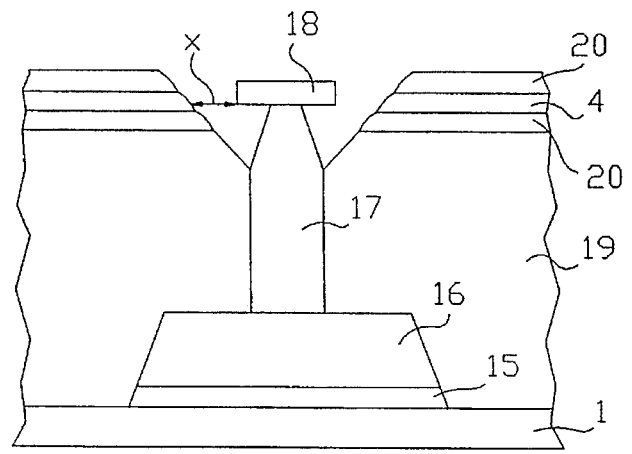

FIG. 135–137 illustrates steps of a multi-step process for forming a field emitter structure according to another embodiment of the invention.

FIG. 135 shows a partially fabricated structure analogous to that of FIG. 10, wherein the reference numerals in FIG. 135 are numbered correspondingly with respect to the same or corresponding parts in the FIG. 10 structure.

After fabrication of the structure shown in FIG. 135 the surface of the structure is overcoated with a sacrificial layer such as a photoresist layer 19'. The sacrificial layer 19' then is partially etched back via RIE (e.g., in oxygen) or plasma etch, resulting in the formation of the structure shown in FIG. 136.

Next, the caps of the columns are removed in BOE or hydrogen fluoride, and the sacrificial layer is stripped using a stripping agent such as NMP or acetone. Deposition then is continued, and the aforementioned steps of sacrificial layer deposition, etch-back, cap removal, sacrificial layer stripping, and deposition are sequentially repeated for sufficient number of times as required, and the structure shown in FIG. 137 is thereby formed, wherein the layer 19 of $SiO_2$ is overcoated with layers 20 of SiO and an intervening conductive metal layer 4.

By the foregoing process, the gate is brought closer to the emitter (i.e., the dimension x shown in the drawing becomes smaller), thereby lowering the turn-voltage requirement for the field emitter structure.

Figure 138:
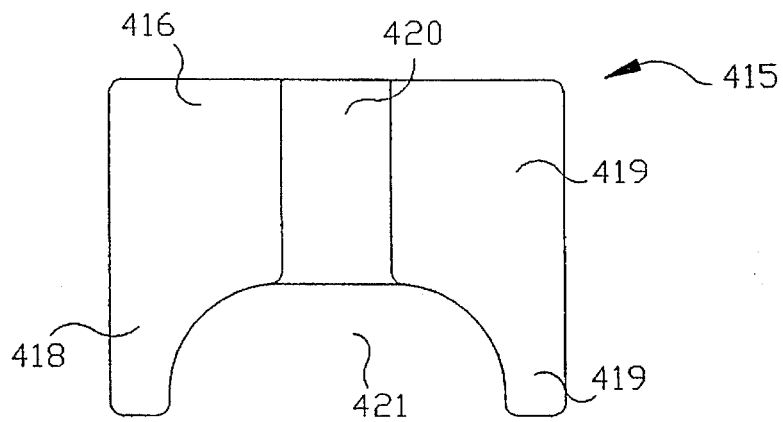
FIG. 138 is an elevation view of a spacer member according to one embodiment of the invention.

FIG. 138 is an elevation front view of a spacer element 415 which may be employed in display panels of the present invention.

As shown, the spacer element 415 in the portion shown comprises a central cavity 420 bounded by a left-hand main body portion 416 and right-hand main body portion 417, in the view shown. The left-hand body portion 416 has a lower foot extension 418 of reduced cross-section related to the upper part of such body portion, and the right-hand body portion 417 is correspondingly constructed with a lower foot extension 419 of reduced cross-section relative to the main body portion above same. By this construction, the feet extensions 418 and 419 bound lower open space 421.

Figure 139:
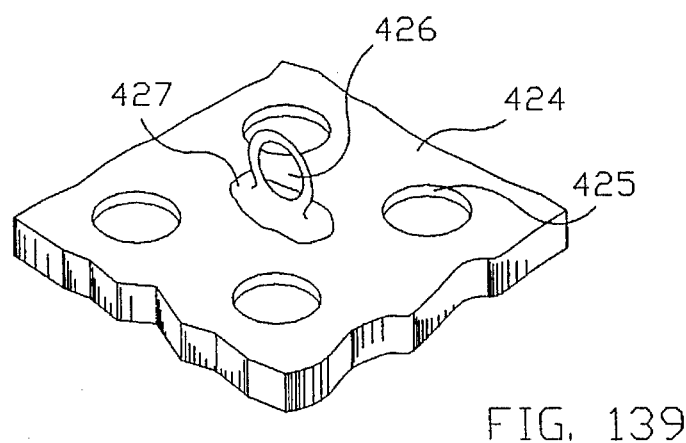
FIG. 139 is a perspective view of a spacer grid member, according to one embodiment of the invention.

FIG. 139 shows a spacer grid 424 having openings 425 therein and a glass bead 426 as a spacer element reposed on a frit 427 forming a base underlying the glass bead spacer element.

Figure 140:
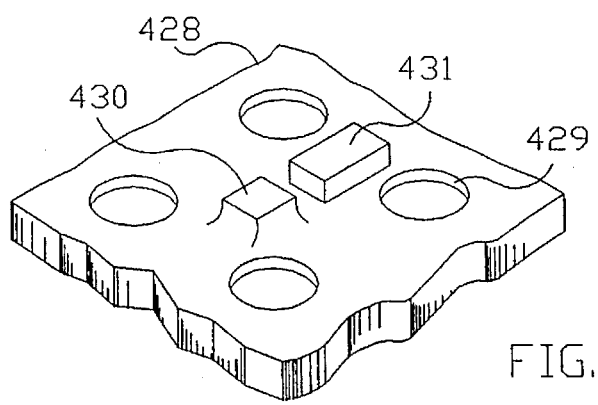
FIG. 140 is a perspective view of a spacer grid member according to another embodiment of the invention.

FIG. 140 is a perspective view of another spacer grid 428 having openings 429 therein, and wherein the spacer elements are shown as including a pressed or etched stand 430, and a separate spacer element 431 of rectangular solid form, which has been bonded or otherwise secured to the main plate of the spacer grid 428.

Figure 141:
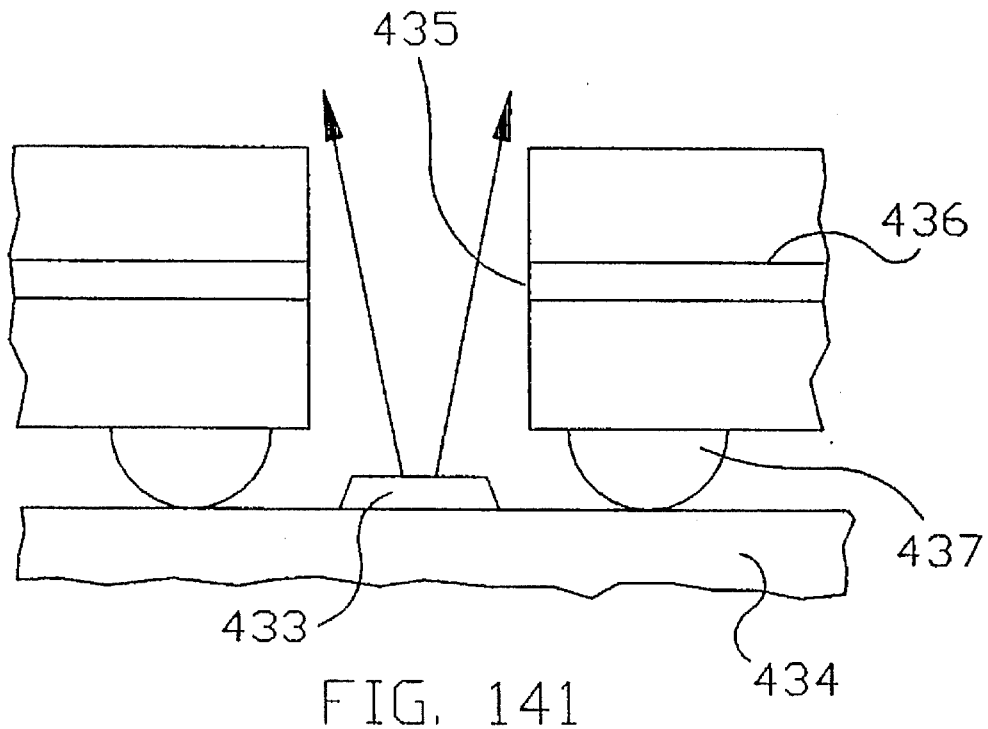
FIG. 141 is an elevation view of a field emitter structure according to another embodiment of the invention.

FIG. 141 is an elevation view of a panel sub-assembly, comprising an emitter element 433 having mesa-shaped body on base member 434, and a spacer 435 comprising a flashover arrestor layer 436 therein, for the purpose of shunting current away from the emitter arrays. In this construction, the main body portion of the spacer is maintained in spaced relationship to the top surface of the base member 434, by means of glass beads 437 which are secured to the spacer 435 structure by suitable means, as for example bonding of the glass bead 437 in a corresponding concave opening in the bottom surface of spacer 435.

Figure 142:
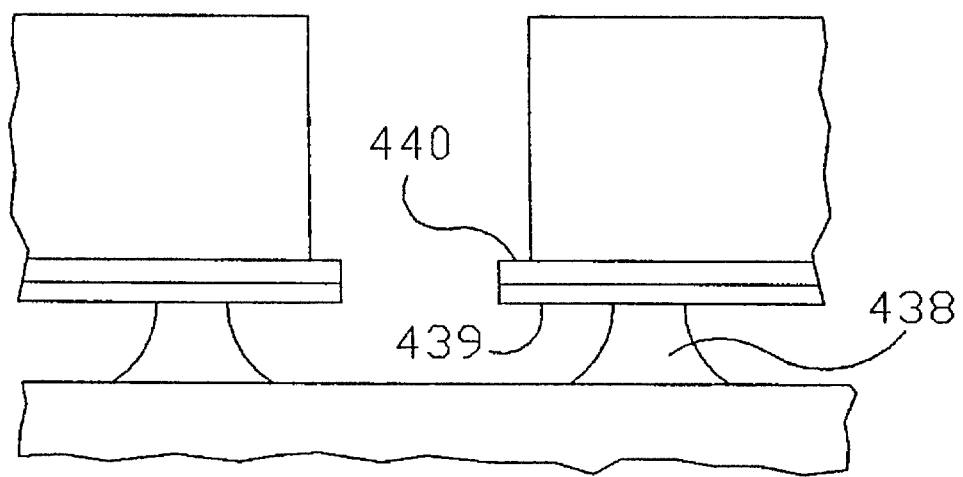
FIG. 142 is an elevation view of a field emitter structure according to still another embodiment of the invention.

FIG. 142 shows a panel sub-assembly, in which the spacer element 438 may suitably take the shape shown, or otherwise may comprise a frit, bead, bump, standoff, or a cut-in accommodating gas pumping within the interior volume of the display panel. The structure comprises a base conductor 439 with a thin dielectric coating to prevent gate-to-gate line shorting while permitting flashovers to shunt. The structure provides a charging point 440 to cut off leakage and flashovers. The base conductor thin dielectric coating suitably may comprise a dielectric material which is different from the dielectric material of construction of the spacer, and preferably such base conductor dielectric coating has a significantly higher dielectric constant than the spacer dielectric material of construction.

Figure 143:
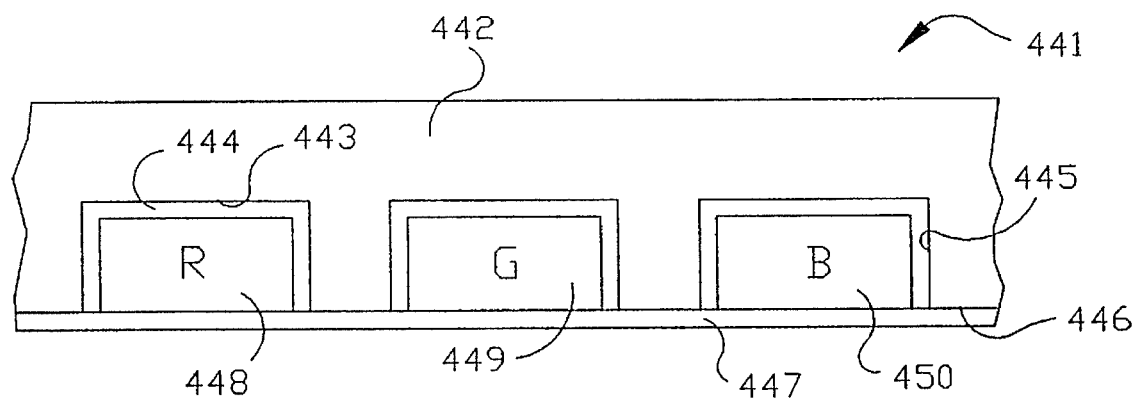
FIG. 143 is a sectional elevation view of a portion of a phosphor plate according to one embodiment of the invention.

FIG. 143 is a sectional elevation view of a phosphor plate assembly 441 comprising a main planar glass plate 442, having sequential cavities 443 formed therein, optionally coated on the back surface of the cavities with a coating 444 of silvering coating of suitable or other reflective material, e.g., aluminum. The side walls of the cavities 443 may be coated with a thin film coating of aluminum or other suitable metal, and optionally the front surface 446 of the plate may coated with aluminum film 447.

In the sequential cavities 443 are disposed red phosphor material 448, green phosphor material 449 and blue phosphor material 450, as shown.

In the manufacture of the phosphor plate assembly 441 shown in FIG. 143, the glass plate 442 is lithographically patterned. Following such patterning, grooves or dots, or other cavity structure, are etched in the glass plate. The back surface of the cavities 443 then may optionally be coated with a partial silvering layer e.g., with a suitable silvering material such as aluminum at a thickness of 400 Angstroms, and such aluminum may also be deposited by shallow angle deposition techniques on the side walls 445 of the cavities.

The first phosphor 448 is deposited via suitable technique, such as sputtering or evaporation or CVD. Next, the assembly is patterned and etched over the grooves or dots (cavities), and the same steps are repeated for other phosphor materials (i.e., other colors).

The phosphor-containing plate then is coated with a suitable resist material and then etched back, e.g., by RIE, to planarize the surface of the plate. In this respect, the presence of some residual phosphor above the surface of the glass plate 442, or etching below the original plane of the glass, is permissible in this process. After the resist coating and etch-back steps are completed, the plate article is cleaned, and a thin film 447 of aluminum, e.g., at 100 Angstroms thickness, is deposited over the plate surface featuring the exposed phosphors.

The foregoing phosphor plate structure and fabrication methodology have the advantage that the phosphor plate can produce a laser source light. Additionally, the structure of the phosphor plate permits variation of the light dispersion angle. Further, the structure permits the use of thin film phosphors which can nonetheless direct light toward the viewer, without light channeling in the phosphors.

Figure 144:
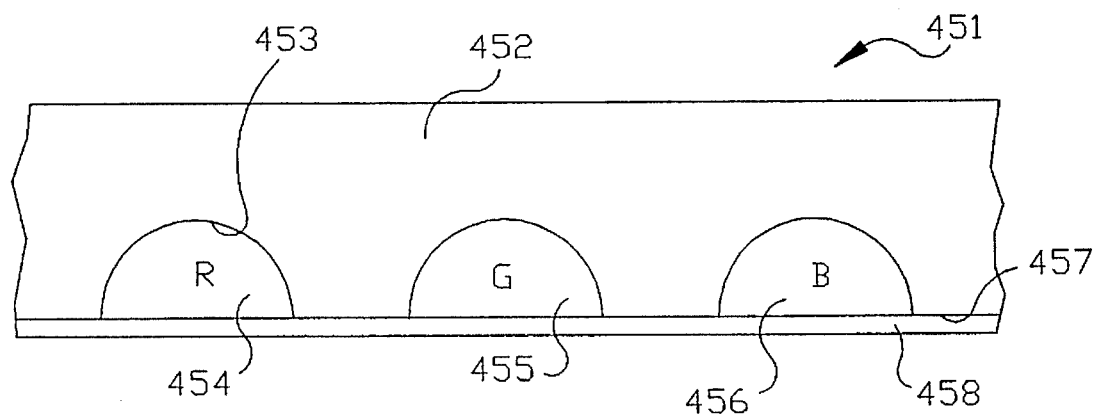
FIG. 144 is a sectional elevational view of a phosphor plate according to another embodiment of the invention.

FIG. 144 is a sectional elevation view of another phosphor plate embodiment 451, in accordance with the invention, wherein the glass plate 452 is provided with a series of transversely spaced-apart cavities 453, respectively containing red phosphor 454, green phosphor 455 and blue phosphor 456, in the portion of the phosphor plate shown. The front surface 457 of the plate, containing the phosphor cavities 453, is coated with a thin aluminum film 458. In the phosphor plate assembly shown in FIG. 144, the distances between adjacent phosphor cavities can be very small. The glass plate surface may be provided with a black matrix or active vacuum getter material thereon, to enhance the efficiency of the phosphor plate and display panel comprising same. The getter material may be of a type which is activatable by laser or other radiation exposure, or by elevated temperature conditions, whereby the getter may be selectively activated in situ.

Figure 145:
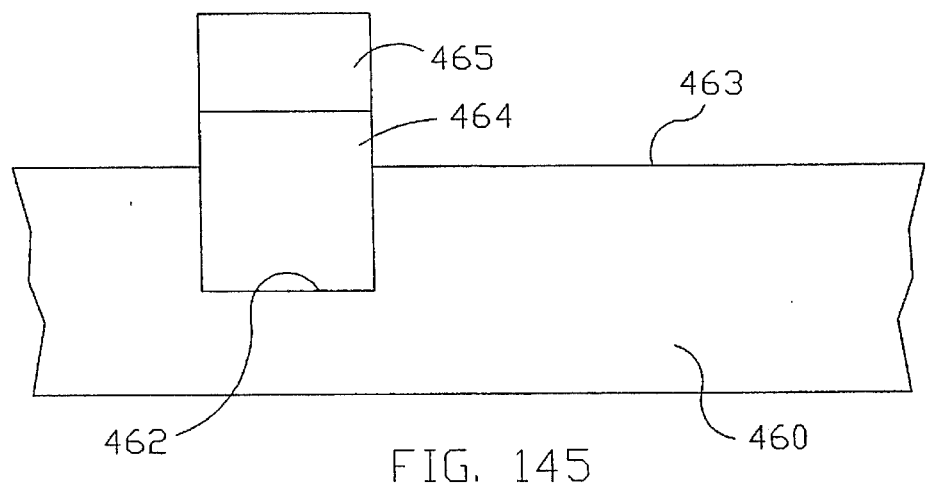
FIG. 145 is a sectional elevation view of a phosphor plate assembly according to another embodiment of the invention.

FIG. 145 is an elevation view in section of a plate member 460 having a cavity 462 in its front surface 463, with a phosphor 464 deposited therein, and overcoated with a resist material 465. As mentioned above, after resist coating, an etch-back step is carried out, such as by RIE, to planarize the surface, and some residual phosphor above the plane of front surface 463, or etching of the glass below the plane of surface 463, is acceptable within the practice of the invention, and readily accommodated within the high efficiency phosphor plate design thereof.

FIGS. 146–152 illustrate various steps of a multi-step process for forming a field emitter structure, according to yet another embodiment of the invention.

Figure 146:
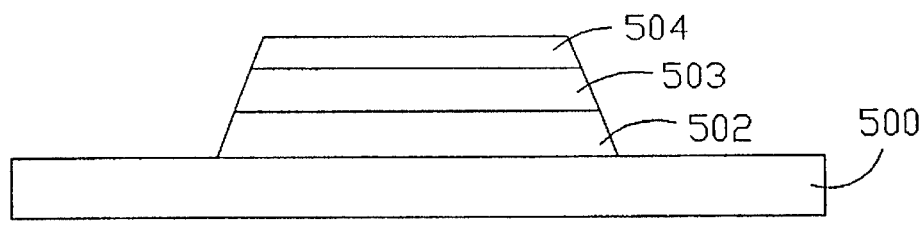
FIGS. 146–152 illustrate steps of a multi-step process for forming field emitter structure according to a further embodiment of the invention.

As shown in FIG. 146, a substrate 500 is provided, formed of glass or other suitable material. On the substrate 500 is formed a layer of Cr/Cu/Cr, or other metals such as Al+Cu, as layer 502. Overlying layer 502 is a layer of resistive material such as Cr+SiO$_2$, as layer 503. Overlying layer 503 is a layer 504 of undoped silicon or CrO$_2$, at a suitable thickness, e.g., 0.15 μm.

On the structure shown in FIG. 146 is deposited a layer 505 of SiO via suitable technique, such as evaporation or sputter method. Alternatively, layer 505 may comprise Si$_3$N$_4$ deposited by a method such as PECVD, at a suitable thickness, as for example on the order of about 0.1 μm.

Figure 147:
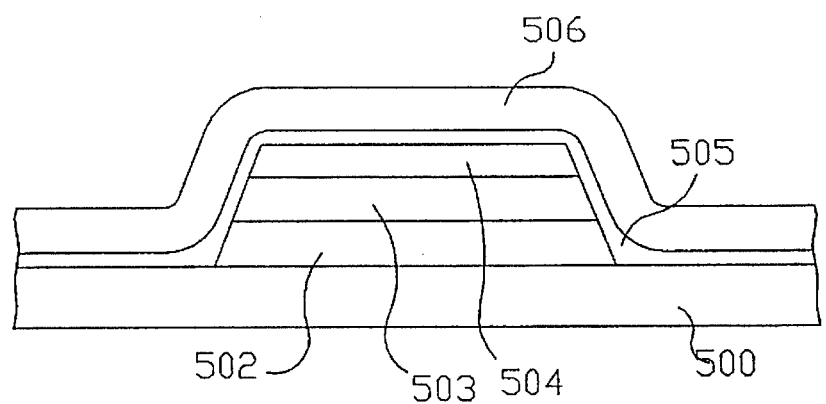
Figure 148:
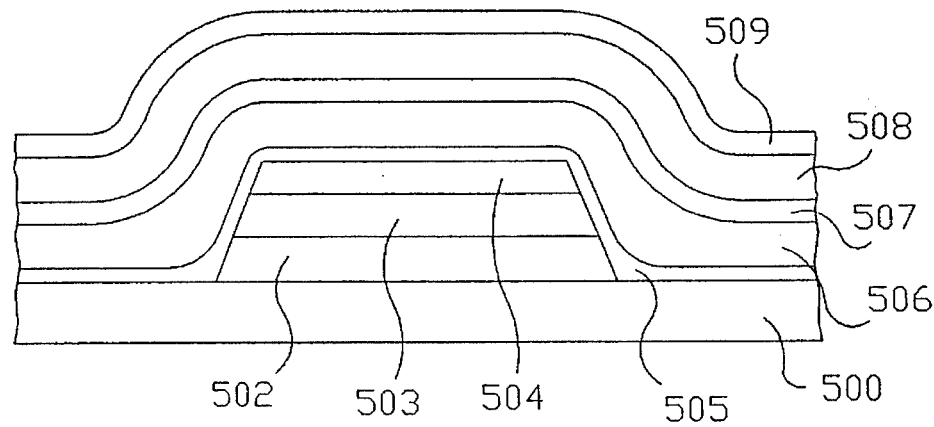
Figure 149:
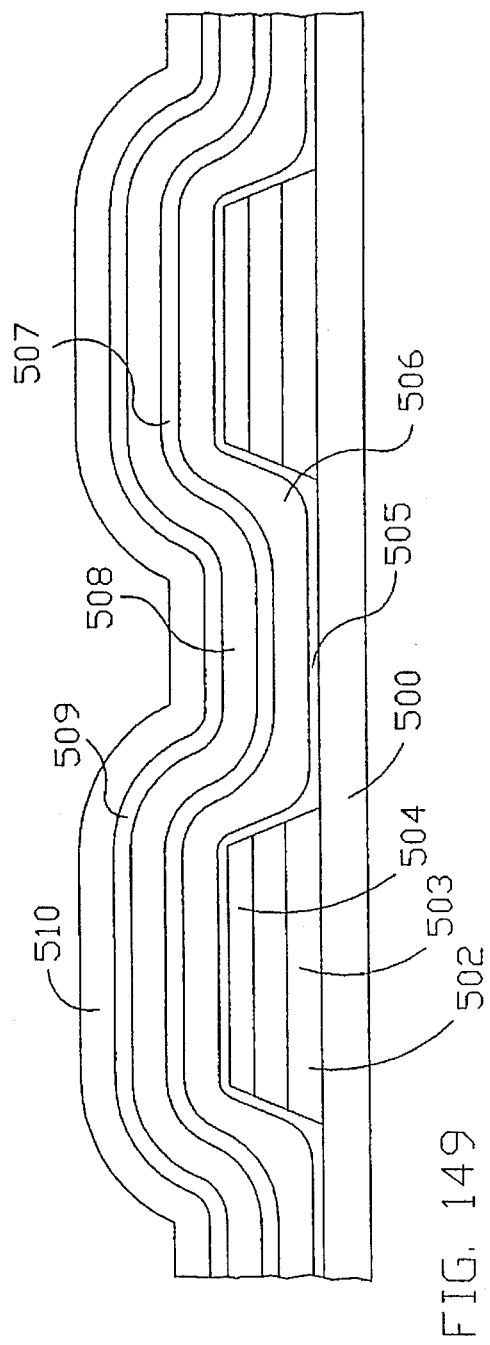
Figure 150:
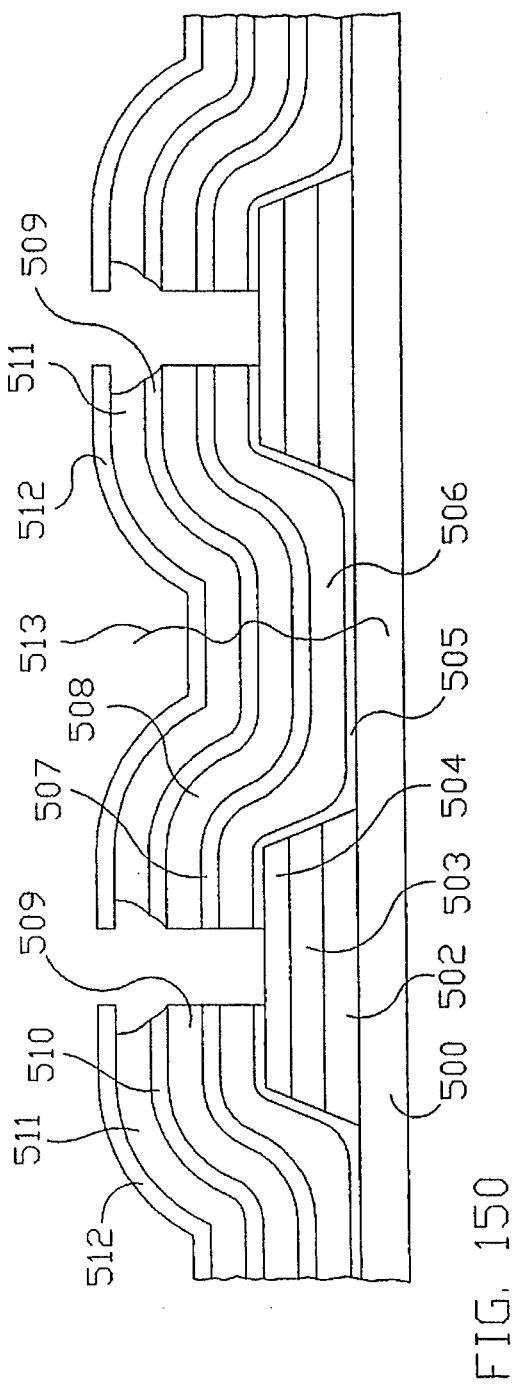
Figure 151:
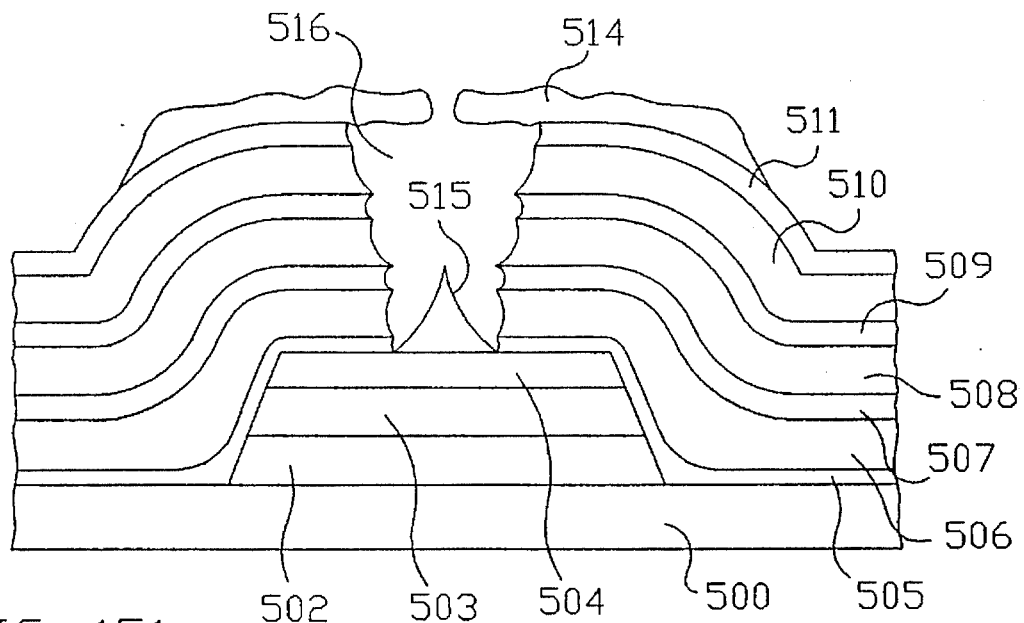

On the insulator layer 505 is deposited a layer 506 of SiO$_2$ at a thickness of from about 0.2 to about 3.0 μm, e.g., about 1 μm, thereby yielding the structure shown in FIG. 147.

On this structure is deposited a layer 507 of SiO, a layer 508 of molybdenum at suitable thickness, e.g, 0.51 μm, and layer 509 of SiO, to provide the gate layers for the structure. The gate layer deposition may be carried out using a lift-off pattern, or by deposition and etching process steps, with the structure shown in FIG. 148 thereafter being optionally coated with a layer 510 of PMGI or other thick organic material, to yield the structure shown in FIG. 149.

Next, aluminum or niobium is deposited as a lift-off material in layer 511, and resist material is deposited in layer 512. Patterning and etching is carried out utilizing RIE or wet etching, or a combination thereof, to yield the structure shown in FIG. 150. In the etching, the high resistance of dielectric layer on top of the emitter connector lines is not etched. The layer 505 thus forms the shape of the etch profile and will shape the contact to the bottom conductor in layer 503. Layer 504 thus acts as an RIE etch stop, and prevents the BOE dip from attacking the Cr+SiO$_2$ layer 503.

In this step, the use of either aluminum or niobium layer 511 or PMGI layer 510 is optional, but some release layer must be present.

After the long etch step is carried out, the resist in layer 512 should be gone; if not, it may optionally be removed. After a BOE or HF etch to recess the oxide layer 506, the etch stop layer 504 is etched, utilizing HF+HNO$_3$ or RIE in CF$_4$+O$_2$. Metal then is evaporated into the cavity 516, to form the generally-shaped cone element 515 therein, and an overlayer of deposited emitter material 514, above the cavity 516, as shown. The deposited emitter material may for example comprise molybdenum or doped silicon, e.g., N-doped Si. The resulting structure, shown in FIG. 151, then is processed to remove the top (lift-off) layer by etching or dissolving of the lift-off, utilizing H$_3$PO$_4$+HNO$_3$+AcOH (for aluminum), or acetone or (for PMGI).

Figure 152:
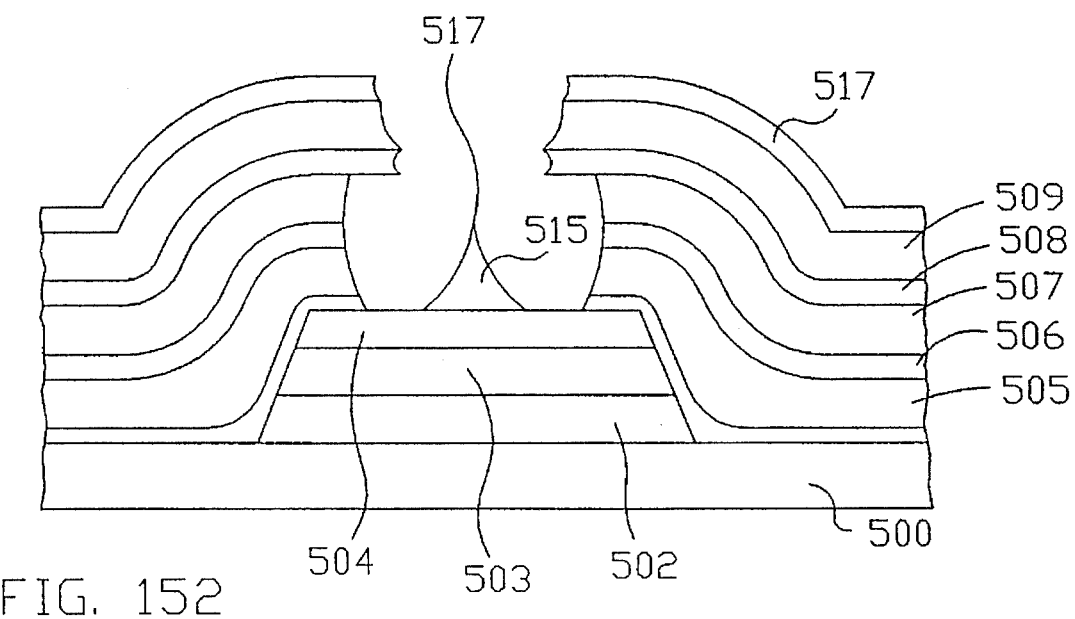

Next, thin film diamond is deposited on the surface of the emitter tip element 515 and the gate layers, as film 517, yielding the structure shown in FIG. 152. The diamond film suitably has a thickness on the order of 100–200 Angstroms, although thicker or thinner films may be employed in the broad practice of the present invention. The diamond film automatically breaks at the gate line edges, due to the undercut of the SiO layer 507. The structure then is annealed by suitably time/temperature schedule processing.

In these structures shown in FIG. 152, the layer 505 defines a size of the contact base of the emitter element 515 and controls the resistance in the structure. The base contact area of the emitter tip element 515 determines the resistance to a large extent.

Figure 153:
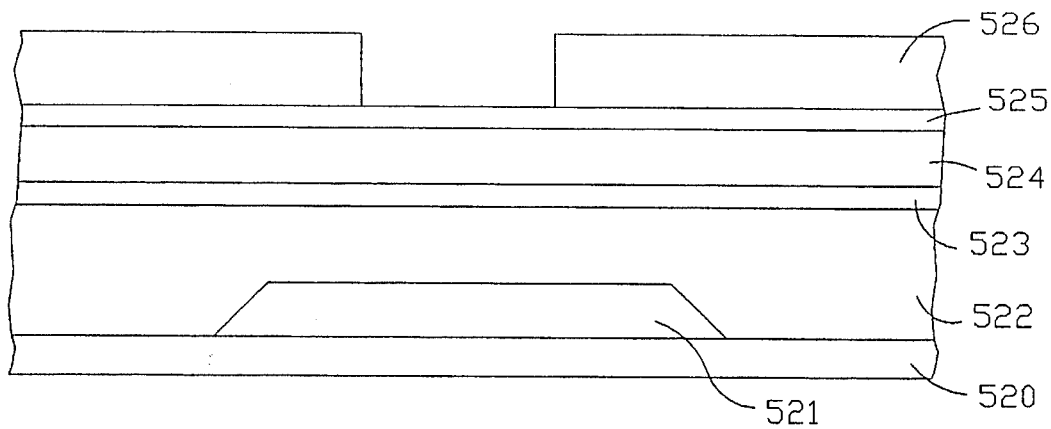
FIGS. 153–155 illustrate steps of a multi-step process for forming a flat top emitter structure according to a further embodiment of the invention.
Figure 154:
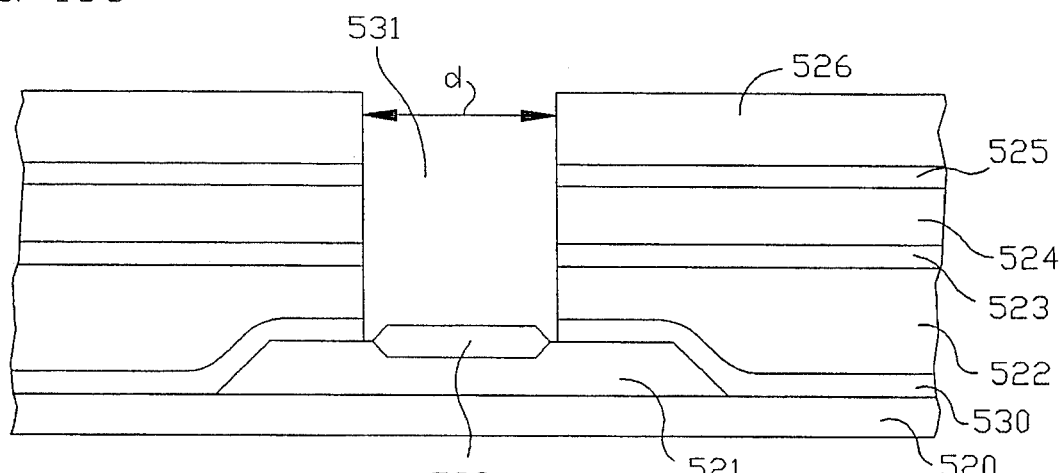
Figure 155:
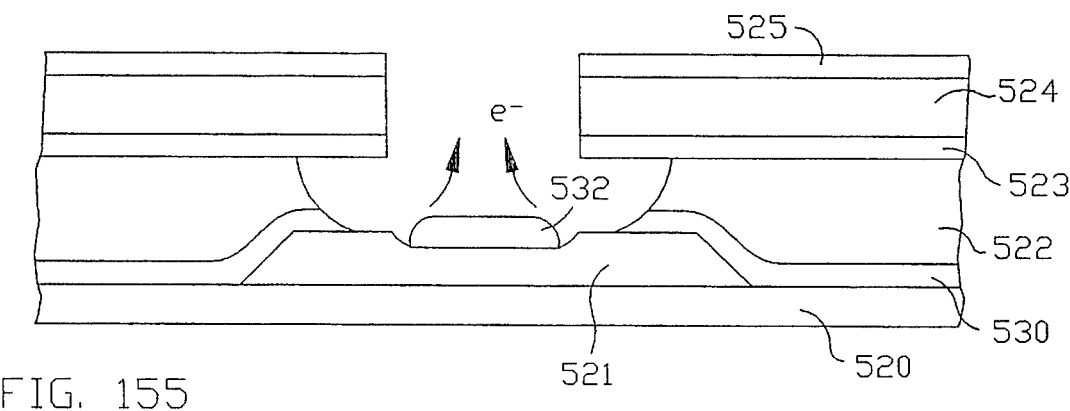

FIGS. 153–155 illustrate steps of a multi-step process for forming a field emitter structure according to an alternative embodiment of the invention.

As shown in FIG. 153, a structure is provided comprising substrate 520 on which a layer 521 of molybdenum or Cr/Cu/Cr is deposited, overlying which is an oxide layer 522. Deposited on the oxide layer 522 is a layer 523 of SiO. On layer 523 is deposited the gate metal layer 524, which may comprise a 0.41 μm thickness of Al+4% Cu. Overlying layer 524 is another layer of SiO, and an uppermost patterned resist layer 526, which may be on the order of 1.5 μm in thickness. The oxide (SiO$_2$) layer 522 may be approximately 0.3 μm in thickness. The SiO layers 523 and 525 alternatively could be formed of Si$_3$N$_4$ or other suitable material.

The structure of FIG. 153 is subjected to etching of the Al+Cu layer 524 and oxide layer 522 to form cavity 531 and the etch trench 533, as shown in FIG. 154, wherein the diameter d of cavity 531 may be on the order of 0.5 μm.

FIG. 154 shows the provision of an optional SiO or CrO$_3$ mask layer 530 which may be provided in the original structure as shown in FIG. 153, as a self-aligned mask layer on the order of 0.1 μm in thickness.

In the etching process producing the structure of FIG. 154, CCl$_2$F$_{2+O2}$ may be used as an etchant for the layer 521 when same is formed of molybdenum, or a wet etch reagent of suitable character may be employed when layer 521 is formed of Cr/Cu/Cr. The oxide layer 522 is etched back in BOE.

After the etching step has been completed, N-type diamond at a thickness on the order of about 0.1 μm is deposited, followed by cleaning and lift-off steps to form the structure shown in FIG. 155, featuring a flat top mesa-shaped diamond emitter element 532. The resist layer 526 shown in FIG. 154 may be removed prior to diamond deposition, and the diamond could be left gate electrode top surface (on layer 525), since the gate undercut to eliminate shorts between the gate line and other gate lines, as well as between the gate and emitter region.

FIG. 155 again shows the optional insulator layer 530. The insulator layers 523,525, and 530 may suitably be formed of and appropriate stable insulator material that does not etch in BOE during the SiO$_2$ etching step.

The structure shown in FIG. 155 operates by using the high work function material (Mo or Cr/Cu/Cr of layer 521) surrounding the low work function diamond dot 532 to focus electrons, with the gate switching the electrons on/off.

Figure 156:
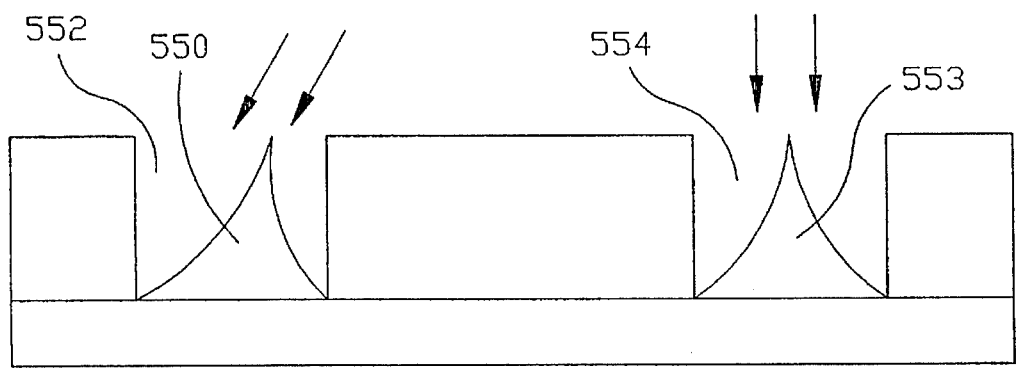
FIGS. 156 and 157 illustrate steps of formation of emitter structures of a type similar to those disclosed in Spindt et al U.S. Pat. No. 3,665,241, in accordance with the present invention.

The field emitter structure of the present invention may advantageously utilize field emitter tip elements of the type disclosed in Spindt U.S. Pat. No. 3,665,241 issued May 23, 1972, the disclosure of which hereby is incorporated herein by reference. Thus, a field emitter structure may be fabricated in accordance with the present invention, utilizing tip elements of the type disclosed in the Spindt et al patent, together with a sandwiched gate structure for low gate leakage, with a self-aligned masked layer being employed at the face of the tip element locus (where the tip element will be formed), to pre-shape the size of the evaporated emitter base on the resistor layer. Without such mask layer, the resistance would vary with the shape of the evaporated base portion of the emitter element. The base shape will vary as the position of the opening (of the cavity containing the emitter tip locus) changes relative to the evaporant source, as shown for example in FIG. 156, wherein the emitter tip element 550 in cavity 552 is of an off-center conformation, due to the corresponding off-center character of the cavity relative to the evaporant source, while the tip element 553 in cavity 554 is formed with a symmetrical shape about the center line of the source of evaporant.

Figure 157:
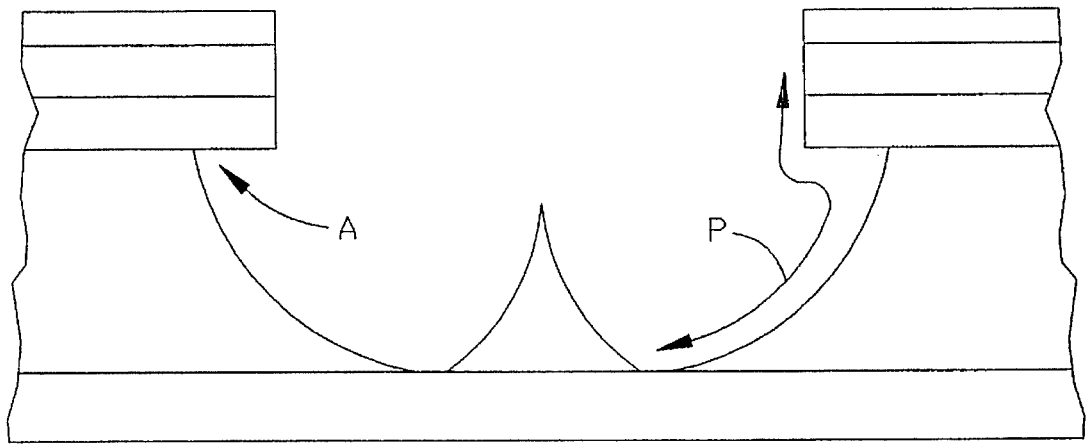

The utilization of the gate structure of the present invention in emitter tip element arrays of the type disclosed in Spindt et al, reduces leakage by increasing the path length for charge transfer over the oxide layer. Such arrangement also reduces the electric field strength over the oxide, and provides a dielectric material charge which can trap charge like an EPROM; trapped electrons reduce the E-field in that region and stop the flow of charge. With reference to the structure shown in FIG. 157, a charge build-up point A is indicated, and it is apparent that the charge must follow a long line P with small driving fields.

Figure 158:
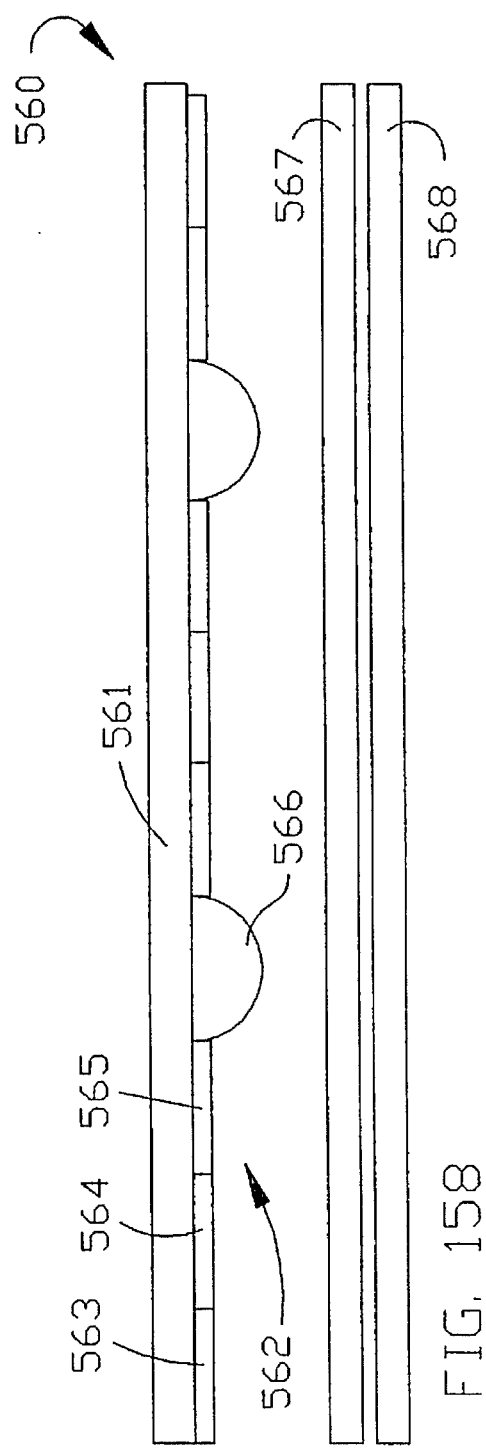
FIGS. 158 and 159 illustrate steps in a process for forming a flat panel display according to one aspect of the invention.
Figure 159:
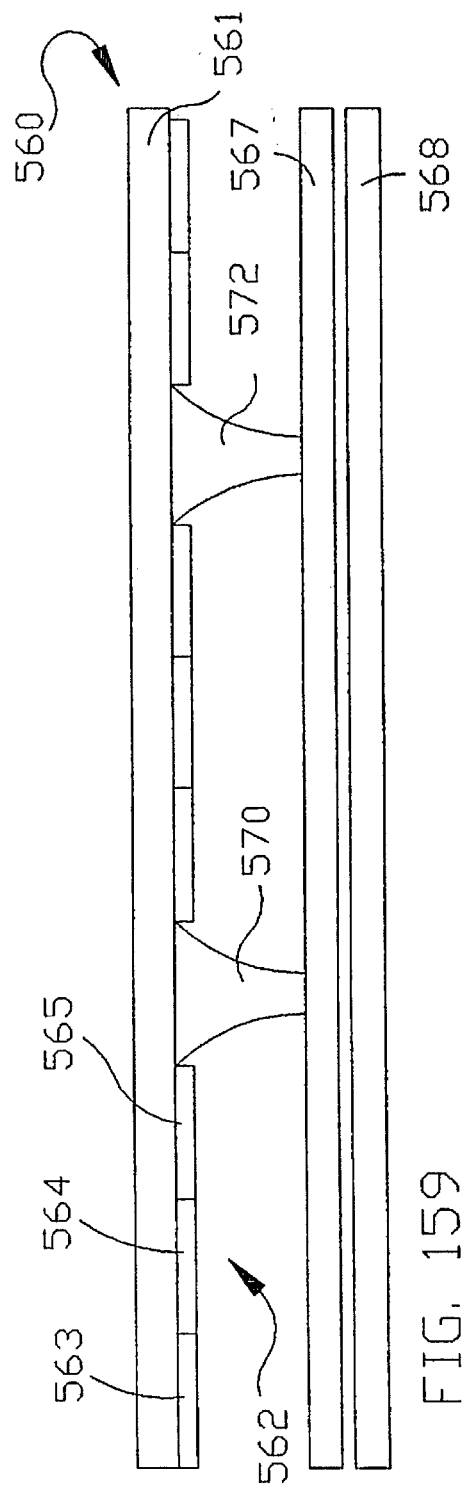

FIG. 158 shows a portion of a display device 560 according to another embodiment of the invention, in a precursor stage of manufacture, with the final product structure shown in FIG. 159.

In the assembly shown in FIG. 158, a top plate 561 is provided with an array 562 comprising phosphors 563,564, and 565 in a red/green/blue sequence, respectively. The plate between successive phosphor arrays is provided with a protrusion or deposit 566 of a frit or viscus material, e.g., a leaded glass frit. In spaced relationship to the top plate is an optional spacer grid 567 having an optional conductor layer on its upper surface (not shown) to re-route flashovers. Beneath the optional spacer grid 567 is a field emitter plate 568, comprising a multiplicity of field emitter elements arranged for emitting electrons for impingement on the phosphors of plate 561.

The respective plates and optional spacer, if present, are arranged as shown in FIG. 158, and are placed together using frit and/or other standoff means around the perimeter of the two plates to achieve a precision spacing, following which the perimeter of the respective plates is sealed. Depending on the weight of the plates, pressure may be applied between the plates at this stage, to ensure proper separation therebetween.

Next, laser heating of the protrusions 566 is effected, utilizing a laser optimized for absorption by the frit, or by focus of lasing energy of appropriate intensity onto the protrusion, so that the protrusion is heated to the melting point. The protrusion will melt and thereupon form a viscous droplet, which under the influence of gravity will drop onto optional spacer grid if present, or field emitter plate if the spacer member is not employed. Once gravity causes the droplet to bridge the gap between the facing plates, lasing energy is terminated and the droplet is allowed to cool and form a column as shown in FIG. 159, wherein the columns 570 and 572 have been formed from the corresponding frit protrusions.

After the spacer columns 570 and 572 are allowed to cool sufficiently for thorough solidification thereof, the region between the plates may be evacuated, without collapsing thereof.

It will be recognized that the deployment of the frit protrusions 566 on the top phosphor plate in the embodiment shown is illustrative in character, and that other orientations and protrusion positionings may be employed. For example, the assembly shown in FIG. 158 may be inverted, and the protrusions 566 may be provided on the spacer 567, or the field emitter plate 568, so that gravity causes the protrusion to melt and drip onto the phosphor plate in such inverted orientation.

In such drip formation process for fabricating spacer columns, the use of charged surfaces between the plates may permit sideways column formation, or otherwise may be employed to enhance vertical column formation. The addition of a photoelectron emitter to the glass surface, e.g., cesium may be employed to provide a selected charge formation on the surface of the melt-droplet which is employed to form the spacer column.

By substituting a conductive material such as silver solder for the insulating glassy material, connections between anodes and emitters may also be achieved.

Figure 160:
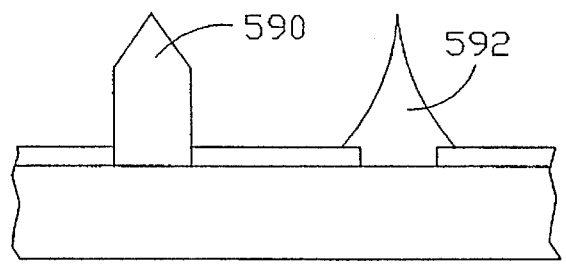
FIG. 160 is an elevation view of a field emitter structure comprising multiple-shaped emitter elements.

FIG. 160 shows a field emitter tip structure comprising substrate 580.

As an exemplary high current, low function emitter material which may be usefully employed in the broad practice of the present invention, compositions comprising a mixture of niobium silicon wherein the niobium:silicon ratio is from about 20%:80% to about 80%:20% are usefully employed. Other metals in the niobium column of the Periodic Table may alternatively be substituted for niobium in such mixture. Such an emitter material may be co-evaporated, single source evaporated, albeit with less control, sputtered, or deposited by PECVD or CVD techniques. It may also be advantageous to form the emitter by converting the surface of a silicon emitter to such composition via physical vapor deposition, and reaction of the surface thermally, at a temperature of at least 200° C., after an oxide removal/cleaning step, or by ion bombardment of the emitter surface. Coatings of such mixed composition on various types of emitter surfaces, such as the columnar tip element 590 and the cone-type tip element 592 shown in the field emitter structure of FIG. 160, may advantageously be employed in the broad practice of the invention.

Figure 161:
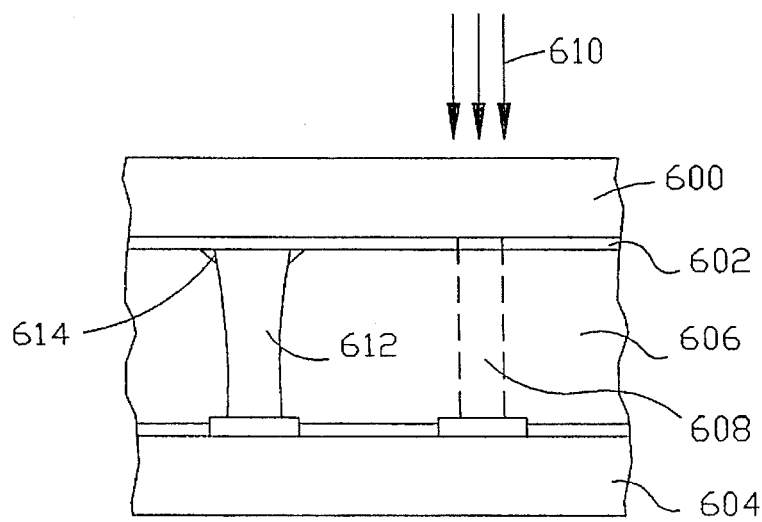
FIG. 161 is a elevation view of a structure illustrating the formation of columnar elements between a substrate and a cover member.

An alternative process for forming spacer elements in a display panel precursor structure is shown with reference to FIG. 161, wherein the precursor structure includes a first plate member 600 of transparent character, formed of suitable transparent material such as glass. Plate 600 may be the anode or the field emitter plate of a panel assembly. A release layer 602 of suitable material may be provided on the bottom surface of plate 600. Plate 600 is in spaced relationship to second plate member 604, which may for example comprise a field emitter plate or an anode patterned with phosphors and optionally coated with an aluminum film, whereby plate members 600 and 604 are complementary to one another in respect of emitter and anode pairing.

Provide between the plate members 600 and 604 is a liquid monomer, prepolymer, or polymer composition 606 which is radiation-curable to a solid state.

In the fabrication method associated with the structure of FIG. 161, the two plate members 600 and 604 are placed in spaced-apart relationship to one another, using alignment and spacing means such as an etch spacer of jig assembly. The gap between the adjacent plate members then is filled with a light-activated monomer, prepolymer, or polymer composition which is radiation curable by such light activation to a solid state.

Light of suitable character and intensity then is directed through one or both plates, e.g., by laser exposure involving impingement of a lasing beam 610 on the polymerizable/curable medium 606 in region 608, to form solid columns or lines, such as spacer column 612 in the Figure, which has previously been submitted to radiation exposure.

Subsequent to radiation exposure and column formation, excess curable liquid medium 606 is drained from the gap between the plate members, and the plate members are cleaned of excess curable medium, using alcohol or other appropriate solvent.

The optional release layer 602 may be employed to separate the plate member 600 and 604 subsequent to column formation, if desired. Alternatively, the plate members may be left in the assembly, connected by and spaced-apart from one another by the spacer columns formed by radiation impingement on selected regions of the curable medium. Thus, the plate members may include a glass plate which is employed only for the purpose of containment of the curable medium and subsequent to the formation of spacer columns is removed and replaced by the functional field emitter plate or annode plate, as appropriate.

Subsequent to their formation, the spacer columns may be coated using plasma CVD deposition of silicon or otherwise coated with a plating material for the purpose of controlling resistivity.

As a further alternative to the spacer column-formation method described above, the spacer formation process can be performed without a top plate member, by forming the spacer grid in the liquid, by slowly filling or lower the curable medium.

Figure 162:
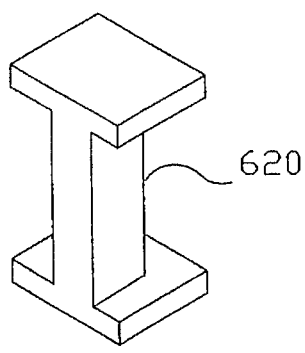
FIGS. 162–164 are perspective views of spacer elements which may be employed in flat panel display assemblies according to the present invention.
Figure 163:
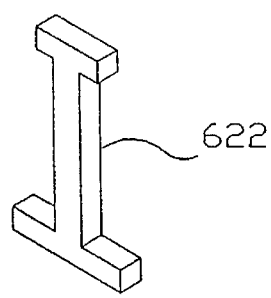
Figure 164:
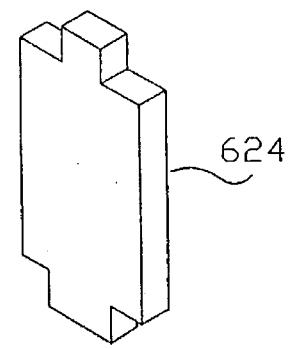

FIGS. 162–164 show various shapes of spacer elements 620, 622, and 624, respectively which may be employed, by suitable radiation impingement patterns on the curable liquid medium.

While the invention has been described with reference to specific aspects, features, and embodiments, it will be recognized that the invention may be widely varied, and that numerous modifications, variations, and other embodiments are possible, and such other modifications, variations, and other embodiments are to be regarded as being within the spirit and scope of the invention.

What is claimed is:

1. A field emission device, comprising:

a dielectric spacer frame to separate two separate plates, one plate including an electron emitter structure having offset anode and gate or emitter plate patterns, and the other plate being a phosphor plate, in which the spacer frame is sealed to the plates to from a vacuum-tight perimeter; and a field emitter element, having anode structure and light emitting means, disposed on a substrate and overlyingly surrounded by a gate electrode structure; wherein the gate electrode structure constitutes a part of a gate structure including gate metal lines, with an overlayer dielectric deposited on the gate metal lines to reduce voltage arc susceptibility and pickup of extraneous electrons by the gate metal; and a getter material film deposited on the overlayer dielectric.

2. A field emission device according to claim 1, wherein the thickness of the getter material film is from about 1 to about 200 nanometers.

3. A field emission device according to claim 2, wherein the getter material film includes a getter material selected from the group consisting of elemental barium, and elemental titanium, and mixtures thereof.

* * * * *